US012561650B2

(12) United States Patent
Sugimoto

(10) Patent No.: US 12,561,650 B2
(45) Date of Patent: Feb. 24, 2026

(54) TIME/DATE ADJUSTMENT APPARATUS, TIME/DATE ADJUSTMENT METHOD, AND NON-TRANSITORY COMPUTER-READABLE STORAGE MEDIUM THEREFOR

(71) Applicant: E4 Inc., Tokyo (JP)

(72) Inventor: Taichiro Sugimoto, Tokyo (JP)

(73) Assignee: E4 Inc., Tokyo (JP)

( * ) Notice: Subject to any disclaimer, the term of this patent is extended or adjusted under 35 U.S.C. 154(b) by 98 days.

(21) Appl. No.: 18/551,391

(22) PCT Filed: Feb. 22, 2022

(86) PCT No.: PCT/JP2022/007298
§ 371 (c)(1),
(2) Date: Sep. 19, 2023

(87) PCT Pub. No.: WO2022/202063
PCT Pub. Date: Sep. 29, 2022

(65) Prior Publication Data
US 2024/0169323 A1 May 23, 2024

(30) Foreign Application Priority Data
Mar. 21, 2021 (JP) ................................. 2021-046720

(51) Int. Cl.
*G06Q 10/1093* (2023.01)
(52) U.S. Cl.
CPC ................................. *G06Q 10/1093* (2013.01)
(58) Field of Classification Search
None
See application file for complete search history.

(56) References Cited

U.S. PATENT DOCUMENTS

2015/0347983 A1* 12/2015 Jon ........................ G06F 3/0488
705/7.19

FOREIGN PATENT DOCUMENTS

JP 2013-105365 A 5/2013
JP 2017-182237 A 10/2017
(Continued)

OTHER PUBLICATIONS

International Search Report of the corresponding International application No. PCT/JP2022/007298 mailed May 17, 2022 and English translation thereof.
(Continued)

*Primary Examiner* — Stephanie Z Delich
(74) *Attorney, Agent, or Firm* — Muncy, Geissler, Olds & Lowe, P.C.

(57) ABSTRACT

When an adjustment partner performing access is an intermediate inputter, a time/date adjustment apparatus extracts third candidate time/dates that are available time/dates of a participant on a side of an adjustment initiator satisfying an adjustment condition of the adjustment initiator and are within a range of second candidate time/dates, and determines fourth candidate time/dates based on an input of the intermediate inputter on the extracted third candidate time/dates, and when the adjustment partner performing access is a final inputter, the time/date adjustment apparatus extracts fifth candidate time/dates that are available time/dates of the participant on the side of the adjustment initiator satisfying the adjustment condition of the adjustment initiator and are within a common range of all of the fourth candidate time/dates, and determines an assembly time/date out of the fifth candidate time/dates based on selection of the final inputter.

31 Claims, 22 Drawing Sheets

(56) References Cited

FOREIGN PATENT DOCUMENTS

| | | |
|---|---|---|
| JP | 2019-219831 A | 12/2019 |
| JP | 2020-91896 A | 6/2020 |

OTHER PUBLICATIONS

Login. [online], Mar. 22, 2020. [retrieval date Apr. 27, 2022]. Internet: <URL:https://eeasy.jp/login> entire text. all drawings.

A business tool that revolutionizes schedule adjustment. [online]., Mar. 22, 2020. [retrieval date Apr. 27, 2022], Internet: <URL:https://eeasy.jp/> entire text. all drawings.

Business tool "eeasy" that automates schedule adjustment officially launched on May 12th! Already used by 1.000 companies. [online]., May 12, 2020. [retrieval date Apr. 27, 2022]. Internet:<URL:https://eeasy.jp/news/n001 I> entire text. all drawings.

Schedule adjustment service "eeasy", adjusting schedule, and at the same time, automating issuance URL of Web conferencing tool & notification to the other party. [online]., Jun. 25, 2020, [retrieval date Apr. 27, 2022], Internet: <URL:https://eeasy.jp/news/n0013> entire text, all drawings.

Schedule adjustment service "eeasy" starts to provide API that can easily incorporate schedule adjustment function on an external system. [online]., Jun. 30, 2020, [retrieval date Apr. 27, 2022]. Internet:<URL:https://eeasy.jp/news/n0014> entire text, all drawings.

Schedule adjustment service "eeasy" started to cooperate with Zoom. Additionally, targets of cooperation are a total of 4 tools including Meet, Teams, and Skype. [online].,Sep. 25, 2020, [retrieval date Apr. 27, 2022], Internet: <URL: https://eeasy.jp/news/n0015> entire text, all drawings.

Schedule adjustment service "eeasy", the industry's first to add a function that can consider "schedule-priority". [online], Nov. 25, 2020, [retrieval date Apr. 27, 2022]. Internet:<URL:https://eeasy.jp/news/n0016> entire text, all drawings.

Business tool "eeasy" that automates schedule adjustment officially launched on May 12th! Already used by 1,000 companies. [online], May 12, 2020, [retrieval date Apr. 27, 2022], Internet: <URL:https://www.atpress.ne.jp/news/212281> entire text, all drawings.

Schedule adjustment service "eeasy", adjusting schedule, and at the same time, automating issuance URL of Web conferencing tool & notification to the other party. [online], Jun. 25, 2020, [retrieval date Apr. 27, 2022], Internet: <URL:https://www.atpress.ne.jp/news/216203> entire text, all drawings.

Schedule adjustment service "eeasy", the industry's first to add a function that can consider "schedule-priority". [online], Nov. 25, 2020, [retrieval date Apr. 27, 2022]. Internet:<URL:https://www.atpress.ne.jp/news/236592> entire text, all drawings.

Business tool "eeasy" that automates schedule adjustment officially launched on May 12! Already used by 1,000 companies. [online], May 12, 2020, [retrieval date Apr. 27, 2022], Internet:<URL:https://prtimes.jp/main/html/rd/p/000000001.000057389.html> entire text, all drawings.

Schedule adjustment service "eeasy" starts to provide API that can easily incorporate schedule adjustment function on an external system. [online], Jun. 30, 2020. [retrieval date Apr. 27, 2022]. Internet:<URL:https://prtimes.jp/main/html/rd/p/000000002.000057389.html> entire text. all drawings.

Schedule adjustment service "eeasy" started to cooperate with Zoom. Additionally, targets of cooperation are a total of 4 tools including Meet, Teams, and Skype. [online], Sep. 25, 2020, [retrieval date Apr. 27, 2022], Internet:<URL: https ://prtimes.jp/main/html/rd/p/000000003.000057389.html> entire text, all drawings.

Eeeasy [online]. Oct. 29, 2020, [retrieval date Apr. 27, 2022], Internet: <URL:https://mitsu-karn.com/single-documenU?f=3850&a=> entire text, all drawings.

Schedule adjustment tool "eeasy". [online], Dec. 24, 2020, [retrieval date Apr. 27, 2022], Internet: <URL:https://dl.liskul.com/article/?id=I000737>, entire text, all drawings.

Would you like to stop the manual work of scheduling? Schedule adjustment tool "eeasy". [online], Feb. 15, 2021, [retrieval date Apr. 27, 2022], Internet: <URL:https://symphonict.nesic.co.jp/ eeasy> entire text, all drawings.

* cited by examiner

FIG. 2

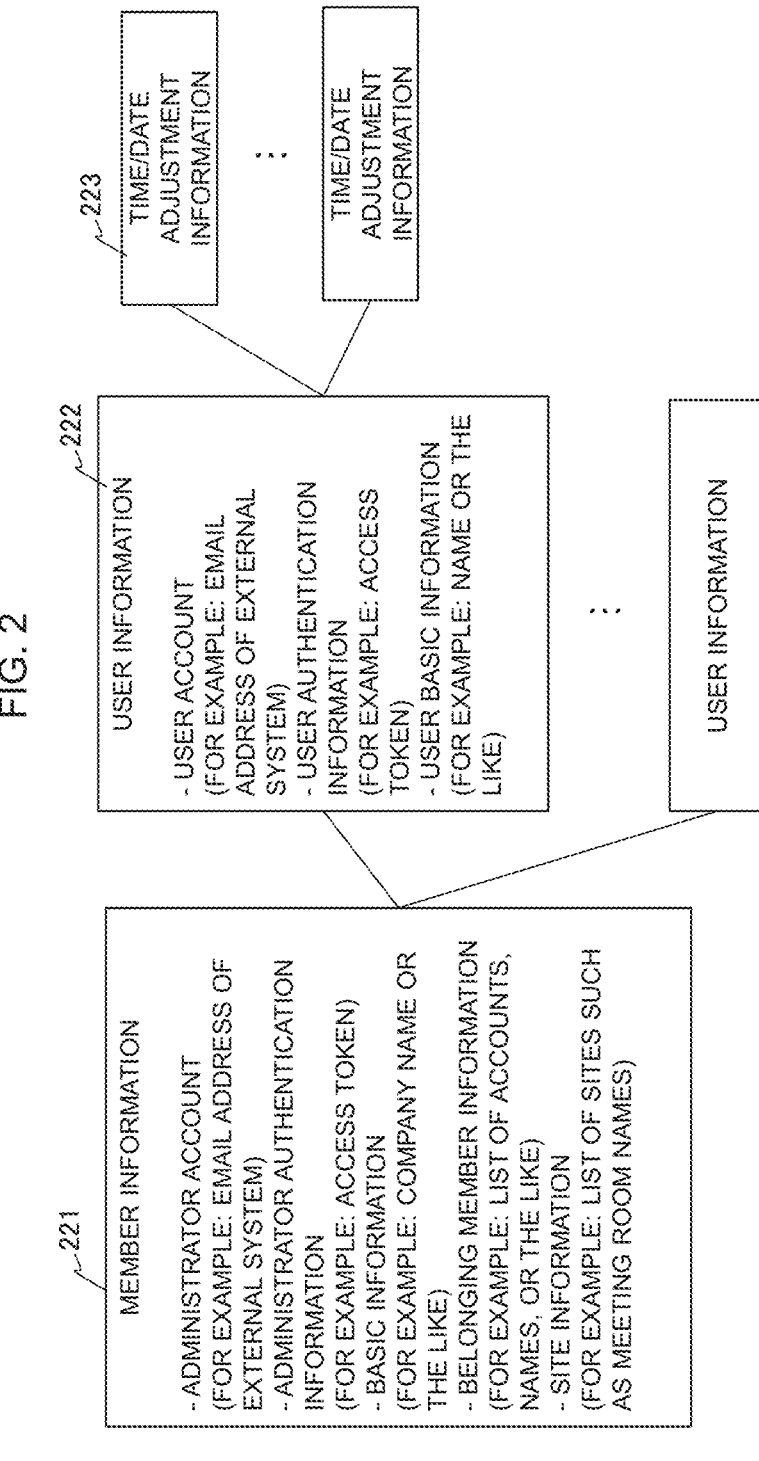

MEMBER INFORMATION

- ADMINISTRATOR ACCOUNT
(FOR EXAMPLE: EMAIL ADDRESS OF
EXTERNAL SYSTEM)
- ADMINISTRATOR AUTHENTICATION
INFORMATION
(FOR EXAMPLE: ACCESS TOKEN)
- BASIC INFORMATION
(FOR EXAMPLE: COMPANY NAME OR
THE LIKE)
- BELONGING MEMBER INFORMATION
(FOR EXAMPLE: LIST OF ACCOUNTS,
NAMES, OR THE LIKE)
- SITE INFORMATION
(FOR EXAMPLE: LIST OF SITES SUCH
AS MEETING ROOM NAMES)

USER INFORMATION

- USER ACCOUNT
(FOR EXAMPLE: EMAIL
ADDRESS OF EXTERNAL
SYSTEM)
- USER AUTHENTICATION
INFORMATION
(FOR EXAMPLE: ACCESS
TOKEN)
- USER BASIC INFORMATION
(FOR EXAMPLE: NAME OR THE
LIKE)

USER INFORMATION

TIME/DATE
ADJUSTMENT
INFORMATION

TIME/DATE
ADJUSTMENT
INFORMATION

FIG. 3

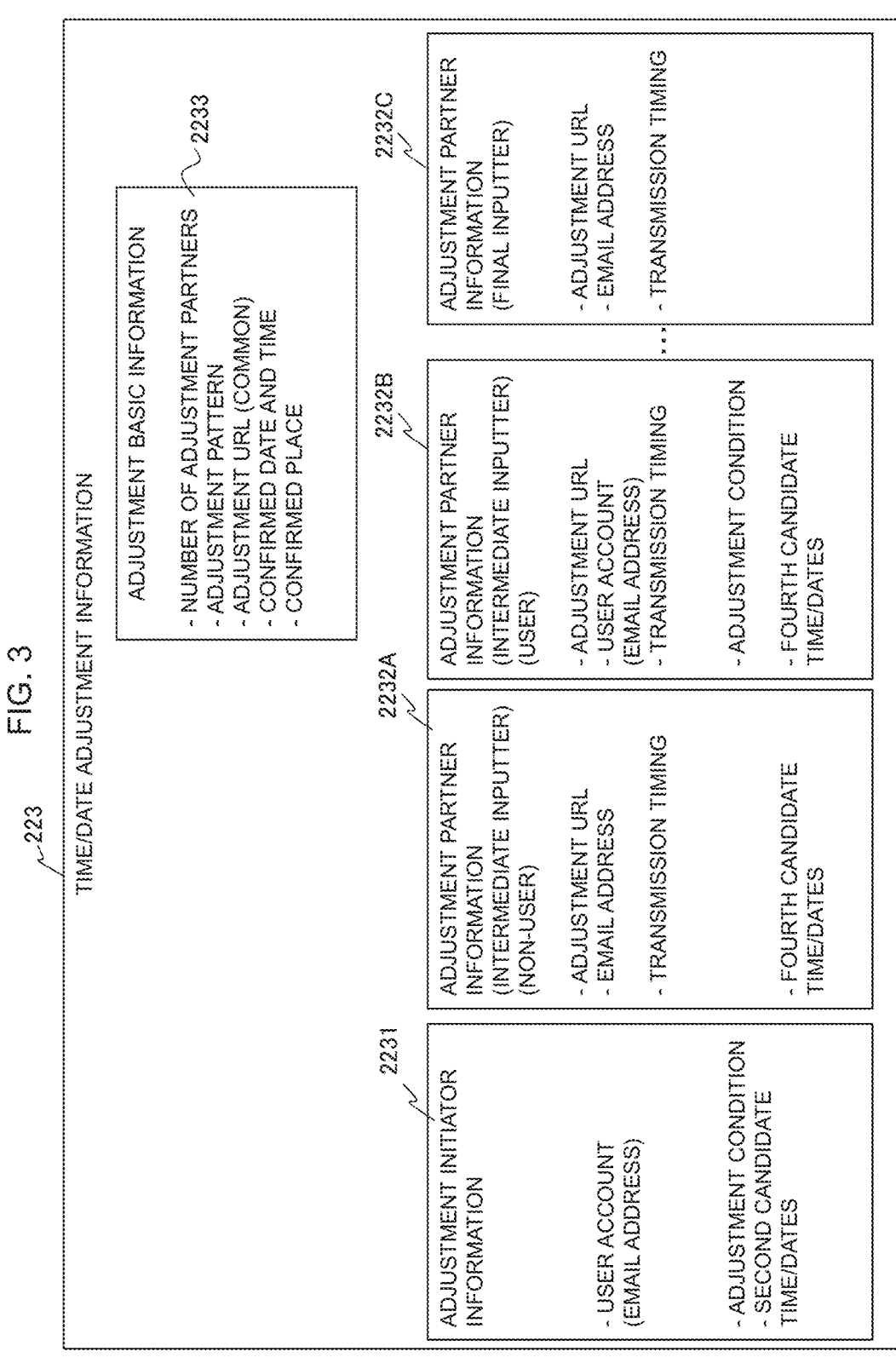

TIME/DATE ADJUSTMENT INFORMATION 223

ADJUSTMENT BASIC INFORMATION 2233
- NUMBER OF ADJUSTMENT PARTNERS
- ADJUSTMENT PATTERN
- ADJUSTMENT URL (COMMON)
- CONFIRMED DATE AND TIME
- CONFIRMED PLACE

ADJUSTMENT INITIATOR INFORMATION 2231
- USER ACCOUNT (EMAIL ADDRESS)
- ADJUSTMENT CONDITION
- SECOND CANDIDATE TIME/DATES

ADJUSTMENT PARTNER INFORMATION (INTERMEDIATE INPUTTER) (NON-USER) 2232A
- ADJUSTMENT URL
- EMAIL ADDRESS
- TRANSMISSION TIMING
- FOURTH CANDIDATE TIME/DATES

ADJUSTMENT PARTNER INFORMATION (INTERMEDIATE INPUTTER) (USER) 2232B
- ADJUSTMENT URL
- USER ACCOUNT (EMAIL ADDRESS)
- TRANSMISSION TIMING
- ADJUSTMENT CONDITION
- FOURTH CANDIDATE TIME/DATES

ADJUSTMENT PARTNER INFORMATION (FINAL INPUTTER) 2232C
- ADJUSTMENT URL
- EMAIL ADDRESS
- TRANSMISSION TIMING

TIME/DATE ADJUSTMENT SCREEN (FOR INTERMEDIATE INPUTTER)

EXCLUDE TIME/DATES INCONVENIENT FOR YOU FROM "CANDIDATE TIME/DATES".
"OTHER PERSON WILL CONFIRM DATE AND TIME FOR HOLDING.

TIME/DATE NOTIFICATION SCREEN

ASSEMBLY WITH Mr./Ms. A HAS BEEN CONFIRMED AS FOLLOWS.
*THIS HAS ALREADY BEEN NOTIFIED TO Mr./Ms. A AS WELL.

CONFIRMED ASSEMBLY

• TIME/DATE
DECEMBER 17TH (THURSDAY)    11:00～12:00    (60 MINUTES)

REGISTER THIS PLAN NOW TO AVOID
FORGETTING

REGISTER IN CALENDAR TOOL

REGISTER IN SCHEDULE APPLICATION

FIG. 21

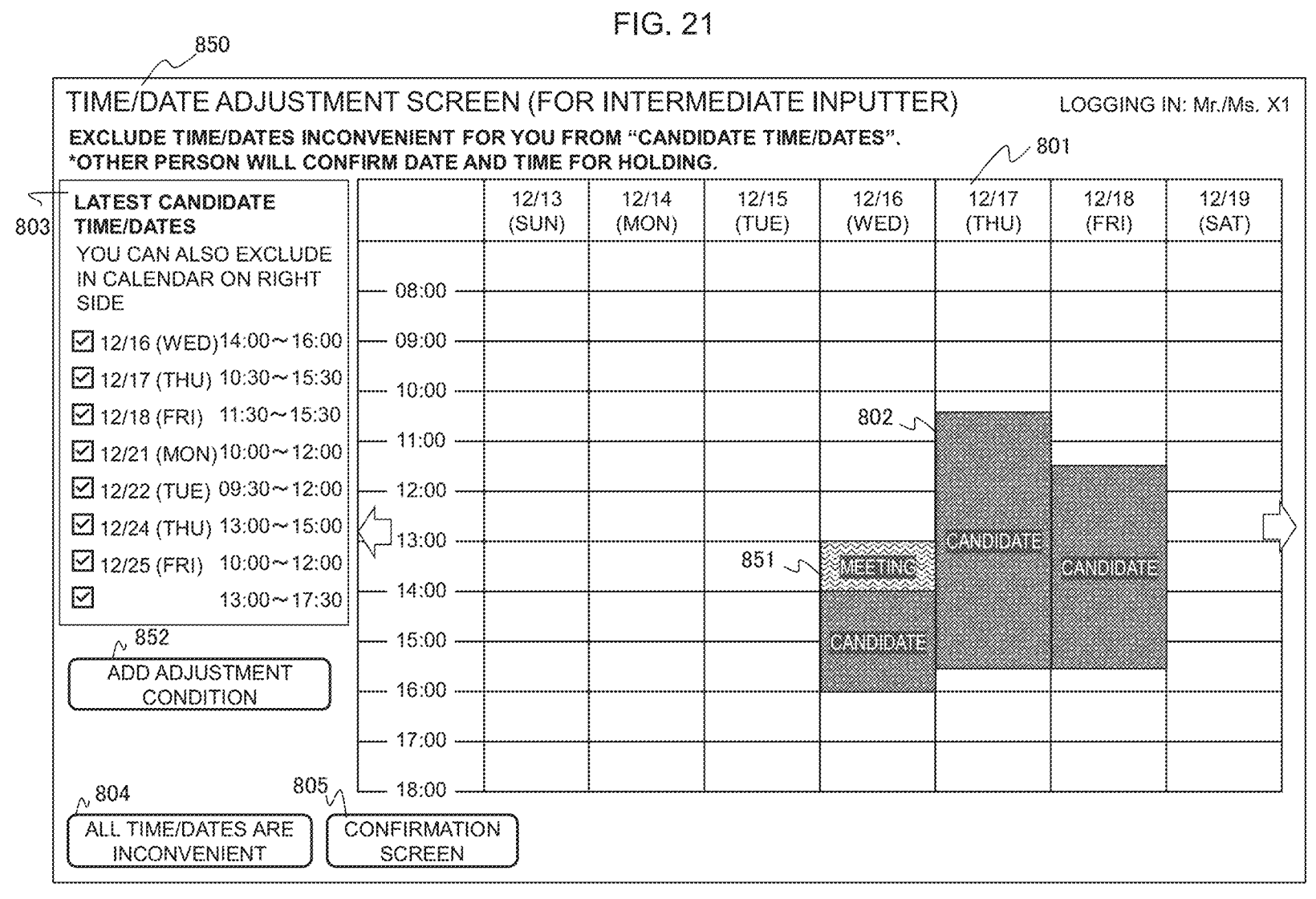

TIME/DATE ADJUSTMENT SCREEN (FOR INTERMEDIATE INPUTTER)

LOGGING IN: Mr./Ms. X1

EXCLUDE TIME/DATES INCONVENIENT FOR YOU FROM "CANDIDATE TIME/DATES".
*OTHER PERSON WILL CONFIRM DATE AND TIME FOR HOLDING.

LATEST CANDIDATE TIME/DATES

YOU CAN ALSO EXCLUDE IN CALENDAR ON RIGHT SIDE

☑ 12/16 (WED)14:00〜16:00
☑ 12/17 (THU) 10:30〜15:30
☑ 12/18 (FRI) 11:30〜15:30
☑ 12/21 (MON)10:00〜12:00
☑ 12/22 (TUE) 09:30〜12:00
☑ 12/24 (THU) 13:00〜15:00
☑ 12/25 (FRI) 10:00〜12:00
☑          13:00〜17:30

ADD ADJUSTMENT CONDITION

ALL TIME/DATES ARE INCONVENIENT

CONFIRMATION SCREEN

FIG. 22

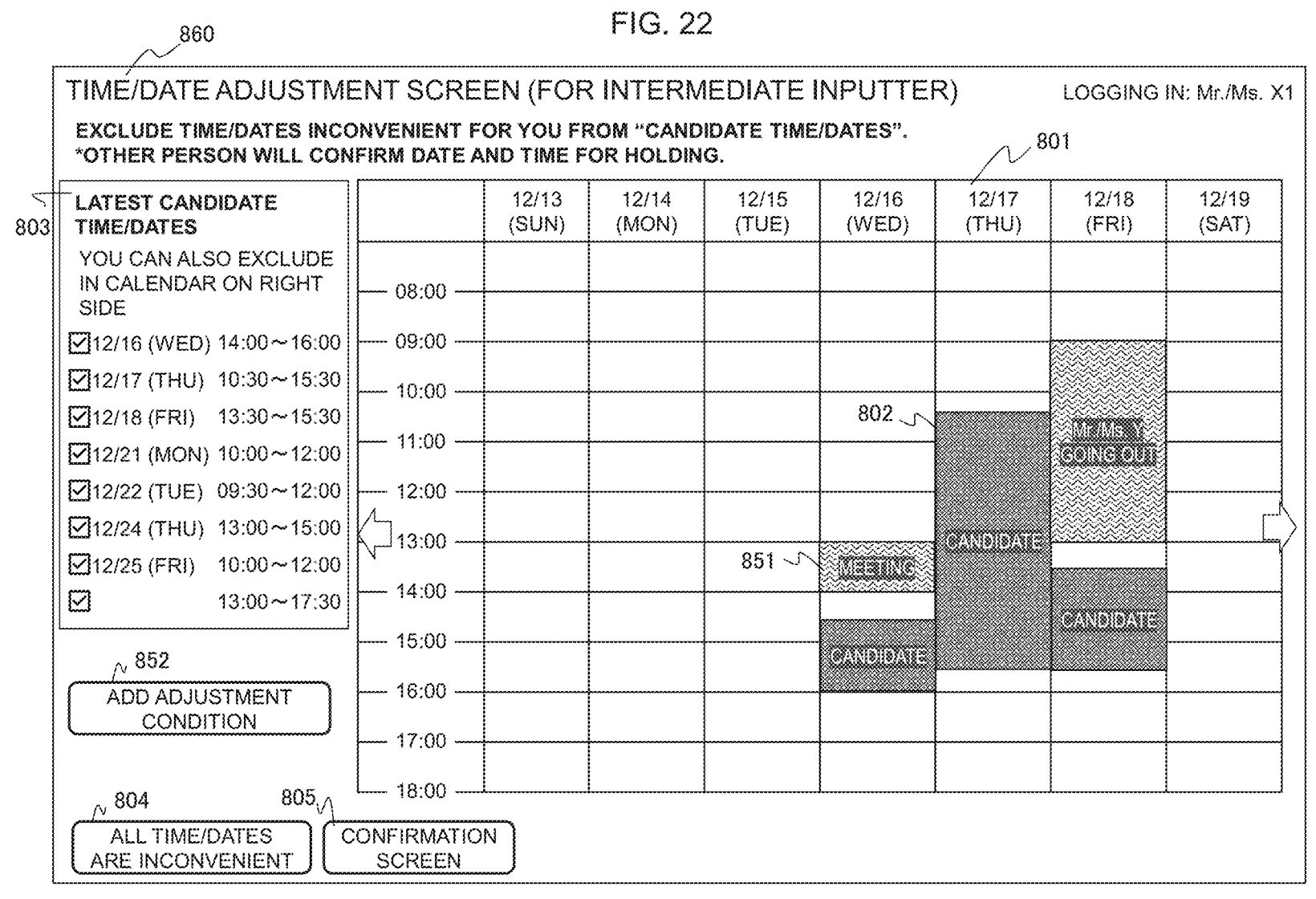

TIME/DATE ADJUSTMENT SCREEN (FOR INTERMEDIATE INPUTTER)

LOGGING IN: Mr./Ms. X1

EXCLUDE TIME/DATES INCONVENIENT FOR YOU FROM "CANDIDATE TIME/DATES".
"OTHER PERSON WILL CONFIRM DATE AND TIME FOR HOLDING.

| | 12/13 (SUN) | 12/14 (MON) | 12/15 (TUE) | 12/16 (WED) | 12/17 (THU) | 12/18 (FRI) | 12/19 (SAT) |

LATEST CANDIDATE TIME/DATES
YOU CAN ALSO EXCLUDE IN CALENDAR ON RIGHT SIDE

- ☑ 12/16 (WED) 14:00~16:00
- ☑ 12/17 (THU) 10:30~15:30
- ☑ 12/18 (FRI) 13:30~15:30
- ☑ 12/21 (MON) 10:00~12:00
- ☑ 12/22 (TUE) 09:30~12:00
- ☑ 12/24 (THU) 13:00~15:00
- ☑ 12/25 (FRI) 10:00~12:00
- ☑ 13:00~17:30

08:00
09:00
10:00
11:00
12:00
13:00
14:00
15:00
16:00
17:00
18:00

MEETING
CANDIDATE
CANDIDATE
TEMPORARILY GOING OUT
CANDIDATE

ADD ADJUSTMENT CONDITION

ALL TIME/DATES ARE INCONVENIENT

CONFIRMATION SCREEN

TIME/DATE ADJUSTMENT APPARATUS, TIME/DATE ADJUSTMENT METHOD, AND NON-TRANSITORY COMPUTER-READABLE STORAGE MEDIUM THEREFOR

TECHNICAL FIELD

The present invention relates to a time/date adjustment apparatus, a time/date adjustment method, and a program. The present invention claims priority based on Japanese Patent Application No. 2021-046720 filed on Mar. 21, 2021, the contents of which are incorporated herein by reference for designated states where incorporation of literature by reference is permitted.

BACKGROUND ART

Conventionally, adjustment of a time/date (time and date) of an assembly in business requires a large number of steps such as checking of a schedule of each participant and securing a site, and is therefore considerably bothersome work taking time and efforts.

Note that, regarding checking of schedules of participants, it is considered that a calendar tool is referred to, as many businesspersons manage their plans using a calendar tool provided on the Internet in recent years.

Regarding the calendar tool, for example, PTL 1 provides the following description: "a schedule information sharing method including the steps of: performing membership application registration by each of a plurality of applicants and a plurality of users, the plurality of applicants applying for distribution of schedule information, the plurality of users using the schedule information of the distribution, the plurality of applicants and the plurality of users each being a member of a system that distributes and shares the schedule information via the Internet; executing by a scheduler performing schedule management below; disclosing and distributing, by the applicant, the schedule information to the user; registering, by the user, a target desiring distribution of the disclosed schedule information; and based on a registered desired distribution target of the user, synchronizing and presetting the schedule information related thereto to a calendar of all of user terminals."

CITATION LIST

Patent Literature

PTL 1: JP 2019-219831 A

SUMMARY OF INVENTION

Technical Problem

In a technique described in PTL 1, a plurality of users being members of a system can share schedule information with each other, and use the schedule information for adjustment of a time/date of an assembly. However, even if the system is used, schedules of participants in a meeting or the like may be updated and changed from moment to moment. When a non-member of the system is included in the participants in the assembly, a schedule of the non-member needs to be individually checked, which makes it difficult to perform adjustment of a time/date of the assembly without causing an overlap between existing plans of each of the participants and time at which the assembly is held, in other words, without causing a double booking.

When there are a plurality of partners to participate in the assembly, in particular, it is considerably difficult to perform adjustment of a time/date of the assembly without causing a double booking.

The present invention is made in view of such circumstances as described above, and has an object to allow adjustment of a time/date of an assembly to be easily performed without causing a double booking, even when there are a plurality of partners to participate in the assembly.

Solution to Problem

The present application includes a plurality of solutions to at least a part of the problems described above, examples of which are described as follows.

In order to solve the problems described above, a time/date adjustment apparatus according to one aspect of the present invention includes: an adjustment condition setting unit configured to set an adjustment condition related to an assembly; and a time/date adjustment unit configured to adjust an assembly time/date based on the adjustment condition. The adjustment condition setting unit causes a first terminal apparatus used by an adjustment initiator to display a condition setting screen for setting the adjustment condition, and sets number of a plurality of adjustment partners and the adjustment condition including designation of a participant on a side of the adjustment initiator based on an input of the adjustment initiator on the condition setting screen. The time/date adjustment unit determines second candidate time/dates based on the input of the adjustment initiator. The time/date adjustment unit issues access information for a time/date adjustment screen. Based on one of the plurality of adjustment partners being an intermediate inputter performing access based on the access information, the time/date adjustment unit refers to schedule information of the participant on the side of the adjustment initiator managed by an external system, and extracts third candidate time/dates that are available time/dates of the participant on the side of the adjustment initiator satisfying the adjustment condition of the adjustment initiator and are within a range of the second candidate time/dates. The time/date adjustment unit causes a second terminal apparatus used by the intermediate inputter to display the time/date adjustment screen for the intermediate inputter presenting the extracted third candidate time/dates, and determines fourth candidate time/dates based on an input operation of the intermediate inputter on the time/date adjustment screen for the intermediate inputter. Based on one of the plurality of adjustment partners being a final inputter performing access based on the access information, the time/date adjustment unit refers to the schedule information of the participant on the side of the adjustment initiator, and extracts fifth candidate time/dates that are available time/dates of the participant on the side of the adjustment initiator satisfying the adjustment condition of the adjustment initiator and are within a common range of all of the fourth candidate time/dates. The time/date adjustment unit causes a third terminal apparatus used by the final inputter to display the time/date adjustment screen for the final inputter presenting the extracted fifth candidate time/dates, and determines the assembly time/date out of the extracted fifth candidate time/dates based on a selection operation of the final inputter on the time/date adjustment screen for the final inputter. The time/date adjustment unit registers the determined assembly time/date in the schedule information of the participant on the side of the adjustment initiator managed by the external system.

The time/date adjustment unit can determine whether the one of the plurality of adjustment partners performing access is the intermediate inputter or the final inputter, based on order of the access based on the access information.

The time/date adjustment unit can transmit the access information to the adjustment initiator or the final inputter, based on finish of input of all of the intermediate inputters on the time/date adjustment screen for the intermediate inputter.

The time/date adjustment unit can issue different pieces of the access information for the plurality of adjustment partners.

A time/date adjustment apparatus according to another aspect of the present invention includes: an adjustment condition setting unit configured to set an adjustment condition related to an assembly; and a time/date adjustment unit configured to adjust an assembly time/date based on the adjustment condition. The adjustment condition setting unit causes a first terminal apparatus used by an adjustment initiator to display a condition setting screen for setting the adjustment condition, and sets the adjustment condition including designation of a participant on a side of the adjustment initiator, based on an input of the adjustment initiator on the condition setting screen. The time/date adjustment unit determines second candidate time/dates based on the input of the adjustment initiator. The time/date adjustment unit issues access information for a time/date adjustment screen. Based on an adjustment partner being an intermediate inputter performing access based on the access information, the time/date adjustment unit refers to schedule information of the participant on the side of the adjustment initiator managed by an external system, and extracts third candidate time/dates that are available time/dates of the participant on the side of the adjustment initiator satisfying the adjustment condition of the adjustment initiator and are within a range of the second candidate time/dates. The time/date adjustment unit causes a second terminal apparatus used by the adjustment partner to display the time/date adjustment screen for the intermediate inputter presenting the extracted third candidate time/dates, and determines fourth candidate time/dates based on an input operation of the adjustment partner on the time/date adjustment screen for the intermediate inputter. Based on finish of the input operation of the adjustment partner on the time/date adjustment screen for the intermediate inputter, the time/date adjustment unit notifies the adjustment initiator that the input operation of the adjustment partner on the time/date adjustment screen for the intermediate inputter has finished. Based on the adjustment initiator performing access based on the access information, the time/date adjustment unit refers to the schedule information of the participant on the side of the adjustment initiator, and extracts fifth candidate time/dates that are available time/dates of the participant on the side of the adjustment initiator satisfying the adjustment condition of the adjustment initiator and are within the range of the second candidate time/dates. The time/date adjustment unit causes the first terminal apparatus to display the time/date adjustment screen for a final inputter presenting both of all of the fourth candidate time/dates and the fifth candidate time/dates, and determines the assembly time/date out of the fifth candidate time/dates based on a selection operation of the adjustment initiator on the time/date adjustment screen for the final inputter. The time/date adjustment unit registers the determined assembly time/date in the schedule information of the participant on the side of the adjustment initiator managed by the external system.

The time/date adjustment unit can issue a common piece of the access information for a plurality of the adjustment partners.

The adjustment condition setting unit can set number of a plurality of the adjustment partners, based on the input of the adjustment initiator on the condition setting screen. Based on finish of the input operation of all of the plurality of the adjustment partners on the time/date adjustment screen for the intermediate inputter, the time/date adjustment unit can notify the adjustment initiator that the input operation of all of the plurality of the adjustment partners on the time/date adjustment screen for the intermediate inputter has finished.

The time/date adjustment unit can refer to the schedule information of the participant on the side of the adjustment initiator managed by the external system, and extract available time/dates of the participant on the side of the adjustment initiator satisfying the adjustment condition of the adjustment initiator as first candidate time/dates. The time/date adjustment unit can cause the first terminal apparatus to display a time/date editing screen for editing the extracted first candidate time/dates, and determine the second candidate time/dates edited based on the input of the adjustment initiator on the time/date editing screen.

When the adjustment partner performing access is a first intermediate inputter, the time/date adjustment unit can refer to the schedule information of the participant on the side of the adjustment initiator, and extract the third candidate time/dates that are the available time/dates of the participant on the side of the adjustment initiator satisfying the adjustment condition of the adjustment initiator and are within the range of the second candidate time/dates. When the adjustment partner performing access is a second or subsequent intermediate inputter, the time/date adjustment unit can refer to the schedule information of the participant on the side of the adjustment initiator, and extract the third candidate time/dates that are the available time/dates of the participant on the side of the adjustment initiator satisfying the adjustment condition of the adjustment initiator and are within a common range of all of the fourth candidate time/dates determined in advance based on the input operation of other intermediate inputters.

The time/date adjustment unit can transmit a notification indicating the determined assembly time/date to the adjustment partner.

The time/date adjustment unit can exclude time/dates based on an exclusion operation of the intermediate inputter on the time/date adjustment screen for the intermediate inputter from the third candidate time/dates, and thereby determine the fourth candidate time/dates.

When the intermediate inputter is a user of the time/date adjustment apparatus, the intermediate inputter being the user is allowed to set the adjustment condition including designation of a participant on a side of the intermediate inputter. When the adjustment condition of the intermediate inputter is set, the time/date adjustment unit can refer to the schedule information of the participant on the side of the intermediate inputter managed by the external system, reflect available time/dates of the participant on the side of the intermediate inputter satisfying the adjustment condition of the intermediate inputter, and extract the third candidate time/dates and the fifth candidate time/dates.

The participant on the side of the adjustment initiator can be the adjustment initiator, or a belonging member belonging to an organization same as the adjustment initiator, the belonging member being other than the adjustment initiator.

When a plurality of the participants on the side of the adjustment initiator are designated as the adjustment condition of the adjustment initiator, the time/date adjustment unit can extract the third candidate time/dates and the fifth candidate time/dates that satisfy being the available time/dates of all of the plurality of the participants on the side of the adjustment initiator.

When a plurality of the participants on the side of the adjustment initiator are designated as the adjustment condition of the adjustment initiator, the time/date adjustment unit can extract the third candidate time/dates and the fifth candidate time/dates that satisfy being the available time/dates of at least one of the plurality of the participants on the side of the adjustment initiator.

The adjustment condition setting unit can set number of the participants on the side of the adjustment initiator to 0. When the number of the participants on the side of the adjustment initiator is set to 0, the time/date adjustment unit can extract the third candidate time/dates and the fifth candidate time/dates without reflecting the available time/dates of the participants on the side of the adjustment initiator.

When a site to be used for the assembly on the side of the adjustment initiator is designated as the adjustment condition of the adjustment initiator, the time/date adjustment unit can refer to the schedule information of the site managed by the external system, and extract the third candidate time/dates and the fifth candidate time/dates that satisfy being available time/dates of the site on the side of the adjustment initiator.

A time/date adjustment method according to yet another aspect of the present invention includes: an adjustment condition setting step of setting an adjustment condition related to an assembly; and a time/date adjustment step of adjusting an assembly time/date based on the adjustment condition. The adjustment condition setting step includes causing a first terminal apparatus used by an adjustment initiator to display a condition setting screen for setting the adjustment condition, and setting number of a plurality of adjustment partners and the adjustment condition including designation of a participant on a side of the adjustment initiator based on an input of the adjustment initiator on the condition setting screen. The time/date adjustment step includes determining second candidate time/dates based on the input of the adjustment initiator. The time/date adjustment step includes issuing access information for a time/date adjustment screen. Based on one of the plurality of adjustment partners being an intermediate inputter performing access based on the access information, the time/date adjustment step includes referring to schedule information of the participant on the side of the adjustment initiator managed by an external system, and extracting third candidate time/dates that are available time/dates of the participant on the side of the adjustment initiator satisfying the adjustment condition of the adjustment initiator and are within a range of the second candidate time/dates. The time/date adjustment step includes causing a second terminal apparatus used by the intermediate inputter to display the time/date adjustment screen for the intermediate inputter presenting the extracted third candidate time/dates, and determining fourth candidate time/dates based on an input operation of the intermediate inputter on the time/date adjustment screen for the intermediate inputter. Based on one of the plurality of adjustment partners being a final inputter performing access based on the access information, the time/date adjustment step includes referring to the schedule information of the participant on the side of the adjustment initiator, and extracting fifth candidate time/dates that are available time/dates of the participant on the side of the adjustment initiator satisfying the adjustment condition of the adjustment initiator and are within a common range of all of the fourth candidate time/dates. The time/date adjustment step includes causing a third terminal apparatus used by the final inputter to display the time/date adjustment screen for the final inputter presenting the extracted fifth candidate time/dates, and determining the assembly time/date out of the extracted fifth candidate time/dates based on a selection operation of the final inputter on the time/date adjustment screen for the final inputter. The time/date adjustment step includes registering the determined assembly time/date in the schedule information of the participant on the side of the adjustment initiator managed by the external system.

A program according to yet another aspect of the present invention causes a computer to function as: an adjustment condition setting unit configured to set an adjustment condition related to an assembly; and a time/date adjustment unit configured to adjust an assembly time/date based on the adjustment condition. The adjustment condition setting unit causes a first terminal apparatus used by an adjustment initiator to display a condition setting screen for setting the adjustment condition, and sets number of a plurality of adjustment partners and the adjustment condition including designation of a participant on a side of the adjustment initiator based on an input of the adjustment initiator on the condition setting screen. The time/date adjustment unit determines second candidate time/dates based on the input of the adjustment initiator. The time/date adjustment unit issues access information for a time/date adjustment screen. Based on one of the plurality of adjustment partners being an intermediate inputter performing access based on the access information, the time/date adjustment unit refers to schedule information of the participant on the side of the adjustment initiator managed by an external system, and extracts third candidate time/dates that are available time/dates of the participant on the side of the adjustment initiator satisfying the adjustment condition of the adjustment initiator and are within a range of the second candidate time/dates. The time/date adjustment unit causes a second terminal apparatus used by the intermediate inputter to display the time/date adjustment screen for the intermediate inputter presenting the extracted third candidate time/dates, and determines fourth candidate time/dates based on an input operation of the intermediate inputter on the time/date adjustment screen for the intermediate inputter. Based on one of the plurality of adjustment partners being a final inputter performing access based on the access information, the time/date adjustment unit refers to the schedule information of the participant on the side of the adjustment initiator, and extracts fifth candidate time/dates that are available time/dates of the participant on the side of the adjustment initiator satisfying the adjustment condition of the adjustment initiator and are within a common range of all of the fourth candidate time/dates. The time/date adjustment unit causes a third terminal apparatus used by the final inputter to display the time/date adjustment screen for the final inputter presenting the extracted fifth candidate time/dates, and determines the assembly time/date out of the extracted fifth candidate time/dates based on a selection operation of the final inputter on the time/date adjustment screen for the final inputter. The time/date adjustment unit registers the determined assembly time/date in the schedule information of the participant on the side of the adjustment initiator managed by the external system.

A time/date adjustment method according to yet another aspect of the present invention includes: an adjustment condition setting step of setting an adjustment condition related to an assembly; and a time/date adjustment step of adjusting an assembly time/date based on the adjustment condition. The adjustment condition setting step includes causing a first terminal apparatus used by an adjustment initiator to display a condition setting screen for setting the adjustment condition, and setting the adjustment condition including designation of a participant on a side of the adjustment initiator, based on an input of the adjustment initiator on the condition setting screen. The time/date adjustment step includes determining second candidate time/dates based on the input of the adjustment initiator. The time/date adjustment step includes issuing access information for a time/date adjustment screen. Based on an adjustment partner being an intermediate inputter performing access based on the access information, the time/date adjustment step includes referring to schedule information of the participant on the side of the adjustment initiator managed by an external system, and extracting third candidate time/dates that are available time/dates of the participant on the side of the adjustment initiator satisfying the adjustment condition of the adjustment initiator and are within a range of the second candidate time/dates. The time/date adjustment step includes causing a second terminal apparatus used by the adjustment partner to display the time/date adjustment screen for the intermediate inputter presenting the extracted third candidate time/dates, and determining fourth candidate time/dates based on an input operation of the adjustment partner on the time/date adjustment screen for the intermediate inputter. Based on finish of the input operation of the adjustment partner on the time/date adjustment screen for the intermediate inputter, the time/date adjustment step includes notifying the adjustment initiator that the input operation of the adjustment partner on the time/date adjustment screen for the intermediate inputter has finished. Based on the adjustment initiator performing access based on the access information, the time/date adjustment step includes referring to the schedule information of the participant on the side of the adjustment initiator, and extracting fifth candidate time/dates that are available time/dates of the participant on the side of the adjustment initiator satisfying the adjustment condition of the adjustment initiator and are within the range of the second candidate time/dates. The time/date adjustment step includes causing the first terminal apparatus to display the time/date adjustment screen for a final inputter presenting both of all of the fourth candidate time/dates and the fifth candidate time/dates, and determining the assembly time/date out of the fifth candidate time/dates based on a selection operation of the adjustment initiator on the time/date adjustment screen for the final inputter. The time/date adjustment step includes registering the determined assembly time/date in the schedule information of the participant on the side of the adjustment initiator managed by the external system.

A program according to yet another aspect of the present invention causes a computer to function as: an adjustment condition setting unit configured to set an adjustment condition related to an assembly; and a time/date adjustment unit configured to adjust an assembly time/date based on the adjustment condition. The adjustment condition setting unit causes a first terminal apparatus used by an adjustment initiator to display a condition setting screen for setting the adjustment condition, and sets the adjustment condition including designation of a participant on a side of the adjustment initiator, based on an input of the adjustment initiator on the condition setting screen. The time/date adjustment unit determines second candidate time/dates based on the input of the adjustment initiator. The time/date adjustment unit issues access information for a time/date adjustment screen. Based on an adjustment partner being an intermediate inputter performing access based on the access information, the time/date adjustment unit refers to schedule information of the participant on the side of the adjustment initiator managed by an external system, and extracts third candidate time/dates that are available time/dates of the participant on the side of the adjustment initiator satisfying the adjustment condition of the adjustment initiator and are within a range of the second candidate time/dates. The time/date adjustment unit causes a second terminal apparatus used by the adjustment partner to display the time/date adjustment screen for the intermediate inputter presenting the extracted third candidate time/dates, and determines fourth candidate time/dates based on an input operation of the adjustment partner on the time/date adjustment screen for the intermediate inputter. Based on finish of the input operation of the adjustment partner on the time/date adjustment screen for the intermediate inputter, the time/date adjustment unit notifies the adjustment initiator that the input operation of the adjustment partner on the time/date adjustment screen for the intermediate inputter has finished. Based on the adjustment initiator performing access based on the access information, the time/date adjustment unit refers to the schedule information of the participant on the side of the adjustment initiator, and extracts fifth candidate time/dates that are available time/dates of the participant on the side of the adjustment initiator satisfying the adjustment condition of the adjustment initiator and are within the range of the second candidate time/dates. The time/date adjustment unit causes the first terminal apparatus to display the time/date adjustment screen for a final inputter presenting both of all of the fourth candidate time/dates and the fifth candidate time/dates, and determines the assembly time/date out of the fifth candidate time/dates based on a selection operation of the adjustment initiator on the time/date adjustment screen for the final inputter. The time/date adjustment unit registers the determined assembly time/date in the schedule information of the participant on the side of the adjustment initiator managed by the external system.

Advantageous Effects of Invention

According to the present invention, adjustment of a time/date of an assembly can be easily performed without causing a double booking, even when there are a plurality of partners to participate in the assembly.

Problems, configurations, and effects other than those described above will become apparent in the following description of embodiments.

BRIEF DESCRIPTION OF DRAWINGS

FIG. 2 is a diagram illustrating an example of member information and user information.

FIG. 3 is a diagram illustrating an example of time/date adjustment information.

FIG. 21 is a diagram illustrating a display example of the time/date adjustment screen (for an intermediate inputter), which corresponds to a case in which the adjustment partner is a user.

FIG. 22 is a diagram illustrating a display example of the time/date adjustment screen (for an intermediate inputter), which corresponds to a case in which the adjustment partner is a user.

DESCRIPTION OF EMBODIMENTS

One embodiment according to the present invention will be described below with reference to the drawings. Note that, in all the drawings for describing one embodiment, the same members are denoted by the same reference signs in principle, and repeated description thereof will be omitted. It goes without saying that, in the following embodiment, constituent elements (including element steps and the like) thereof are not necessarily essential, except for a case in which there is particular and explicit description, a case in which it is considered that those are obviously essential in principle, and the like. Concerning descriptions "to consist of A", "to be composed of A", "to have A", and "to include A", it goes without saying that, except for a case in which there is particular and explicit description that only the element is provided, and the like, elements other than the element are not to be excluded. Similarly, in the following embodiment, when there is a reference to a shape, a positional relationship, and the like of a constituent element and the like, a shape and the like that are substantially close to or similar to those shape and the like are included, except for a case in which there is particular and explicit description, a case in which it is considered that those are not obviously true in principle, and the like.

<Time/Date Adjustment System 10 according to One Embodiment of Present Invention>

Figure 1:
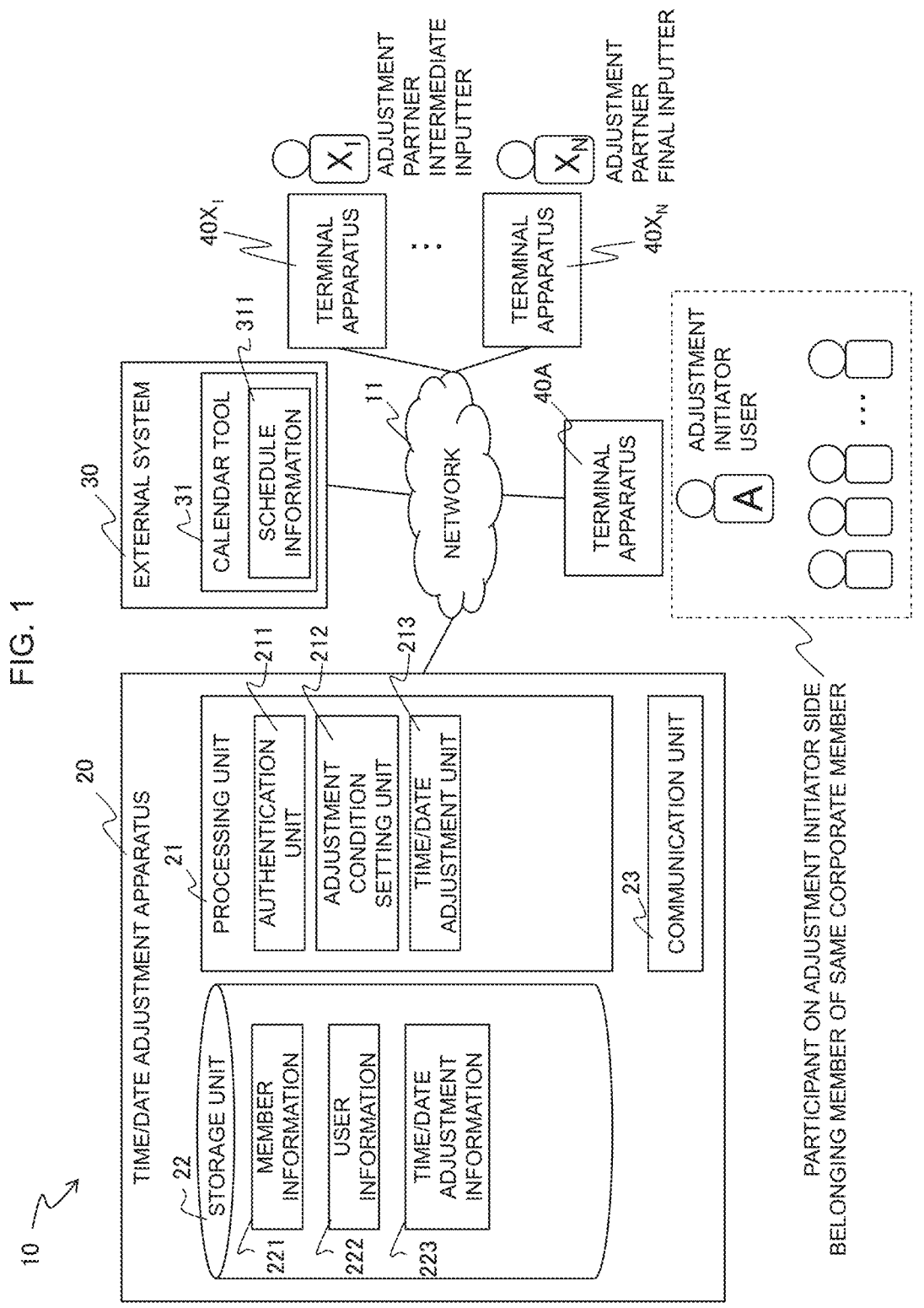
FIG. 1 is a diagram illustrating a configuration example of a time/date adjustment system according to one embodiment of the present invention.

FIG. 1 illustrates a configuration example of a time/date adjustment system 10 according to one embodiment of the present invention.

The time/date adjustment system 10 is for assisting adjustment of a time/date of an assembly. The time/date adjustment system 10 includes a time/date adjustment apparatus 20, an external system 30, and terminal apparatuses 40A and $40X_1$ to $40X_N$ (N is an integer of 2 or greater), which are connected via a network 11.

The network 11 is a two-way communication network, as typified by the Internet, a mobile phone communication network, and the like.

The time/date adjustment apparatus 20 performs adjustment of a time/date of an assembly with adjustment partners $X_1$ to $X_N$, in response to a request from an adjustment initiator A. Note that, as participants to participate in an assembly, the adjustment initiator A, a belonging member of an organization (a corporate member to be described below) such as a company to which the adjustment initiator A belongs, the adjustment partners $X_1$ to $X_N$, and a belonging member of an organization such as a company to which the adjustment partners $X_1$ to $X_N$ belong are assumed.

The external system 30 refers to a system that widely provides a calendar tool 31 as a web application for general consumers, corporations, and the like with or without a charge. As the calendar tool 31, for example, Google Calendar (trademark) and Microsoft Outlook (trademark) can be employed. The calendar tool 31 stores schedule information 311, in which action plans of a user of the calendar tool 31 and a booking status of assembly sites available to the user are registered.

The terminal apparatus 40A used by the adjustment initiator A includes a general computer, such as a personal computer and a smartphone, that can connect to the time/date adjustment apparatus 20 via the network 11. The terminal apparatus 40A corresponds to a first terminal apparatus of the present invention.

Similarly, the terminal apparatuses $40X_1$ to $40X_N$ respectively used by the adjustment partners $X_1$ to $X_N$ each include a general computer. When the adjustment partners $X_1$ to $X_N$ and the terminal apparatuses $40X_1$ to $40X_N$ need not be individually distinguished from each other, the adjustment partners $X_1$ to $X_N$ and the terminal apparatuses $40X_1$ to $40X_N$ are hereinafter simply referred to as the adjustment partner (s) X and the terminal apparatus (es) 40X. Note that the terminal apparatus 40X used by an intermediate inputter (described below) among the adjustment partners X corresponds to a second terminal apparatus of the present invention, and the terminal apparatus 40X used by a final inputter (described below) thereamong corresponds to a third terminal apparatus of the present invention.

Regarding the intermediate inputter and the final inputter, in a case of an operation example corresponding to pattern α and an operation example corresponding to pattern β to be described below, the intermediate inputter refers to an adjustment partner X among N adjustment partners X whose order of checking and operating candidate time/dates of an assembly presented by the adjustment initiator A side is first to (N−1)-th. The intermediate inputter can exclude time/dates inconvenient for the intermediate inputter from the candidate time/dates of the assembly based on convenience on the adjustment initiator A side. The final inputter refers to an adjustment partner X whose order of checking and operating the candidate time/dates of the assembly presented by the adjustment initiator A side is N-th (last). The final inputter can select and confirm a time/date for holding the assembly out of the candidate time/dates of the assembly based on convenience on the adjustment initiator A side and convenience of the intermediate inputter.

In a case of an operation example corresponding to pattern γ to be described below, all of the adjustment partners X serve as the intermediate inputters, and the adjustment initiator A serves as the final inputter.

Note that, in the present embodiment, the adjustment partner X themselves to participate in an assembly operates the terminal apparatus 40X; however, in actuality, a representative (a secretary or the like) of the adjustment partner X may operate the terminal apparatus 40X.

The adjustment initiator A is a belonging member of a company or the like that has conducted use registration with the time/date adjustment apparatus 20. The company or the like that has conducted use registration with the time/date adjustment apparatus 20 is hereinafter referred to as a corporate member. Among belonging members (employees and the like of the company or the like being the corporate member) belonging to the corporate member (company or the like), a belonging member having a user account of the time/date adjustment apparatus 20 is defined as a user. It is essential that the adjustment initiator A be a user. Thus, the adjustment initiator A is hereinafter also referred to as a user A. A belonging member belonging to the same corporate member as the adjustment initiator A other than the adjustment initiator A may be a user, but this is not essential. Note that an individual, not a company or the like, can also conduct use registration with the time/date adjustment apparatus 20, and in that case, the individual who has conducted use registration is referred to as an individual member, and the individual member and the user can be regarded as the same. Further, in a case of an individual member, an administrator account, administrator authentication information, and basic information of member information 221 to be described below are common to a user account, user authentication information, and user basic information of user information 222 to be described below, and belonging member information and site information of the member information 221 to be described below can be omitted.

Belonging members belonging to the corporate member of the time/date adjustment apparatus 20 manage their plans, using the calendar tool 31 provided by the external system 30. The corporate member of the time/date adjustment apparatus 20 may manage the booking status of a meeting room, a reception room, a spare room, and the like available to the belonging members as an assembly site, using the calendar tool 31 provided by the external system 30.

Thus, in the present case, the calendar tool 31 stores the schedule information 311 in which each of plans of the adjustment initiator A and the like who may be participants of an assembly and the booking status of assembly sites available to the adjustment initiator A and the like is registered.

Note that the adjustment partner X may be a user of the time/date adjustment apparatus 20, but this is not essential. The following description will be given based on an assumption that the adjustment partner X is not a user. A case in which the adjustment partner X is a user will be described below.

The adjustment partner X may use the calendar tool 31, but this is not essential. The adjustment partner X may use a calendar tool provided by a vendor different from a vendor of the calendar tool 31 used by the adjustment initiator A.

The time/date adjustment apparatus 20 includes functional blocks of a processing unit 21, a storage unit 22, and a communication unit 23. The time/date adjustment apparatus 20 includes a general computer such as a server computer including a processor such as a central processing unit (CPU), a memory such as a dynamic random access memory (DRAM), a storage such as a hard disk drive (HDD) and a solid state drive (SSD), an input device such as a keyboard, a mouse, and a touch panel, an output device such as a display, and a communication module such as a network interface card (NIC) (all of which are not illustrated).

The processing unit 21 is implemented by the processor of the computer. The processing unit 21 includes functional blocks of an authentication unit 211, an adjustment condition setting unit 212, and a time/date adjustment unit 213. These functional blocks are implemented by the processor of the computer executing a predetermined program loaded in the memory. Note that a part or all of these functional blocks may be implemented as hardware by an integrated circuit or the like.

The authentication unit 211 accesses the external system 30 via the network 11, and for example, performs authentication processing in accordance with a protocol such as OAuth, using a user account (FIG. 2) included in user information 222 corresponding to the adjustment initiator (user) A stored by the storage unit 22. Note that the user account may be used in first authentication processing, and in second and following authentication processing, user authentication information (an access token or the like) (FIG. 2) transmitted from the external system 30 after the first authentication processing has ended can be used.

Note that, after the authentication unit 211 has completed the authentication processing of the adjustment initiator A, for example, the time/date adjustment unit 213 can refer to and update the schedule information 311 in which plans of the adjustment initiator A and the belonging member belonging to the same corporate member as the adjustment initiator A are registered and the schedule information 311 in which plans of assembly sites (a meeting room and the like) available to the adjustment initiator A and the belonging member belonging to the same corporate member as the adjustment initiator A are registered, which are stored in the calendar tool 31, via a web application programming interface (API).

The adjustment condition setting unit 212 causes the terminal apparatus 40A to display a condition setting screen for setting an adjustment condition including a plurality of items necessary for adjustment of a time/date of an assembly, sets the adjustment condition in response to an input from the adjustment initiator A on the condition setting screen, and registers results in time/date adjustment information 223 corresponding to the adjustment initiator A, stored in the storage unit 22. The items of the adjustment condition will be described below with reference to FIG. 5 and FIG. 6.

As operations common to pattern α, pattern β, and pattern Y to be described below, the time/date adjustment unit 213 refers to the schedule information 311 of the participants on the adjustment initiator A side (which may or may not include the adjustment initiator A) managed by the calendar tool 31, and extracts first candidate time/dates that are available time/dates with no plans of the participants on the adjustment initiator A side and satisfy the set adjustment condition. Then, the time/date adjustment unit 213 causes the terminal apparatus 40A to display a time/date editing screen for editing the first candidate time/dates, and determines second candidate time/dates in response to an editing operation from the adjustment initiator A on the time/date editing screen.

Note that, as a modification, instead of determining the second candidate time/dates by editing the first candidate time/dates, extraction of the first candidate time/dates may be omitted, and for example, the adjustment initiator A may select dates and time and thereby determine the second candidate time/dates in the calendar on a predetermined screen that the time/date adjustment unit 213 causes the terminal apparatus 40A to display.

The time/date adjustment unit 213 registers the second candidate time/dates in adjustment initiator information 2231 (FIG. 3) of the time/date adjustment information 223 corresponding to the adjustment initiator A. When the first candidate time/dates are not edited by the adjustment initiator A, the second candidate time/dates are the same as the first candidate time/dates.

The time/date adjustment unit 213 issues an adjustment Uniform Resource Locator (URL) for the adjustment partner X to access a time/date adjustment screen. Specifically, in a case of pattern α or pattern β, the time/date adjustment unit 213 issues different adjustment URLs for respective adjustment partners X, creates as many pieces of adjustment partner information 2232 (FIG. 3) as the number of adjustment partners X at the timing of issuing the adjustment URLs, and registers the issued adjustment URLs. Note that a common adjustment URL may be issued for the respective adjustment partners X. The plurality of adjustment partners X may be classified into groups, and a common adjustment URL may be issued for each of the groups.

In a case of pattern γ, it is desirable that a time/date can be adjusted even if the number of adjustment partners X has not been confirmed yet, and thus the time/date adjustment unit 213 issues a common adjustment URL to be used by the plurality of adjustment partners X. The common adjustment URL is registered in adjustment basic information 2233 (FIG. 3). Note that a different adjustment URL may be issued for each adjustment partner X, on an assumption that the number of adjustment partners X is confirmed at the time when adjustment is started. In a case of pattern γ, the time/date adjustment unit 213 issues an adjustment URL for the final inputter, which is different from the common adjustment URL for the adjustment partners X. Note that the common adjustment URL for the adjustment partners X and the adjustment URL for the final inputter may be common. Note that, in a case of pattern γ, the final inputter is the adjustment initiator A, and thus the adjustment URL for the final inputter is registered in the adjustment initiator information 2231 (FIG. 3).

The time/date adjustment unit 213 may issue the adjustment URL as text, or may issue the adjustment URL as an image such as a QR code. The issued adjustment URL is transmitted to each of the adjustment partners X by the adjustment initiator A, using an electronic mail or the like. The adjustment URL corresponds to access information of the present invention.

As operations common to pattern α and pattern β after the adjustment URL is issued, when the adjustment partner X who performs access based on the adjustment URL is the intermediate inputter, the time/date adjustment unit 213 refers to, at that time point, the schedule information 311 of the participants on the adjustment initiator A side being managed by the calendar tool 31 again, and extracts third candidate time/dates that are available time/dates with no plans of the participants on the adjustment initiator A side, satisfy the set adjustment condition, and are within a range of the second candidate time/dates.

Note that, when the adjustment partner X who performs access based on the adjustment URL is the second or subsequent intermediate inputter, the time/date adjustment unit 213 may refer to, at that time point, the schedule information 311 of the participants on the adjustment initiator A side being managed by the calendar tool 31 again, and extract third candidate time/dates that are available time/dates with no plans of the participants on the adjustment initiator A side, satisfy the set adjustment condition, and are within a common range of fourth candidate time/dates of all of the other intermediate inputters having finished input in advance.

In this manner, by extracting the third candidate time/dates again, even if there is a change in the schedule of the participants on the adjustment initiator A side during time from when the adjustment URL is issued to when each adjustment partner X accesses the adjustment URL, occurrence of a double booking due to such a change can be suppressed.

Then, the time/date adjustment unit 213 causes the terminal apparatus 40X of the intermediate inputter to display the time/date adjustment screen for the intermediate inputter presenting the extracted third candidate time/dates. Then, the time/date adjustment unit 213 registers candidate time/dates obtained by the intermediate inputter excluding time/dates inconvenient for the intermediate inputter from the third candidate time/dates displayed on the time/date adjustment screen for the intermediate inputter as fourth candidate time/dates in adjustment partner information 2232A (FIG. 3) corresponding to the intermediate inputter of the time/date adjustment information 223 corresponding to the adjustment initiator A.

Accordingly, in a case of pattern α and pattern β, (N−1) sets of fourth candidate time/dates are present, where (N−1) is a number smaller than the number N of adjustment partners X by 1.

In a case of pattern α and pattern β, when the adjustment partner X who performs access based on the adjustment URL is the final inputter, the time/date adjustment unit 213 refers to, at that time point, the schedule information 311 of the participants on the adjustment initiator A side being managed by the calendar tool 31 again, and extracts available time/dates that are available time/dates with no plans of the participants on the adjustment initiator A side, satisfy the set adjustment condition, and are within a common range of the fourth candidate time/dates of all of the intermediate inputters as fifth candidate time/dates.

Then, in a case of pattern α and pattern β, the time/date adjustment unit 213 causes the terminal apparatus 40X of the final inputter to display the time/date adjustment screen for the final inputter presenting the extracted fifth candidate time/dates. Then, the time/date adjustment unit 213 registers an assembly time/date selected by the final inputter out of the fifth candidate time/dates displayed on the time/date adjustment screen for the final inputter and confirmed on a time/date confirmation screen in the schedule information 311 of the participants on the adjustment initiator A side managed by the calendar tool 31, and registers the assembly time/date in the adjustment basic information 2233 (FIG. 3) of the time/date adjustment information 223 corresponding to the adjustment initiator A stored by the storage unit 22. Moreover, the time/date adjustment unit 213 transmits a notification email for giving notification of the confirmed assembly time/date to the adjustment partners X, at timing designated by each of the adjustment partners X. Note that the notification email may not be transmitted to the adjustment partner X who has confirmed the assembly time/date as the final inputter.

Note that, in a case of pattern α and pattern β, the schedule of the participants on the adjustment initiator A side may change even during a short period of time until the final inputter selects the assembly time/date out of the fifth candidate time/dates displayed on the time/date adjustment screen for the final inputter and confirms the assembly time/date on the confirmation screen. Thus, the time/date adjustment unit 213 performs final check that the selected assembly time/date is an available time/date of the participants on the adjustment initiator A side and satisfies the adjustment condition, immediately before the assembly time/date is confirmed on the time/date confirmation screen. Then, when the selected assembly time/date no longer satisfies the adjustment condition or is no longer an available time/date, for example, a message such as "The designated time has been occupied. Select again" may be displayed on the terminal apparatus 40X of the final inputter, and the operation may be returned back to the time/date adjustment screen for the final inputter. With this configuration, occurrence of a double booking can be further suppressed.

As an operation of pattern γ after the adjustment URL is issued, the time/date adjustment unit 213 considers that all of the adjustment partners X who perform access are the intermediate inputters, refers to, at that time point, the schedule information 311 of the participants on the adjustment initiator A side being managed by the calendar tool 31 again, and extracts third candidate time/dates that are available time/dates with no plans of the participants on the adjustment initiator A side, satisfy the set adjustment condition, and are within a range of the second candidate time/dates. Then, when the time/date adjustment unit 213 causes the terminal apparatus 40X of each intermediate inputter to display the time/date adjustment screen for the intermediate inputter presenting the extracted third candidate time/dates and thereby have the intermediate inputter perform an operation of excluding time/dates inconvenient for the intermediate inputter from the third candidate time/dates displayed on the time/date adjustment screen, the time/date adjustment unit 213 creates the adjustment partner information 2232A (FIG. 3) corresponding to the intermediate inputter in the time/date adjustment information 223 corresponding to the adjustment initiator A, and registers the accessed common adjustment URL and fourth candidate time/dates obtained by the intermediate inputter excluding time/dates inconvenient for the intermediate inputter from the third candidate time/dates in the created adjustment partner information 2232A. Note that, since the common adjustment URL is already registered in the adjustment basic information 2233, the common adjustment URL need not be registered anew in the adjustment partner information 2232A.

In a case of pattern γ, the adjustment initiator A may designate the number N of adjustment partners X, or may have the number N of adjustment partners X undefined. When the number N of adjustment partners X is designated, at the time point when input of N (or another designated number of) adjustment partners X has finished, the time/date adjustment unit 213 notifies the adjustment initiator A as the final inputter of a message indicating that the input of the N (or another designated number of) adjustment partners X has finished and the adjustment URL for the final inputter. As a modification, every time input of the adjustment partner X exceeding the number N (or another designated number) finishes, a message indicating that the input of the adjustment partner X has been received and the adjustment URL for the final inputter may be notified to the adjustment initiator A as the final inputter. As still another modification, once every predetermined period of time (for example, once a day, once every several hours, once every several days, or the like) or at timing designated by the adjustment initiator A, the number of adjustment partners X who have completed input by that timing is counted, and, for example, a message such as "three persons have completed input" and the adjustment URL for the final inputter may be notified to the adjustment initiator A as the final inputter.

When the number N of adjustment partners X is not designated, every time input of the adjustment partner X finishes, the time/date adjustment unit 213 counts the number of adjustment partners X who have finished input by that time, and notifies the adjustment initiator A as the final inputter of, for example, a message such as "the fourth person has finished input" and the adjustment URL for the final inputter. As a modification, once every predetermined period of time (for example, once a day, once every several hours, once every several days, or the like), the number of adjustment partners X who have finished input within the period of time may be counted, and for example, a message such as "three persons finished input today" and the adjustment URL for the final inputter may be notified to the adjustment initiator A as the final inputter.

Then, when the adjustment initiator A as the final inputter accesses the adjustment URL for the final inputter at timing determined by the adjustment initiator A with reference to the message from the time/date adjustment unit 213, the time/date adjustment unit 213 refers to, at that time point, the schedule information 311 of the participants on the adjustment initiator A side being managed by the calendar tool 31 again, and extracts available time/dates that are available time/dates with no plans of the participants on the adjustment initiator A side, satisfy the set adjustment condition, and are within a range of the second candidate time/dates as the fifth candidate time/dates.

Then, the time/date adjustment unit 213 causes the terminal apparatus 40A of the adjustment initiator A as the final inputter to display the time/date adjustment screen for the final inputter presenting both of the extracted fifth candidate time/dates and the respective fourth candidate time/dates of all of the intermediate inputters (all of the adjustment partners X who have finished input). The adjustment initiator A selects and confirms the assembly time/date out of the fifth candidate time/dates with reference to the fourth candidate time/dates presented on the time/date adjustment screen for the final inputter. Then, the time/date adjustment unit 213 registers the assembly time/date confirmed by the adjustment initiator A in the schedule information 311 of the participants on the adjustment initiator A side managed by the calendar tool 31, and registers the assembly time/date in the adjustment basic information 2233 (FIG. 3) of the time/date adjustment information 223 corresponding to the adjustment initiator A stored by the storage unit 22. Moreover, the time/date adjustment unit 213 notifies all of the adjustment partners X of a notification email for giving notification of the confirmed assembly time/date.

Note that the schedule of the participants on the adjustment initiator A side may change even during a short period of time until the adjustment initiator A as the final inputter selects the assembly time/date on the time/date adjustment screen for the final inputter and confirms the assembly time/date on the confirmation screen. Thus, immediately before the assembly time/date is confirmed on the time/date confirmation screen, the time/date adjustment unit 213 refers to the schedule information 311 of the participants on the adjustment initiator A side managed by the calendar tool 31, reads the fourth candidate time/dates registered in respective pieces of adjustment partner information 2232 of the time/date adjustment information 223 corresponding to the adjustment initiator A from the storage unit 22, and performs final check that the confirmed assembly time/date does not overlap existing plans of the participants on the adjustment initiator A side at the current time point or is out of the range of the fourth candidate time/dates of the adjustment partners X. Then, when the confirmed assembly time/date overlaps existing plans of the participants on the adjustment initiator A side at the current time point or is out of the range of the fourth candidate time/dates of one of the adjustment partners X, for example, notification of a message such as "It is likely that the adjustment partner $X_1$ cannot participate. Is it OK?" or "This is out of the candidates designated by the adjustment partner $X_1$. Is it OK?" is performed. With this configuration, occurrence of a double booking can be suppressed.

The storage unit 22 is implemented by the memory and the storage of the computer. The storage unit 22 stores member information 221, the user information 222, and the time/date adjustment information 223. Note that the storage unit 22 may store information other than the information described above.

The communication unit 23 is implemented by the communication module of the computer. The communication unit 23 connects to the external system 30, the terminal apparatuses 40A and 40X, and the like via the network 11 and communicates various pieces of data and information therewith.

Note that a part or all of the above-described functional blocks constituting the time/date adjustment apparatus 20 may be implemented by hardware such as an integrated circuit. The time/date adjustment apparatus 20 may be implemented by a plurality of computers, and in that case, the above-described functional blocks may be distributedly deployed in the plurality of computers.

Next, FIG. 2 illustrates an example of the member information 221 and the user information 222 stored in the storage unit 22.

The member information 221 includes information related to each member who has conducted use registration with the time/date adjustment apparatus 20. Specifically, in a case of a corporate member, the member information 221 includes an administrator account, administrator authentication information, basic information, belonging member information, and site information.

The administrator account is information for a system administrator or the like of the corporate member (company or the like) to log in to the time/date adjustment apparatus 20. It is desirable that the administrator account be common to an account (for example, an email address of the system administrator or the like) for the system administrator or the like to access the external system 30. The administrator account is recorded at the time of use registration with the time/date adjustment apparatus 20.

The administrator authentication information is an access token or the like that is obtained from the external system 30 as success results of the authentication processing when the authentication unit 211 of the time/date adjustment apparatus 20 performs the authentication processing with the external system 30 for the first time, using the administrator account. After the administrator authentication information is obtained, the authentication unit 211 can more promptly perform the authentication processing with the external system 30 by using the administrator authentication information, without using the administrator account.

The basic information is a name of the corporate member (a company name or the like) or the like. The basic information is recorded at the time of member registration. The belonging member information is a list of names of belonging members belonging to the corporate member (company or the like), user accounts for accessing the external system 30, and the like. The belonging member information may be recorded at the time of use registration, or may be acquired from the external system 30 to be recorded on an assumption that all of the belonging members necessary for time/date adjustment already use the calendar tool 31.

The site information is a list of names of sites, such as a meeting room, a reception room, and a spare room, available to the belonging members belonging to the corporate member for an assembly, identification IDs of the sites in the external system, and the like. The site information may be recorded by the system administrator or the like at the time of use registration, or may be acquired from the external system 30 to be recorded on an assumption that the schedules of all of the sites necessary for time/date adjustment are already managed by the calendar tool 31.

The user information 222 includes information related to a user themselves having a user account of the time/date adjustment apparatus 20 among the belonging members belonging to the corporate member. The user information 222 is created when each user logs in to the time/date adjustment apparatus 20 for the first time, and is associated with the member information 221.

The user information 222 includes a user account, user authentication information, and user basic information.

The user account is information for the user to log in to the time/date adjustment apparatus 20. It is desirable that the user account be common to an account (for example, an email address of the user) for the user to access the external system 30.

The user authentication information is an access token or the like that is obtained from the external system 30 as success results of the authentication processing when the authentication unit 211 performs the authentication processing with the external system 30 for the first time, using the user account. After the user authentication information is obtained, the authentication unit 211 can more promptly perform the authentication processing with the external system 30, using the user authentication information, without using the user account.

The user basic information is a name of the user or the like, and is read from the belonging member information of the member information 221 and is then recorded.

Next, FIG. 3 illustrates an example of the time/date adjustment information 223 stored in the storage unit 22. The time/date adjustment information 223 is created in association with each user for each assembly in which the user is the adjustment initiator (see FIG. 2). The time/date adjustment information 223 includes the adjustment initiator information 2231, at least one form of the adjustment partner information 2232A and adjustment partner information 2232B, adjustment partner information 2232C, and the adjustment basic information 2233.

In the adjustment initiator information 2231, the user account (for identifying the user; an identification ID or the like of the user may be used) of the adjustment initiator A, the adjustment condition set by the adjustment initiator A, the second candidate time/dates, and the like are registered. In the adjustment initiator information 2231, the adjustment URL for the final inputter issued for the adjustment initiator A in a case of pattern γ is registered (not illustrated).

As many pieces of adjustment partner information 2232A to 2232C as the number of adjustment partners X (adjustment partners X who have finished input, in a case of pattern γ) are created, without each piece being distinguished from each other. Then, depending on determination results as to whether or not the adjustment partner X who performs access based on the adjustment URL is the intermediate inputter, the final inputter, or the user, contents to be registered vary. When the pieces of adjustment partner information 2232A to 2232C need not be individually distinguished from each other, the pieces of adjustment partner information 2232A to 2232C are hereinafter referred to as the (pieces of) adjustment partner information 2232.

The adjustment partner information 2232A corresponds to a case in which the adjustment partner X is the intermediate inputter and is not the user. In the adjustment partner information 2232A, the adjustment URL issued for the adjustment partner X, the email address of the adjustment partner X input by the adjustment partner X, the timing of transmitting a notification email designated by the adjustment partner X, the fourth candidate time/dates, and the like are registered.

The adjustment partner information 2232B corresponds to a case in which the adjustment partner X is the intermediate inputter and is the user. In the adjustment partner information 2232B, the adjustment URL issued for the adjustment partner X, the user account (for identifying the user; an identification ID or the like of the user may be used) of the adjustment partner X, the timing of transmitting a notification email designated by the adjustment partner X, the adjustment condition set by the adjustment partner X, the fourth candidate time/dates, and the like are registered.

The adjustment partner information 2232C corresponds to a case in which the adjustment partner X is the final inputter. In the adjustment partner information 2232C, the adjustment URL issued for the adjustment partner X, the email address of the adjustment partner X input by the adjustment partner X, the timing of transmitting a notification email designated by the adjustment partner X, and the like are registered.

In the adjustment basic information 2233, the number of adjustment partners and an adjustment pattern are registered when adjustment of the time/date is started, and the date and time of the assembly and the place thereof are registered when the time/date is confirmed. In the adjustment basic information 2233, the common adjustment URL used by the plurality of adjustment partners X issued in a case of pattern γ is registered.

<Time/Date Adjustment Processing Performed by Time/Date Adjustment System 10>

Figure 4:
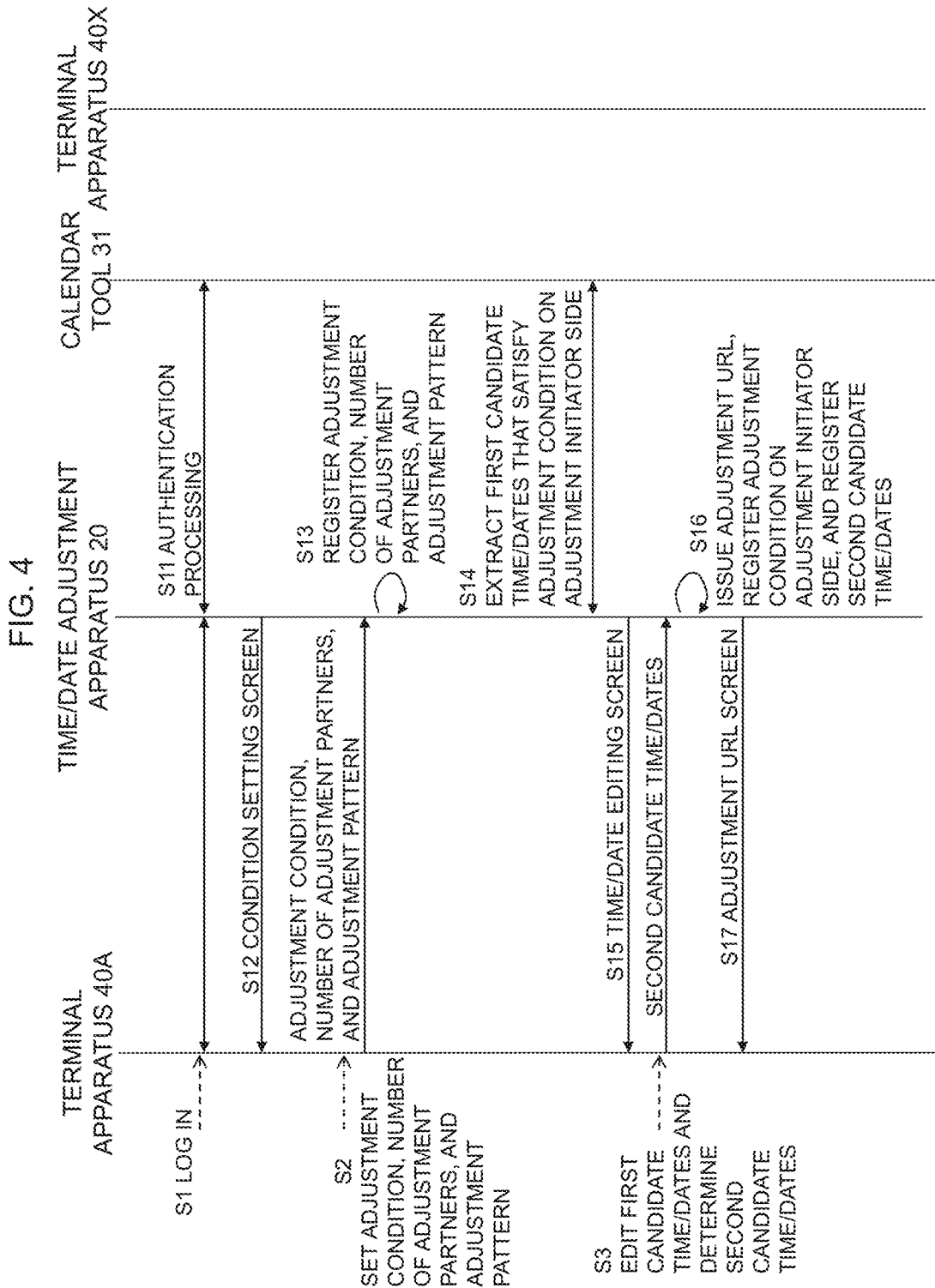
FIG. 4 is a sequence diagram for illustrating an example (common to patterns α, β, and γ) of time/date adjustment processing performed by the time/date adjustment system.

Next, FIG. 4 is a sequence diagram for illustrating an example of time/date adjustment processing performed by the time/date adjustment system 10.

First of all, the adjustment initiator A logs in to the time/date adjustment apparatus 20 via the network 11, using the terminal apparatus 40A (Step S1). Then, in response to the login of the adjustment initiator A, the authentication unit 211 of the time/date adjustment apparatus 20 performs the authentication processing with the external system 30, using the user account or the user authentication information (access token or the like) included in the user information 222 corresponding to the adjustment initiator A stored by the storage unit 22 (Step S11).

Next, the adjustment condition setting unit 212 of the time/date adjustment apparatus 20 causes the terminal apparatus 40A to display a condition setting screen 500 (FIG. 5 and FIG. 6) for setting the adjustment condition (Step S12).

Figure 5:
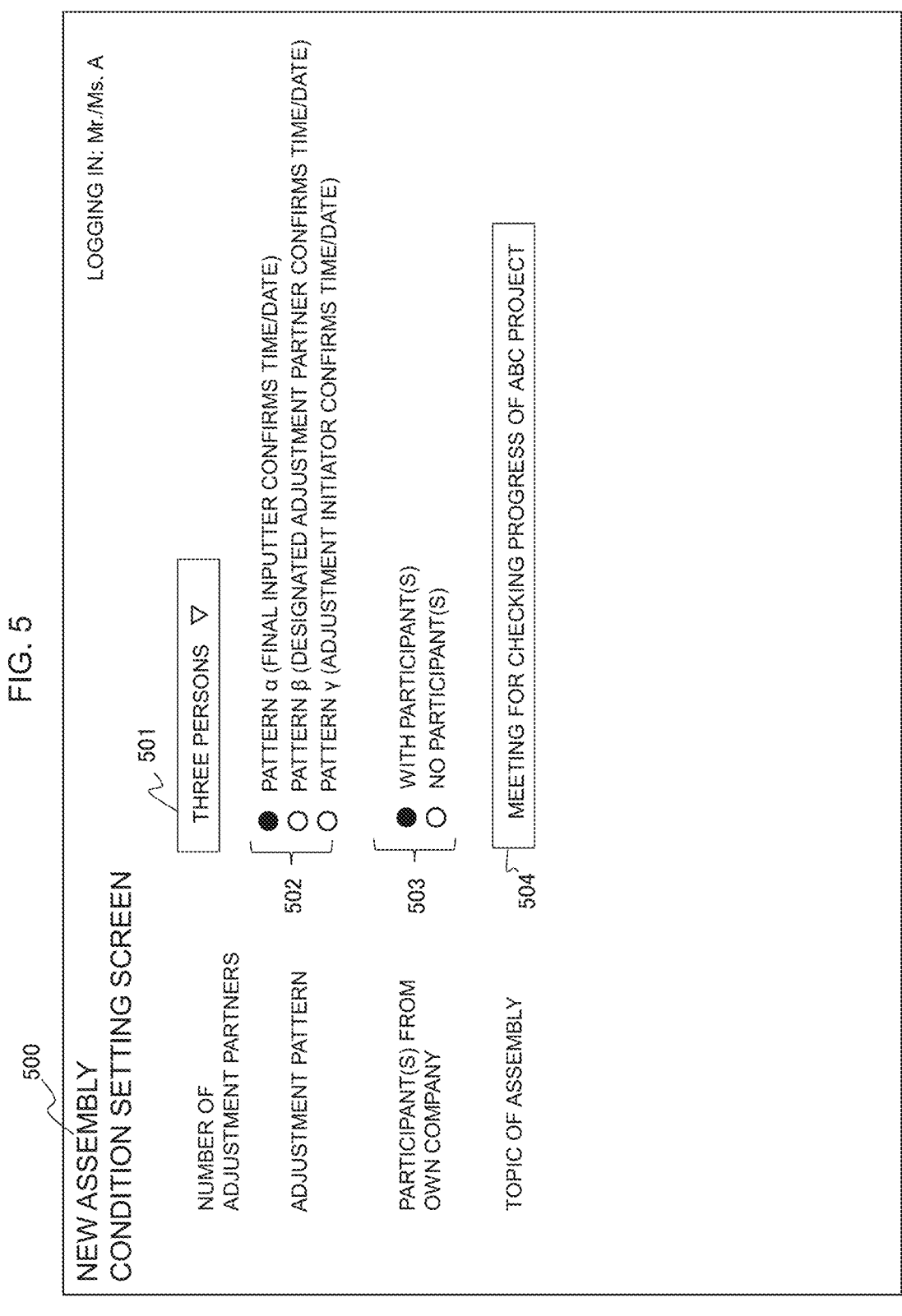
FIG. 5 is a diagram illustrating a display example of the condition setting screen.
Figure 6:
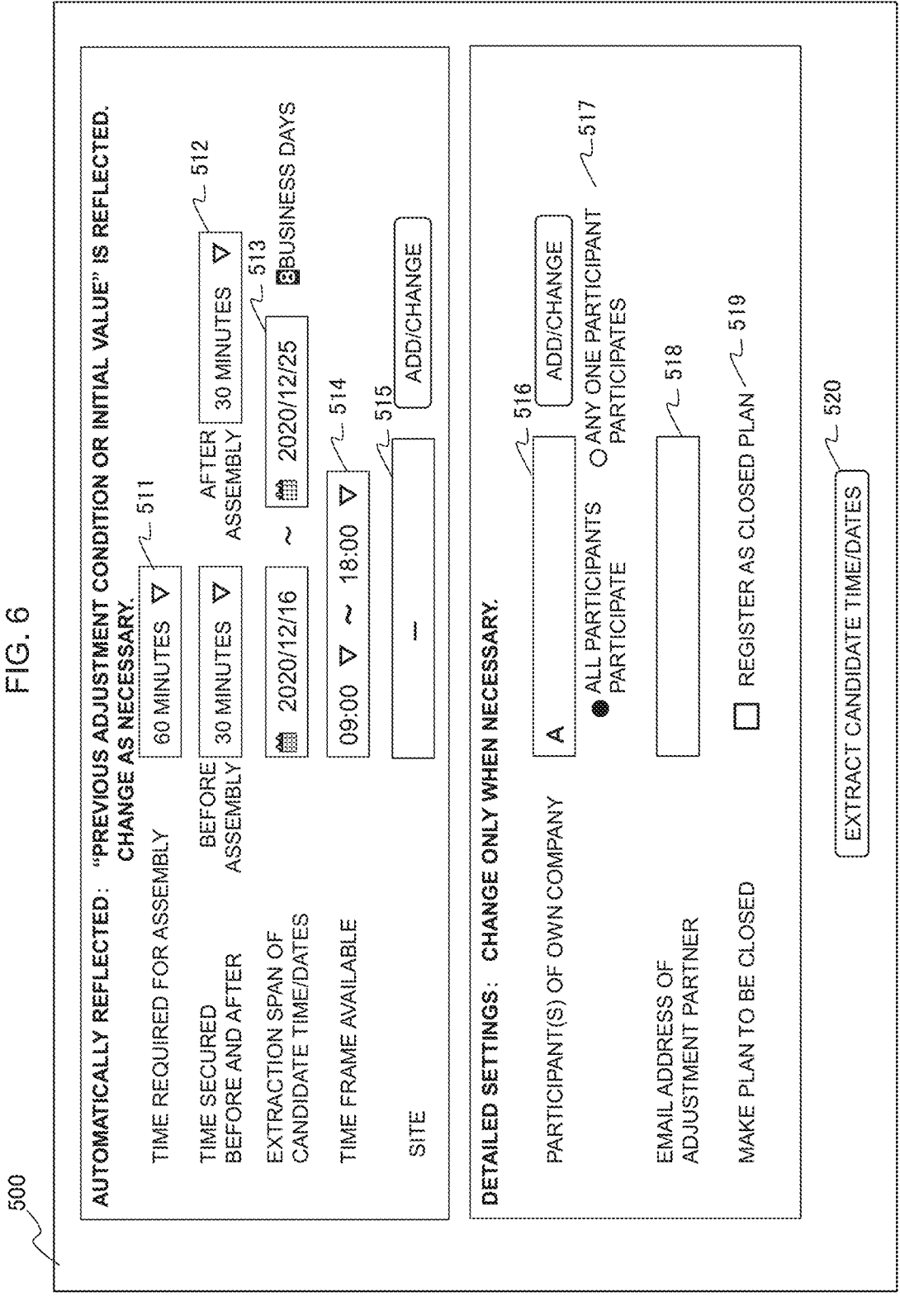
FIG. 6 is a diagram illustrating a display example of the condition setting screen.

FIG. 5 and FIG. 6 are display examples of the condition setting screen 500 displayed in the terminal apparatus 40A. FIG. 5 illustrates an upper part of the condition setting screen 500, and FIG. 6 illustrates a lower part of the condition setting screen 500, which is displayed by scrolling down the upper part illustrated in FIG. 5.

As illustrated in FIG. 5, the condition setting screen 500 is provided with an input field 501 for inputting the number N of adjustment partners X, a radio button 502 for selecting pattern α, pattern β, or pattern γ as the adjustment pattern when the number of adjustment partners X is two or more, a radio button 503 for selecting whether or not participant (s) from the own company are present, and an input field 504 for inputting an assembly topic.

In pattern α, the time/date adjustment unit 213 determines the final inputter having authority to confirm the assembly time/date among the N adjustment partners X, according to the order of performing access. In other words, in pattern, among the N adjustment partners X performing access based on the adjustment URL, the adjustment partners X performing access first to (N−1)-th are regarded as the intermediate inputters, and the adjustment partner X performing access N-th (last) is regarded as the final inputter. In a case of selecting pattern α, the adjustment initiator A may notify all of the N adjustment partners X of the adjustment URL at the time point when the adjustment URL is issued. It is desirable that pattern α be applied in a case where participation of all of the N adjustment partners X is required and ranks of the N adjustment partners X from the viewpoint of the adjustment initiator A are equal.

In pattern β, the adjustment initiator A determines the final inputter having authority to confirm the assembly time/date among the N adjustment partners X. In a case of selecting pattern β, the adjustment initiator A may first notify all of (N−1) intermediate inputters of the adjustment URL, and in response to a notification from the time/date adjustment apparatus 20 indicating that input from all of the intermediate inputters has finished, the adjustment initiator A may then notify the final inputter of the adjustment URL for the final inputter. It is desirable that pattern β be applied in a case where participation of all of the N adjustment partners X is required, ranks of the N adjustment partners X from the viewpoint of the adjustment initiator A are not equal, and there is an adjustment partner X to be given priority in time/date adjustment. In this case, the adjustment partner X to be given first priority in time/date adjustment may be the final inputter.

In pattern γ, all of the adjustment partners X are the intermediate inputters, and the adjustment initiator A is the final inputter having authority to confirm the assembly time/date. In a case of selecting pattern γ, the adjustment initiator A may notify all of the N intermediate inputters of the common adjustment URL at the time point when the adjustment URL is issued. Then, in response to a notification from the time/date adjustment apparatus 20 indicating that input of the intermediate inputters has finished, the adjustment initiator A accesses the adjustment URL notified with the notification and confirms the assembly time/date. It is desirable that pattern γ be applied in a case where participation of all of the N adjustment partners X is not necessarily required, and it is sufficient that at least one of the N adjustment partners participates.

Moreover, as illustrated in FIG. 6, the condition setting screen 500 is provided with a selection input field 511 for inputting time required for the assembly, a selection input field 512 for inputting time secured before and after the assembly, a selection input field 513 for inputting an extraction span of the candidate time/dates, a selection input field 514 for inputting a time frame available for the assembly, and a selection input field 515 for inputting a site to be used for the assembly. Here, the time secured before and after the assembly is time for movement to the site, preparation work, withdrawal work, a break, and the like.

Note that, in display of the selection input fields 511 to 515, contents of the adjustment condition of the most recent assembly where the adjustment initiator A is the adjustment initiator are reflected with reference to the time/date adjustment information 223 associated with the adjustment initiator A. With this configuration, time and efforts taken by the adjustment initiator A to input the adjustment condition can be reduced. Note that whether or not to allow automatic reflection of the adjustment condition of the most recent assembly in the selection input fields 511 to 515 may be selected by designation of the adjustment initiator A.

Note that, as a method of setting the adjustment condition, template (s) of one or more adjustment conditions may be registered in advance as another piece of information so that when one of the templates is designated and invoked, a corresponding adjustment condition can be simply set, other than a method of setting using the condition setting screen 500 in each time/date adjustment.

Furthermore, the condition setting screen 500 is provided with an input field 516 for designating and inputting one or more participants (which may or may not include the adjustment initiator A themselves) to participate in the assembly out of the belonging members of the corporate member to which the adjustment initiator A belongs, a radio button 517 for selecting an assembly participation condition of the participant (s) input to the input field 516, an input field 518 for omitting input of an email address by the adjustment partner X in a time/date confirmation screen 810 (FIG. 11) and a time/date confirmation screen 920 (FIG. 13), a check box 519 for selecting whether or not to register the plan of the assembly as a closed plan, and an extract candidate time/date button 520 for confirming each input item and instructing extraction of candidate time/dates of the assembly.

Note that the selection input field 515 and the input field 516 are available for inputting only when "with participant (s)" is selected in the radio button 503, and are not available for inputting when "no participant (s)" is selected. When a plurality of participants are designated and input in the input field 516 and all of the input participants need to participate in the assembly, "all participants participate" may be selected in the radio button 517. When a plurality of participants are input in the input field 516 and it is sufficient that at least one of the input participants participates, "any one participant participates" may be selected in the radio button 517. When only one participant is input in the input field 516, "all participants participate" is automatically selected in the radio button 517, whereas when there is only one participant, subsequent operations, such as extraction of candidate time/dates, are all the same, regardless of whether "all participants participate" or "any one participant participates" is selected.

When pattern β is selected in the radio button 502, in the input field 518, an email address of the adjustment partner X to be the final inputter can be input in a manner of being distinguished from email addresses of the adjustment partners X to be the intermediate inputters.

Here, the items of the adjustment condition refer to the time required for the assembly, the time secured before and after, the extraction span of the candidate time/dates, the time frame available, the site, and the participant (s) of the own company, which are input using the condition setting screen 500, and the number of adjustment partners, the adjustment pattern, and the participant (s) from the own company (whether or not the participant (s) are present) are defined as independent setting values not included in the adjustment condition.

FIG. 4 is referred to again. When the adjustment initiator A inputs each item of the number of adjustment partners, the adjustment pattern, the adjustment condition, and the like and performs operation on the extract candidate time/date button 520 on the condition setting screen 500 displayed in the terminal apparatus 40A (Step S2), in response to the operation, the adjustment condition setting unit 212 of the time/date adjustment apparatus 20 creates new time/date adjustment information 223 in association with the user information 222 of the adjustment initiator A and causes the storage unit 22 to store the time/date adjustment information 223, registers the number of adjustment partners and the adjustment pattern in the adjustment basic information 2233 of the time/date adjustment information 223, and registers the adjustment condition in the adjustment initiator information 2231 of the time/date adjustment information 223 (Step S13).

In the present case, the following description will be given based on an assumption that, for example, as illustrated in FIG. 5 and FIG. 6, the number of adjustment partners X is set to "three persons" and the adjustment pattern is set to "pattern α", and the participant (s) from the own company is set to "with participant (s)", the assembly topic is set to "meeting for checking the progress of ABC project", the time required for the assembly is set to "60 minutes", the time secured before and after the assembly is each set to "30 minutes", the extraction span of the candidate time/dates is set to 8 business days "from December 16th, 2020 to Dec. 25, 2020", the time frame available is set to "09:00 to 18:00", the site is set to "not designated", the input of participants is set to "A (the adjustment initiator themselves)", the assembly participation condition of the input participants is set to "all participants participate", the email address of the adjustment partner is set to "not designated", and registration of the plan of the assembly is set to "open to public".

Next, the time/date adjustment unit 213 reads the adjustment condition registered in the adjustment initiator information 2231 of the time/date adjustment information 223 from the storage unit 22, refers to the schedule information 311 of the participants on the adjustment initiator A side managed by the calendar tool 31 of the external system 30, and extracts the first candidate time/dates that are available time/dates of the participants on the adjustment initiator A side at the current time point and satisfy the adjustment condition (Step S14).

In the present case, time that is the available time/dates of the adjustment initiator A, a time frame from 09:00 to 18:00 on business days from Dec. 16, 2020 to Dec. 25, 2020, and in which 60 minutes as the time required for the assembly can be secured is extracted, and further, time in which 30 minutes as the time secured before the assembly and 30 minutes as the time secured after the assembly cannot be secured is excluded, and the first candidate time/dates are thereby determined.

Note that, when the adjustment initiator A is a secretary or the like of an actual participant, who performs time/date adjustment on their behalf, and only one actual participant different from the adjustment initiator A is input to the input field 516 of the condition setting screen 500, the schedule information 311 of the actual participant is referred to, and the first candidate time/dates that are available time/dates of the actual participant and satisfy the adjustment condition are extracted.

When a plurality of participants (which may or may not include the adjustment initiator A) are input to the input field 516 of the condition setting screen 500 and "all participants participate" is selected in the radio button 517, the schedule information 311 of all of the participants on the adjustment initiator A side is referred to, and the first candidate time/dates that are available time/dates common to all of the participants on the adjustment initiator A side and satisfy the adjustment condition are extracted. In contrast, when a plurality of participants (which may or may not include the adjustment initiator A) are input to the input field 516 of the condition setting screen 500 and "any one participant participates" is selected in the radio button 517, the schedule information 311 of all of the participants on the adjustment initiator A side is referred to, and the first candidate time/dates that are available time/dates of at least one of all of the participants on the adjustment initiator A side and satisfy the adjustment condition are extracted. The same holds true for cases in which the second to fifth candidate time/dates are extracted, which will be described below.

Note that, in the present case, the adjustment initiator A does not designate the assembly site. However, when the site is designated in the selection input field 515 on the condition setting screen 500 (FIG. 6), the first to fifth candidate time/dates may be extracted with the available time/dates of the site being reflected.

Specifically, for example, when only "first meeting room" is designated, in Step S14, the time/date adjustment unit 213 may read the adjustment condition registered in the adjustment initiator information 2231 of the time/date adjustment information 223 from the storage unit 22, refer to the schedule information 311 of the participants on the adjustment initiator A side and the first meeting room managed by the calendar tool 31 of the external system 30, and extract the first candidate time/dates that are available time/dates common to the participants on the adjustment initiator A side and the first meeting room at the current time point and satisfy the adjustment condition. The same holds true for cases in which the second to fifth candidate time/dates are extracted, which will be described below.

For example, when two rooms of "first meeting room and second meeting room" are designated, in Step S14, the time/date adjustment unit 213 may read the adjustment condition registered in the adjustment initiator information 2231 of the time/date adjustment information 223 from the storage unit 22, refer to the schedule information 311 of the participants on the adjustment initiator A side and the first meeting room and the second meeting room managed by the calendar tool 31 of the external system 30, and extract the first candidate time/dates that are available time/dates common to the participants on the adjustment initiator A side and at least one room of the first meeting room and the second meeting room at the current time point and satisfy the adjustment condition. The same holds true for cases in which the second to fifth candidate time/dates are extracted, which will be described below.

Next, the time/date adjustment unit 213 causes the terminal apparatus 40A to display a time/date editing screen 600 (FIG. 7) for the adjustment initiator A to edit the first candidate time/dates (Step S15).

Figure 7:
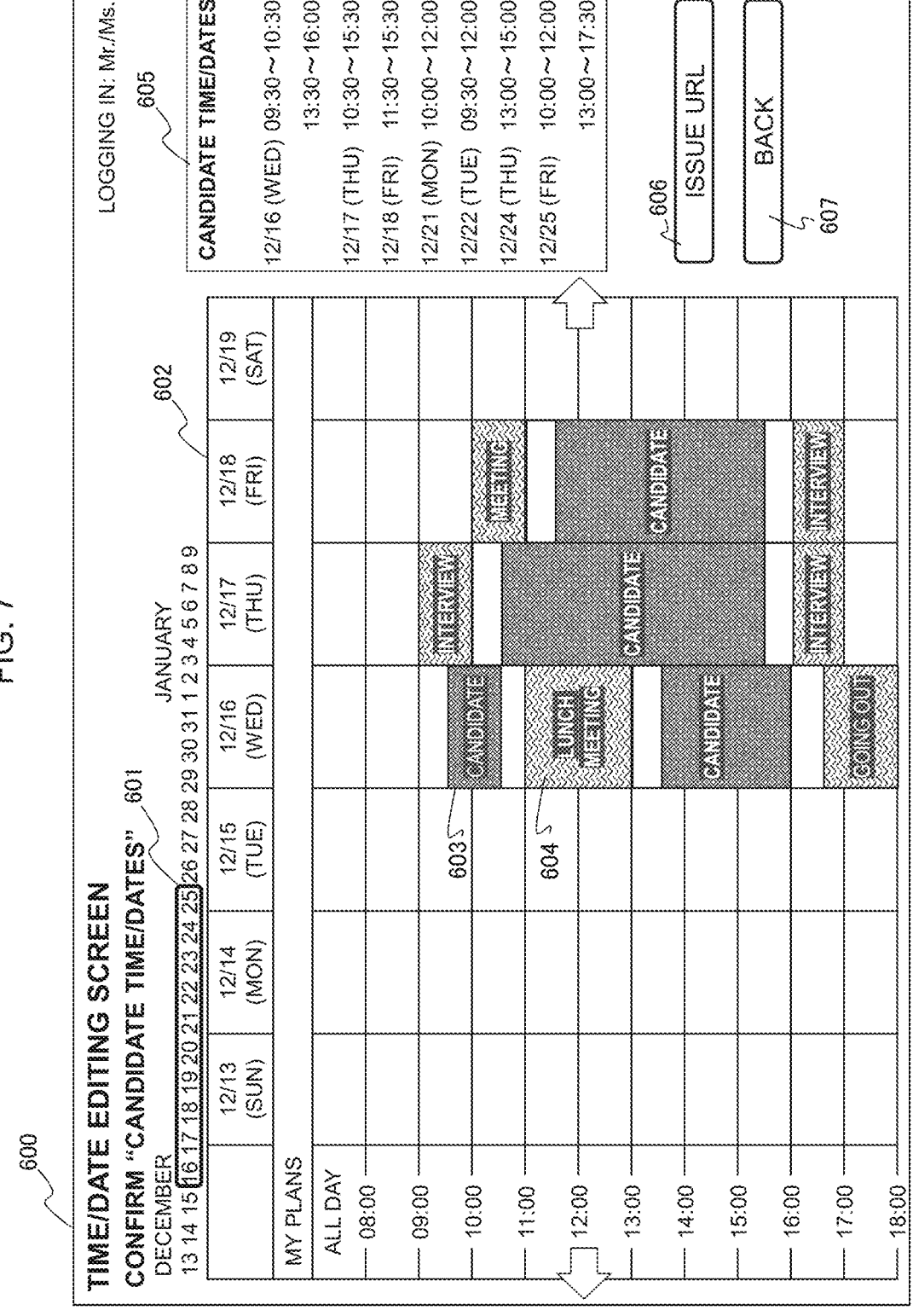
FIG. 7 is a diagram illustrating a display example of the time/date editing screen.

FIG. 7 illustrates a display example of the time/date editing screen 600 displayed in the terminal apparatus 40A.

On the time/date editing screen 600, a candidate time/date span frame 601, a calendar 602 displayed in a grid pattern with its horizontal axis representing dates and vertical axis representing time, and a candidate time/date list 605 in which the first candidate time/dates are listed per day are displayed. On the time/date editing screen 600, an issue URL button 606 and a back button 607 are provided.

The candidate time/date span frame 601 indicates a span including the first candidate time/dates out of the extraction span of the candidate time/dates input to the selection input field 513 of the condition setting screen 500.

On the calendar 602, based on the schedule information 311 of the participants on the adjustment initiator A side managed by the calendar tool 31, existing plan frames 604 indicating plans of the participants on the adjustment initiator A side within a display span on the calendar 602 and first candidate time/date frames 603 are displayed in different colors or the like so that the existing plan frames 604 and the first candidate time/date frames 603 can be distinguished from each other. With this configuration, the adjustment initiator A can edit the first candidate time/dates while checking existing plans of the participants on the adjustment initiator A side.

In the present case, the number of participants on the adjustment initiator A side is only one, namely the adjustment initiator A, and thus only existing plans of the adjustment initiator A are displayed as the existing plan frames 604 in the calendar 602 of the time/date editing screen 600; however, when there are a plurality of participants on the adjustment initiator A side, existing plans of all of the participants on the adjustment initiator A side are displayed as the existing plan frames 604. In this case, names of the participants may be displayed in the existing plan frames 604, or the existing plan frames 604 may be assigned different colors, so as to allow making a distinction as to whose existing plan a plan is among the plurality of participants.

In the candidate time/date list 605, the first candidate time/dates are listed and displayed per day.

The adjustment initiator A can edit the first candidate time/dates, by using a pop-up screen (not illustrated) to be displayed by selecting the first candidate time/date frame 603 in the calendar 602. The editing results of the first candidate time/dates in the calendar 602 are reflected in the candidate time/date list 605. Note that editing of the first candidate time/dates may be performed with an operation, such as drag and drop, on the screen, depending on an operation of an input device (a mouse, a touch panel, or the like) provided for the terminal apparatus 40A. The same holds true for other screen operations in the terminal apparatuses 40A and 40X.

Note that the adjustment initiator A can edit the first candidate time/dates also in the candidate time/date list 605.

The issue URL button 606 is a button for confirming the editing results (second candidate time/dates) of the first candidate time/dates by the adjustment initiator A in the calendar 602 and instructing issuing of the adjustment URL for the adjustment partner X to access the time/date adjustment screen. The back button 607 is a button for returning back to the condition setting screen 500. When operation is performed on the issue URL button 606, a pop-up adjustment URL screen 610 (FIG. 8) is displayed.

In the present case, the following description will be given based on an assumption that the adjustment initiator A excludes 09:30 to 10:30 on December 16th (Wednesday) from the first candidate time/dates on the time/date editing screen 600.

FIG. 4 is referred to again. When the adjustment initiator A edits the first candidate time/dates as necessary and performs operation on the issue URL button 606 on the time/date editing screen 600 displayed in the terminal apparatus 40A (Step S3), next, the time/date adjustment unit 213 of the time/date adjustment apparatus 20 issues the adjustment URL. Specifically, the time/date adjustment unit 213 checks the adjustment pattern registered in the adjustment basic information 2233 of the time/date adjustment information 223 corresponding to the adjustment initiator A, and when the adjustment pattern is pattern α or pattern β, the time/date adjustment unit 213 issues different adjustment URLs for all of the adjustment partners X. Then, the time/date adjustment unit 213 creates as many pieces of adjustment partner information 2232 as the number of adjustment partners X in the time/date adjustment information 223 (created in Step S13) corresponding to the adjustment initiator A, registers the adjustment URL issued for each adjustment partner X in the created adjustment partner information 2232, and registers the second candidate time/dates being editing results of the first candidate time/dates in the adjustment initiator information 2231 (Step S16).

In a case of pattern γ, the time/date adjustment unit 213 issues the common adjustment URL for all of the adjustment partners X, and issues the adjustment URL for the final inputter for the adjustment initiator A. Then, the time/date adjustment unit 213 registers the common adjustment URL for all of the adjustment partners X in the adjustment basic information 2233 of the time/date adjustment information 223 corresponding to the adjustment initiator A, and registers the adjustment URL for the final inputter and the second candidate time/dates being editing results of the first candidate time/dates in the adjustment initiator information 2231 (Step S16).

Next, the time/date adjustment unit 213 checks the adjustment pattern registered in the adjustment basic information 2233 of the time/date adjustment information 223 corresponding to the adjustment initiator A, and causes the terminal apparatus 40A to display a pop-up adjustment URL screen 610 (FIG. 8, for example) depending on the adjustment pattern representing the issued adjustment URL for the adjustment partner X (Step S17).

In Step S17 and subsequent steps, operations are different depending on the adjustment pattern. In the following, an operation example corresponding to pattern α, an operation example corresponding to pattern β, and an operation example corresponding to pattern γ will be described in the mentioned order.

Operation Example Corresponding to Pattern α

Figure 8:
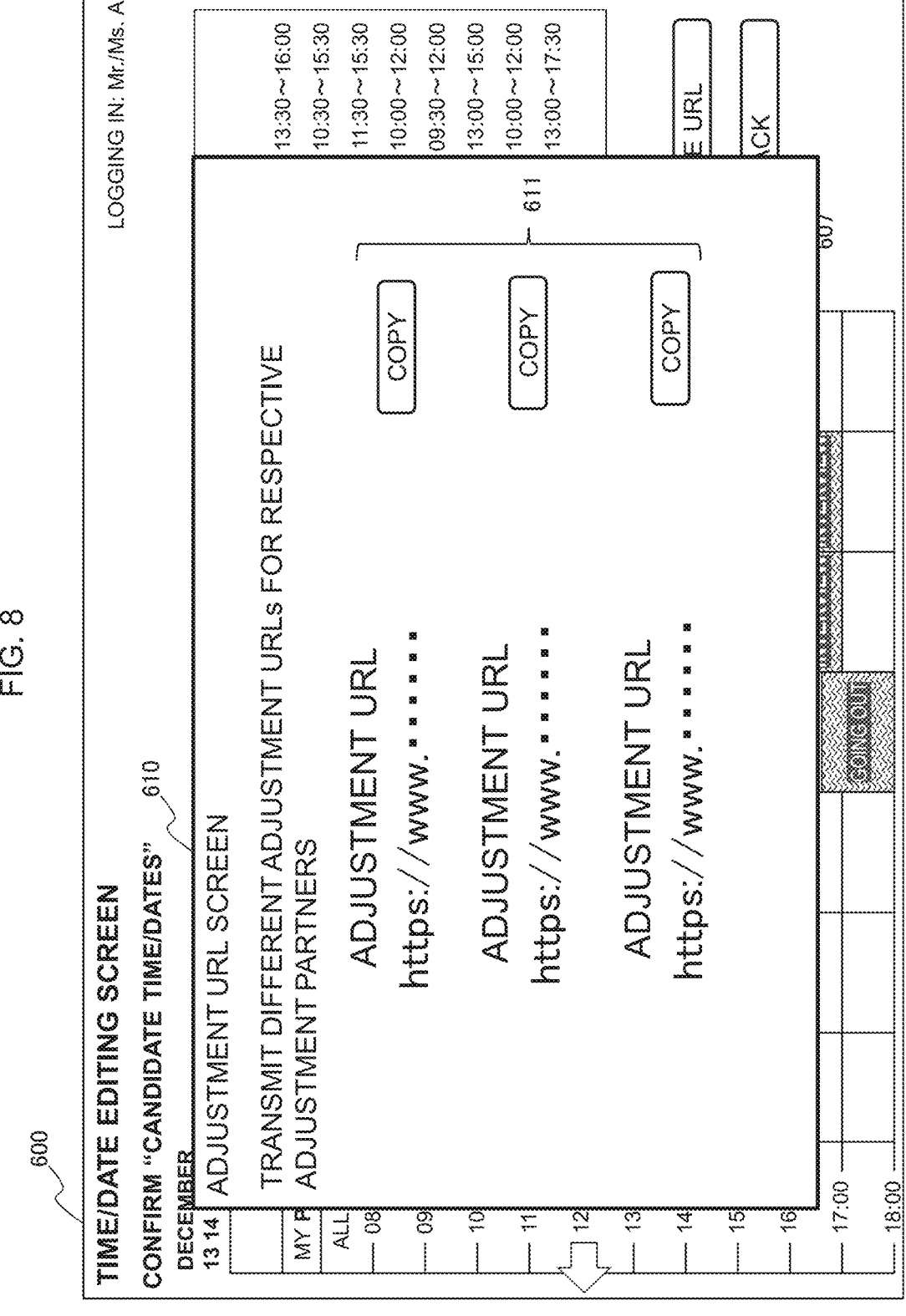
FIG. 8 is a diagram illustrating a display example of an adjustment URL screen.

FIG. 8 illustrates a display example of the adjustment URL screen 610 corresponding to pattern α. In the present case, the number of adjustment partners X is set to "three persons", and thus three type of different adjustment URLs are simultaneously displayed on the adjustment URL screen 610. The adjustment URL screen 610 is provided with copy buttons 611 for copying the respective adjustment URLs.

Figure 9:
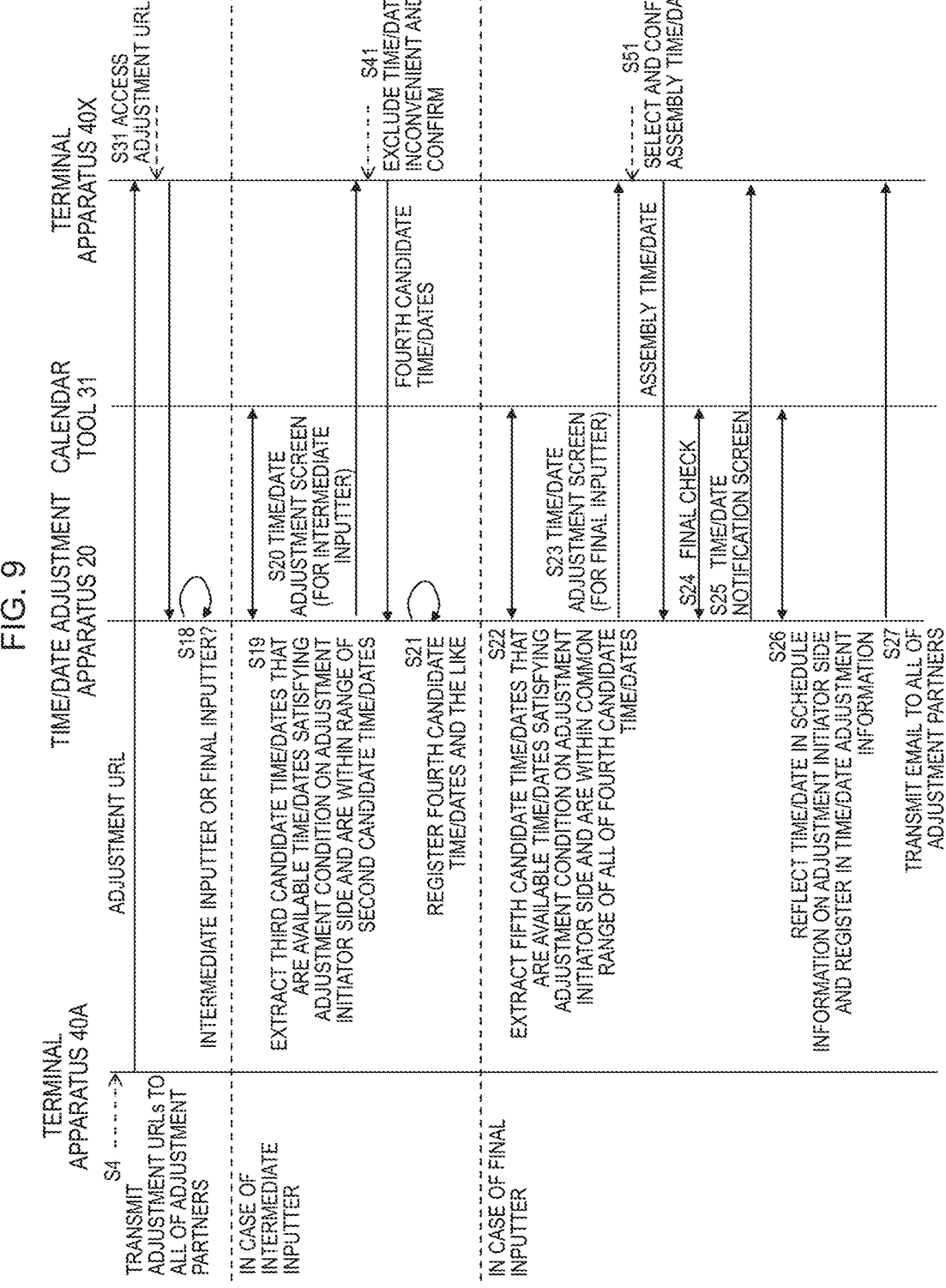
FIG. 9 is a sequence diagram for illustrating an operation example corresponding to pattern α.

Next, FIG. 9 is a sequence diagram for illustrating operation example corresponding to pattern α to be executed subsequently to Step S17 (FIG. 4).

First, the adjustment initiator A performs operation on the copy buttons 611 on the adjustment URL screen 610 displayed on the terminal apparatus 40A to copy the adjustment URLs, pastes the adjustment URLs to electronic mails or the like, respectively, and transmits the electronic mails to the terminal apparatuses 40X of all of the three adjustment partners X (Step S4).

Note that, as a modification, when the email addresses of all of the adjustment partners X are input in the input field 518 on the condition setting screen 500, the display of the adjustment URL screen 610 may be omitted, and the time/date adjustment unit 213 may directly transmit the adjustment URLs to the email addresses of the adjustment partners X.

Next, when the adjustment partner X having received the adjustment URL accesses the adjustment URL by using the terminal apparatus 40X (Step S31), the time/date adjustment unit 213 of the time/date adjustment apparatus 20 identifies the time/date adjustment information 223 including the adjustment partner information 2232 in which the accessed adjustment URL is registered, refers to all of the adjustment partner information 2232 included in the identified time/date adjustment information 223, and determines whether the adjustment partner X performing access is the intermediate inputter or the final inputter (Step S18). Specifically, when the number of pieces of adjustment partner information 2232 in which the fourth candidate time/dates are already registered out of N pieces of adjustment partner information 2232 included in the time/date adjustment information 223 is equal to or less than (N−2), it is determined that the adjustment partner X performing access is the intermediate inputter. When the number of pieces of adjustment partner information 2232 in which the fourth candidate time/dates are already registered out of the N pieces of adjustment partner information 2232 is (N−1), it is determined that the adjustment partner X performing access is the final inputter. In the present case, out of three pieces of adjustment partner information 2232, when the number of pieces of adjustment partner information 2232 in which the fourth candidate time/dates are already registered is equal to or less than 1, it is determined that the adjustment partner X performing access is the intermediate inputter, whereas when the number is 2, it is determined that the adjustment partner X performing access is the final inputter.

When it is determined that the adjustment partner X performing access is the intermediate inputter, next, the time/date adjustment unit 213 reads the adjustment condition and the second candidate time/dates registered in the adjustment initiator information 2231 of the time/date adjustment information 223 identified in Step S18, refers to the schedule information 311 of the participants on the adjustment initiator A side managed by the calendar tool 31, and extracts the third candidate time/dates that are available time/dates of the participants on the adjustment initiator A side at the current time point, satisfy the adjustment condition of the adjustment initiator A, and are within a range of the second candidate time/dates (Step S19).

Next, the time/date adjustment unit 213 causes the terminal apparatus 40X of the intermediate inputter performing access to display a time/date adjustment screen 800 (FIG. 10) for the intermediate inputter presenting the extracted third candidate time/dates (Step S20).

Figure 10:
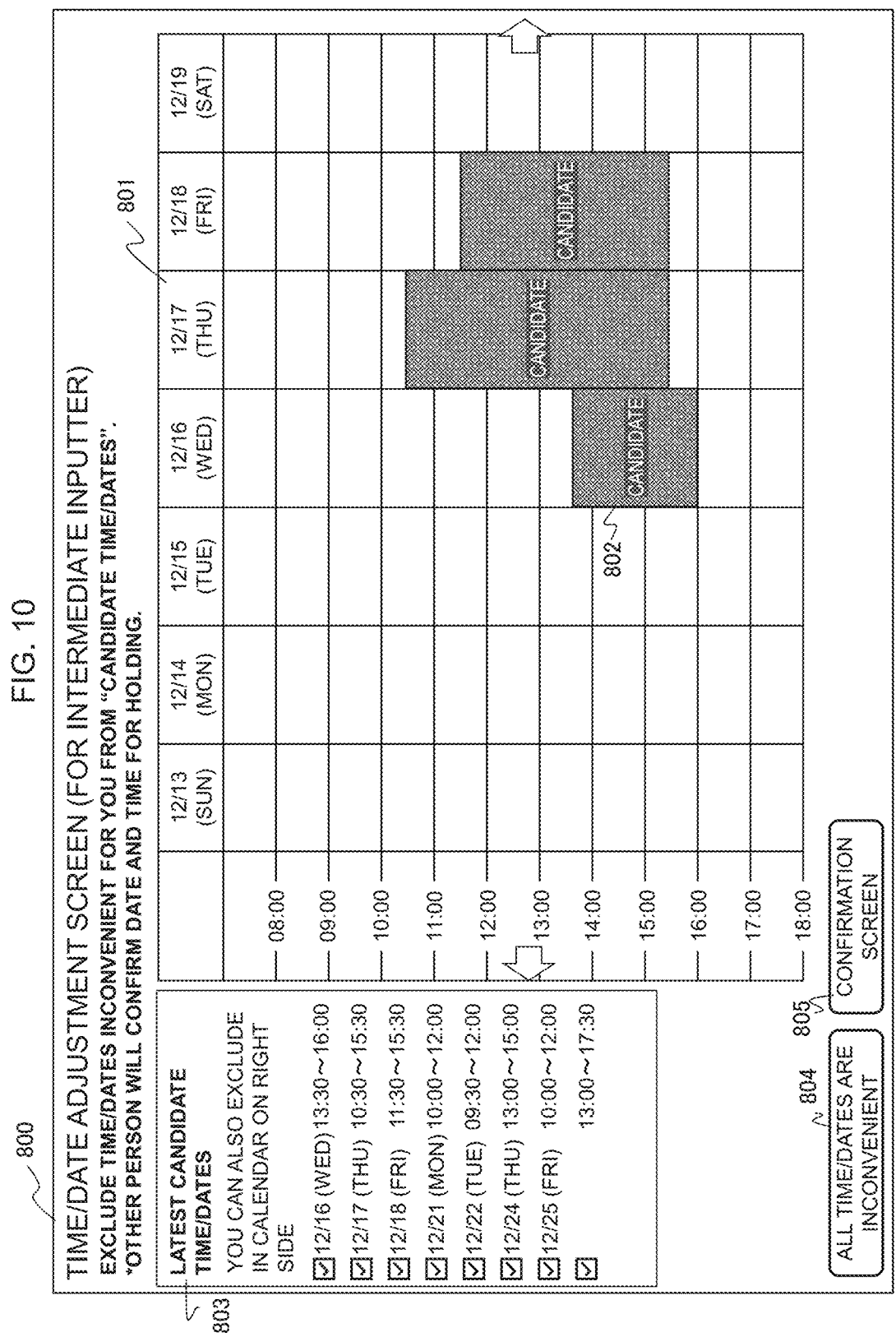
FIG. 10 is a diagram illustrating a display example of a time/date adjustment screen (for an intermediate inputter).

FIG. 10 illustrates a display example of the time/date adjustment screen 800 for the intermediate inputter. On the time/date adjustment screen 800, the intermediate inputter can exclude time/dates inconvenient for the intermediate inputter from the third candidate time/dates. On the time/date adjustment screen 800, the intermediate inputter may designate desired time/dates convenient for the intermediate inputter from the third candidate time/dates.

On the time/date adjustment screen 800, a calendar 801 displayed in a grid pattern with its horizontal axis representing dates and vertical axis representing time and a candidate time/date list 803 in which the third candidate time/dates are listed per day are displayed. On the time/date adjustment screen 800, an inconvenient button 804 and a confirmation screen button 805 are provided.

In the calendar 801, third candidate time/date frames 802 are displayed in different colors or the like so that the third candidate time/date frames 802 can be distinguished from other frames. Note that, in the calendar 801, existing plans of the participants on the adjustment initiator A side are not displayed, unlike the calendar 602 of the time/date editing screen 600 (FIG. 7). Thus, for the intermediate inputters, privacy of the participants on the adjustment initiator A side can be protected.

In the candidate time/date list 803, the third candidate time/dates are listed and displayed per day.

The intermediate inputter either selects one of the third candidate time/date frames 802 in the calendar 801 or uncheck a check box in the candidate time/date list 803, and can thereby exclude the time/dates inconvenient for the intermediate inputter from the candidate time/dates. Note that, regarding the third candidate time/date frames 802 longer than the time required for the assembly (in the present case, 60 minutes), all or a part of such third candidate time/date frames 802 may be excluded from the candidate time/dates through a predetermined operation.

The inconvenient button 804 is a button on which operation is performed when all of the time/dates of the third candidate time/dates presented on the time/date adjustment screen 800 are inconvenient. When the intermediate inputter performs operation on the inconvenient button 804, the adjustment initiator A is notified that all of the time/dates of suggested candidate time/dates are inconvenient. To other intermediate inputters who have performed access prior to the intermediate inputter and have performed operation for excluding their time/dates inconvenient therefor, an email such as "Re-adjustment is to be performed. Adjustment shall be performed again" is transmitted. In this case, the adjustment initiator A changes the adjustment condition, and executes the time/date adjustment processing again.

The confirmation screen button 805 is a button for displaying the time/date confirmation screen 810 (FIG. 11) for the intermediate inputter to check the candidate time/dates remaining as results after the time/dates inconvenient for the intermediate inputter are excluded from the third candidate time/dates.

In the present case, the following description will be given based on an assumption that the intermediate inputter excludes 13:30 to 16:00 on December 16th (Thursday) from the candidate time/dates on the time/date adjustment screen 800, and performs operation on the confirmation screen button 805.

In response to the operation on the confirmation screen button 805 by the intermediate inputter, the time/date confirmation screen 810 is displayed in the terminal apparatus 40X of the intermediate inputter.

Figure 11:
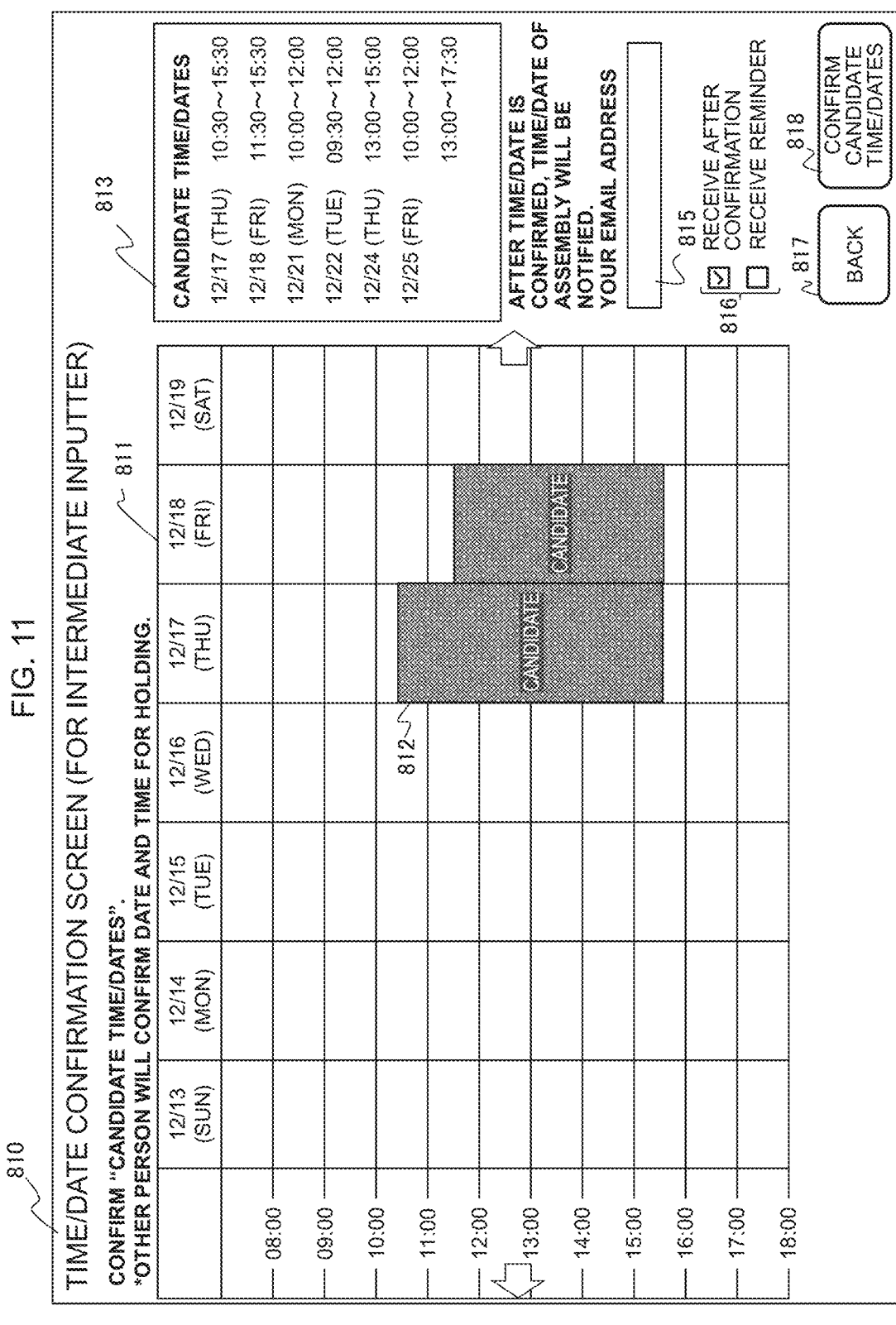
FIG. 11 is a diagram illustrating a display example of a time/date confirmation screen (for an intermediate inputter).

FIG. 11 illustrates a display example of the time/date confirmation screen 810. On the time/date confirmation screen 810, a calendar 811 displayed in a grid pattern with its horizontal axis representing dates and vertical axis representing time, and a candidate time/date list 813 in which the candidate time/dates from which the time/dates inconvenient are excluded are listed per day are displayed. The time/date confirmation screen 810 is provided with an input field 815 for the intermediate inputter to input an email address of the intermediate inputter, a check box 816 for setting a timing of transmitting an email for notifying the intermediate inputter of holding of the assembly, a back button 817 for returning back to the time/date adjustment screen 800, and a confirm candidate time/date button 818 for confirming contents displayed on the time/date confirmation screen 810.

In the calendar 811, candidate time/date frames 812 presenting the candidate time/dates remaining as results after the intermediate inputter themselves excludes the time/dates inconvenient for the intermediate inputter on the time/date adjustment screen 800 are displayed in different colors or the like so that the candidate time/date frames 812 can be distinguished from other frames.

In the candidate time/date list 813, the candidate time/dates remaining as results after the intermediate inputter themselves excludes the time/dates inconvenient for the intermediate inputter on the time/date adjustment screen 800 are listed and displayed per day.

FIG. 9 is referred to again. When the intermediate inputter inputs the email address of the intermediate inputter, selects the timing of transmitting the notification email, and performs operation on the confirm candidate time/date button 818 on the time/date confirmation screen 810 displayed in the terminal apparatus 40X (Step S41), next, the time/date adjustment unit 213 of the time/date adjustment apparatus 20 registers time/dates remaining as results after the intermediate inputter excludes time/dates inconvenient for the intermediate inputter as the fourth candidate time/dates in the adjustment partner information 2232 in which the accessed adjustment URL is registered, the adjustment partner information 2232 being included in the time/date adjustment information 223 corresponding to the adjustment initiator A, and registers the email address and the timing of transmitting the notification email input by the intermediate inputter themselves (Step S21). After this, the time/date adjustment unit 213 stands by until the next adjustment partner X performs access.

Then, when the adjustment partner X performing access next is the intermediate inputter, the processing similar to Steps S19, S20, S41, and S21 is repeated.

Note that, as a modification, in Step S19 for the intermediate inputter performing access second or later, the time/date adjustment unit 213 may read the adjustment condition registered in the adjustment initiator information 2231 of the time/date adjustment information 223 identified in Step S18 and all of the fourth candidate time/dates registered in the adjustment partner information 2232, refer to the schedule information 311 of the participants on the adjustment initiator A side managed by the calendar tool 31, and extract the third candidate time/dates that are available time/dates of the participants on the adjustment initiator A side at the current time point, satisfy the adjustment condition of the adjustment initiator A, and are within a common range of all of the fourth candidate time/dates. In a case of the modification, the third candidate time/dates presented for the intermediate inputter performing access second or later reflect the fourth candidate time/dates of the intermediate inputter who has finished input in advance, in other words, who has finished the operation of excluding the candidate time/dates. Thus, the fourth candidate time/dates registered for each intermediate inputter are more narrowed down as the number of intermediate inputters having finished the operation of excluding the candidate time/dates is increased.

In the present case, out of the three adjustment partners X, two adjustment partners X performing access first and second are the intermediate inputters, and the processing of Steps S19, S20, S41, and S21 is performed. As a result, two pieces out of three pieces of adjustment partner information 2232 included in the time/date adjustment information 223 corresponding to the adjustment initiator A in the storage unit 22 are the adjustment partner information 2232A corresponding to the intermediate inputter in which the fourth candidate time/dates and the like are registered.

The following description will be given based on an assumption that time/date adjustment by the second intermediate inputter has finished, the third adjustment partner X performs access, and it is determined that the third adjustment partner X is the final inputter in Step S18.

When the adjustment partner X performing access is the final inputter, next, the time/date adjustment unit 213 reads the adjustment condition registered in the adjustment initiator information 2231 of the time/date adjustment information 223 identified in Step S18 and the fourth candidate time/dates registered in the adjustment partner information 2232A, refers to the schedule information 311 of the participants on the adjustment initiator A side managed by the calendar tool 31, and extracts the fifth candidate time/dates that are available time/dates of the participants on the adjustment initiator A side at the current time point, satisfy the adjustment condition of the adjustment initiator A, and are within a common range of all of the fourth candidate time/dates (Step S22).

Next, the time/date adjustment unit 213 causes the terminal apparatus 40X of the final inputter to display a time/date adjustment screen 910 (FIG. 12) for the final inputter (Step S23).

Figure 12:
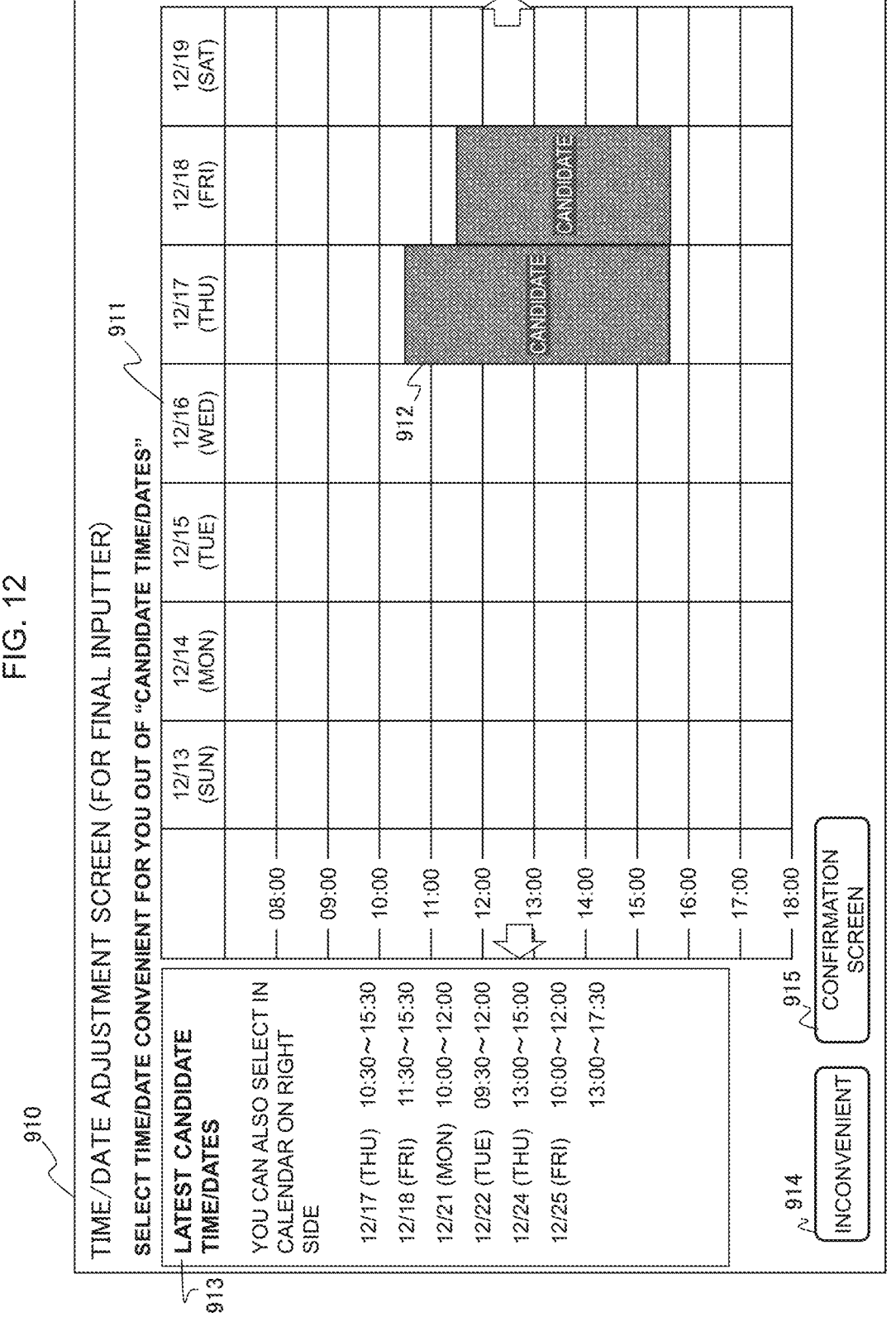
FIG. 12 is a diagram illustrating a display example of the time/date adjustment screen (for a final inputter).

FIG. 12 illustrates a display example of the time/date adjustment screen 910 for the final inputter. The final inputter can select and determine the assembly time/date out of the fifth candidate time/dates on the time/date adjustment screen 910.

On the time/date adjustment screen 910, a calendar 911 displayed in a grid pattern with its horizontal axis representing dates and vertical axis representing time and a candidate time/date list 913 in which the fifth candidate time/dates are listed per day are displayed. On the time/date adjustment screen 910, an inconvenient button 914 and a confirmation screen button 915 are provided.

In the calendar 911, fifth candidate time/date frames 912 are displayed in different colors or the like so that the fifth candidate time/date frames 912 can be distinguished from other frames. Note that, in the calendar 911, existing plans of the participants on the adjustment initiator A side are not displayed, unlike the calendar 602 of the time/date editing screen 600 (FIG. 7). Thus, for the final inputter, privacy of the participants on the adjustment initiator A side can be protected.

In the candidate time/date list 913, the fifth candidate time/dates are listed and displayed per day.

The final inputter selects one of the fifth candidate time/date frames 912 in the calendar 911, and can thereby determine the assembly time/date. Note that, when a fifth candidate time/date frame 912 longer than "60 minutes" as the time required for the assembly is selected, a pop-up screen (not illustrated) is displayed, and "60 minutes" as the time required within time of the selected fifth candidate time/date frame 912 may be selected on the pop-up screen and determined as the assembly time/date.

In the present case, the following description will be given based on an assumption that the final inputter determines 11:00 to 12:00 on December 17th (Thursday) as the assembly time/date in the calendar 911 of the time/date adjustment screen 910.

The inconvenient button 914 is a button on which operation is performed when all of the time/dates of the fifth candidate time/dates presented on the time/date adjustment screen 910 are inconvenient. When the final inputter performs operation on the inconvenient button 914, the adjustment initiator A is notified that all of the time/dates of suggested candidate time/dates are inconvenient. To other intermediate inputters who have performed access prior to the final inputter and have performed operation for excluding their time/dates inconvenient therefor, an email such as "Re-adjustment is to be performed. Adjustment shall be performed again" is transmitted. In this case, the adjustment initiator A changes the adjustment condition, and executes the time/date adjustment processing again.

The confirmation screen button 915 is a button for displaying the time/date confirmation screen 920 (FIG. 13) for confirming with the determined assembly time/date. When the final inputter performs operation on the confirmation screen button 915, the time/date confirmation screen 920 is displayed on the terminal apparatus 40X of the final inputter.

Figure 13:
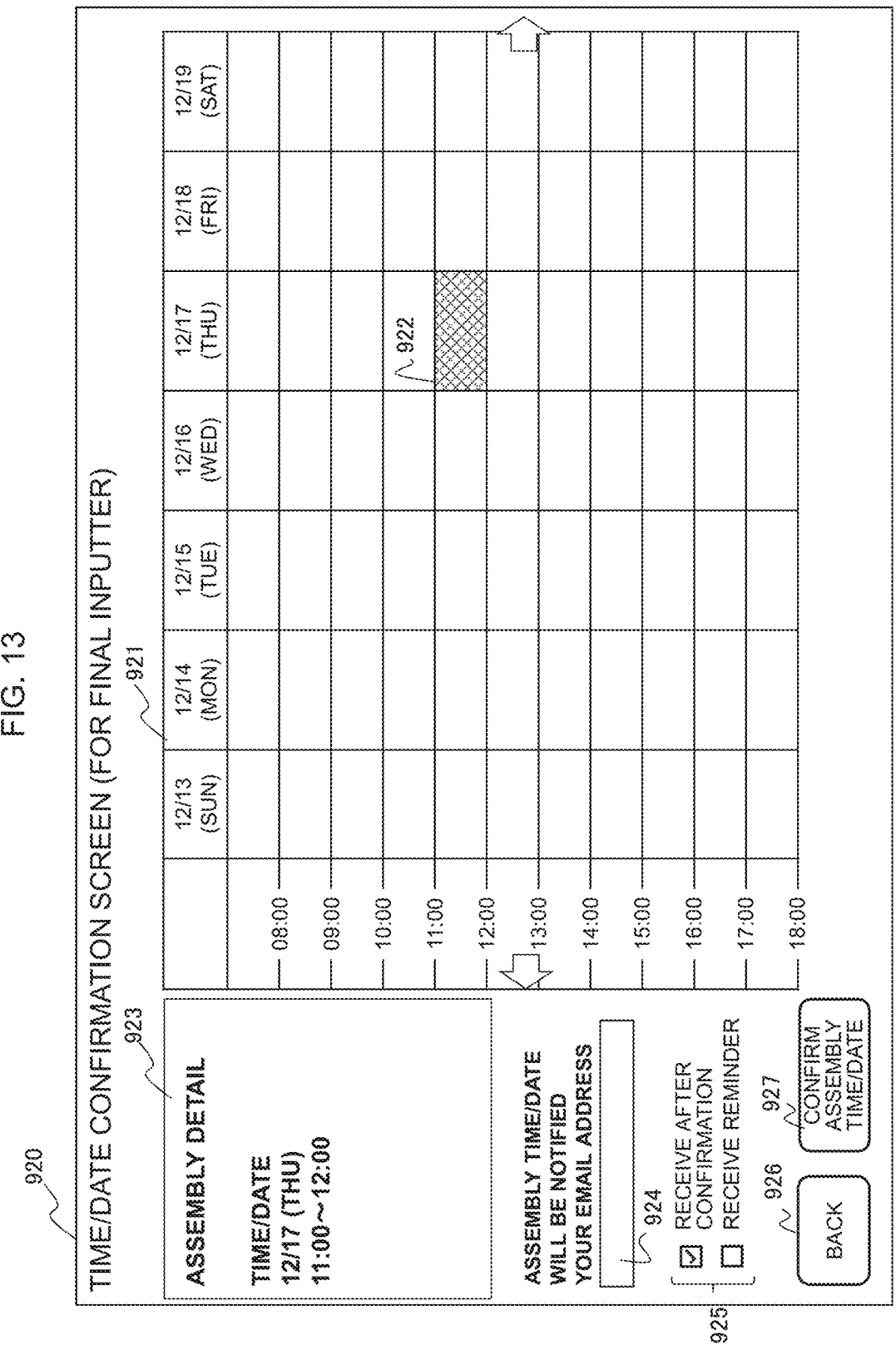
FIG. 13 is a diagram illustrating a display example of the time/date confirmation screen (for a final inputter).

FIG. 13 illustrates a display example of the time/date confirmation screen 920. On the time/date confirmation screen 920, a calendar 921 displayed in a grid pattern with its horizontal axis representing dates and vertical axis representing time and an assembly detail 923 are displayed.

In the calendar 921, an assembly time/date frame 922 presenting the assembly time/date selected and determined on the time/date adjustment screen 910 (FIG. 12) by the final inputter themselves is displayed in different colors or the like so that the assembly time/date frame 922 can be distinguished from other frames. The time/date is displayed in the assembly detail 923.

The time/date confirmation screen 920 is provided with an input field 924 for the final inputter to input an email address of the final inputter, a check box 925 for setting a timing of transmitting a notification email for notifying the final inputter of holding of the assembly, a back button 926 for returning back to the time/date adjustment screen 910, and a confirm assembly time/date button 927 for confirming contents displayed on the time/date confirmation screen 920.

FIG. 9 is referred to again. When the final inputter inputs the email address of the final inputter to the input field 924 and performs operation on the confirm assembly time/date button 927 on the time/date confirmation screen 920 (FIG. 13) displayed in the terminal apparatus 40X of the final inputter (Step S51), the time/date adjustment unit 213 of the time/date adjustment apparatus 20 refers to the schedule information 311 of the participants on the adjustment initiator A side managed by the calendar tool 31, reads the adjustment condition registered in the adjustment initiator information 2231 of the time/date adjustment information 223 corresponding to the adjustment initiator A and all of the fourth time/dates registered in the adjustment partner information 2232A from the storage unit 22, and performs final check that the assembly time/date confirmed on the time/date confirmation screen 920 is an available time/date of the participants on the adjustment initiator A side at the current time point, satisfies the adjustment condition, and is within a common range of all of the fourth candidate time/dates (Step S24).

Here, when the confirmed assembly time/date is no longer an available time/date of the participants on the adjustment initiator A side, no longer satisfies the adjustment condition, or is no longer within a common range of all of the fourth candidate time/dates, for example, a message such as "The designated time has been occupied. Select again" may be displayed on the terminal apparatus 40X of the final inputter, and the processing may be brought back to Step S22 and may resume from the operation of the final inputter on the time/date adjustment screen 910. In contrast, when final check is successfully performed that the confirmed assembly time/date is an available time/date of the participants, satisfies the adjustment condition, and is within a range of the fourth candidate time/dates, a time/date notification screen 1000 (FIG. 14) presenting the assembly time/date and the like confirmed by the final inputter themselves is displayed in the terminal apparatus 40X of the final inputter (Step S25).

Figure 14:
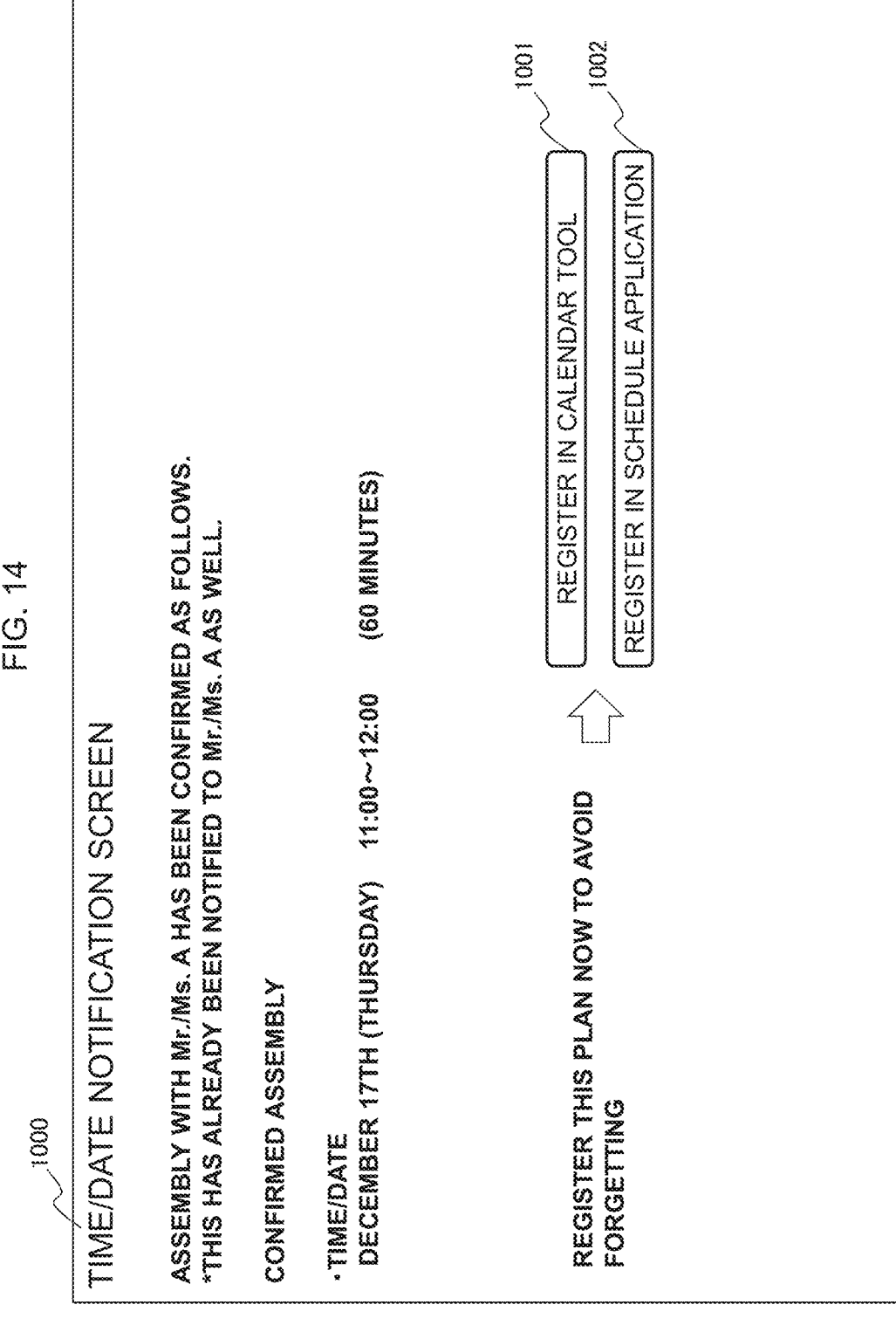
FIG. 14 is a diagram illustrating a display example of a time/date notification screen.

FIG. 14 illustrates a display example of the time/date notification screen 1000. On the time/date notification screen 1000, the confirmed time/date of the assembly and the like are displayed. On the time/date notification screen 1000, a register button 1001 for the calendar tool and a register button 1002 for a schedule application are provided. When the final inputter uses the calendar tool 31 and performs operation on the register button 1001, the final inputter can register the plan of the confirmed assembly in the calendar tool 31 as a plan of the final inputter themselves. When the final inputter performs operation on the register button 1002, the final inputter can register the plan of the confirmed assembly in an application program (for example, Outlook (trademark) or the like) for schedule management used by the final inputter.

When final check is successfully performed that the confirmed assembly time/date is an available time/date of the participant, satisfies the adjustment condition, and is within a common range of all of the fourth candidate time/dates in the final check of Step S24, the time/date adjustment unit 213 registers the plan of the assembly under adjustment in the schedule information 311 of the participants on the adjustment initiator A side managed by the calendar tool 31. The time/date adjustment unit 213 registers the confirmed date and time of the assembly in the adjustment basic information 2233 included in the time/date adjustment information 223 corresponding to the adjustment initiator A stored by the storage unit 22. Moreover, the time/date adjustment unit 213 registers the email address and the timing of transmitting the notification email input by the final inputter themselves in the adjustment partner information 2232 in which the adjustment URL accessed last is registered, the adjustment partner information 2232 being included in the time/date adjustment information 223 corresponding to the adjustment initiator A stored by the storage unit 22 (Step S26).

Note that, although the site of the assembly is not designated in the present case, for example, when the first meeting room is designated as the site, the time/date adjustment unit 213 registers the confirmed date and time of the assembly in the schedule information 311 of the first meeting room managed by the calendar tool 31 of the external system 30. For example, when two rooms of the first meeting room and the second meeting room are designated as the site, and the two rooms of the first meeting room and the second meeting room are available on the confirmed assembly time/date, one room of the first meeting room and the second meeting room is selected, and the plan of the assembly with the adjustment partners X is registered in the schedule information 311 of the selected meeting room. Note that, regarding selection of the meeting room, the time/date adjustment unit 213 may perform selection in accordance with a predetermined rule, or the adjustment initiator A may perform selection. Then, in Step S26, the time/date adjustment unit 213 may register the plan of the assembly with the adjustment partners X in the schedule information 311 of each of the participants and the selected meeting room managed by the calendar tool 31.

Next, the time/date adjustment unit 213 refers to the adjustment partner information 2232 of the time/date adjustment information 223 corresponding to the adjustment initiator A, and transmits a notification email for giving notification of holding of the assembly to the email address designated by each of the adjustment partners X in accordance with the timing designated by each of the adjustment partners X (Step S27).

Note that, in the present embodiment, an arrow from the time/date adjustment apparatus 20 to the terminal apparatus 40X is illustrated as Step S27, on the assumption that the adjustment partner X receives the electronic mail using the terminal apparatus 40X; however, the adjustment partner X may receive the notification email from the time/date adjustment apparatus 20, using an electronic device other than the terminal apparatus 40X.

Through the above, the time/date adjustment processing corresponding to pattern α ends.

According to the time/date adjustment processing corresponding to pattern α described above, the time/date of the assembly in which a plurality of adjustment partners X participate can be easily and efficiently set without causing a double booking.

According to the time/date adjustment processing corresponding to pattern α, the confirmed time/date of the assembly and the like can be registered in the calendar tool 31 used by the participants on the adjustment initiator A side. Therefore, time and efforts for conventionally required manual registration of the schedule in the calendar tool 31 can be eliminated. The notification email can be transmitted to the adjustment partners X, and thus contact to the adjustment partners X that is conventionally performed by the adjustment initiator A can be omitted.

In addition, from the standpoint of the adjustment initiator A, operations from extraction of the candidate time/dates to transmission of the candidate time/dates to the plurality of adjustment partners X can be performed in a short period of time (for example, approximately 30 seconds), and after transmitting the adjustment URLs to the plurality of adjustment partners X, the adjustment initiator A only has to wait and can have important operations regarding time/date adjustment automatically completed, including not only determination of the assembly time/date but also registration of the plan and contact to the adjustment partners X. This can significantly reduce time and efforts for the operations regarding time/date adjustment.

Incidentally, it is desirable that the time/date adjustment processing corresponding to pattern α described above be applied in a case where ranks of the plurality of adjustment partners X from the viewpoint of the adjustment initiator A are equal, because who is granted the authority to determine the assembly time/date among the plurality of adjustment partners X is undetermined.

In contrast, when ranks of the plurality of adjustment partners X from the viewpoint of the adjustment initiator A are not equal, and for example, the adjustment partners $X_1$ and $X_2$ among the adjustment partners $X_1$ to $X_3$ are employees of a cooperative company of the company to which the adjustment initiator A belongs and the adjustment partner $X_3$ is a client of the adjustment initiator A, it may be desired that the adjustment partner $X_3$ be designated as the final inputter in order to prioritize convenience of the adjustment partner $X_3$ over the adjustment partners $X_1$ and $X_2$. In this case, the adjustment initiator A may select pattern β in the radio button 502 of the condition setting screen 500 (FIG. 5), and can thereby efficiently and securely designate the final inputter.

Operation Example Corresponding to Pattern β

Next, the operation example corresponding to pattern β will be described.

Figure 15:
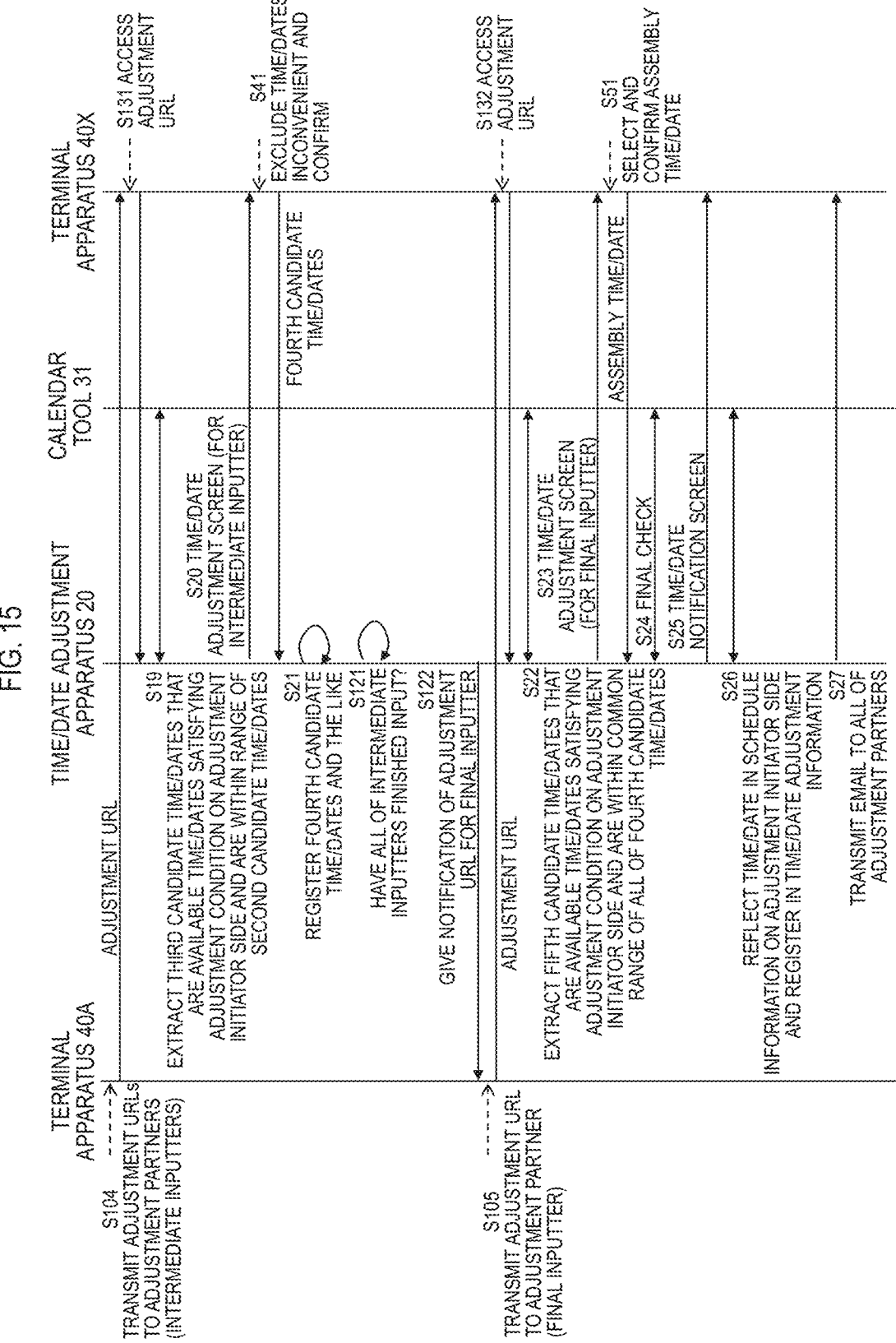
FIG. 15 is a sequence diagram for illustrating an operation example corresponding to pattern β.

FIG. 15 is a sequence diagram for illustrating the operation example corresponding to pattern β to be executed subsequently to Step S17 (FIG. 4).

The operation example corresponding to pattern β differs from the operation example corresponding to pattern α described above (FIG. 9) in that Step S4 performed by the terminal apparatus 40A is deleted and Steps S104 and S105 are added, Step S18 performed by the time/date adjustment apparatus 20 is deleted, Steps S121 and S122 are added between Step S21 and Step S22, Step S31 performed by the terminal apparatus 40X is replaced with Step S131, and Step S132 is added. Note that common steps in the operation example corresponding to pattern β and the operation example corresponding to pattern α are denoted by the same step numbers, and thus description thereof will be omitted as appropriate.

Figure 16:
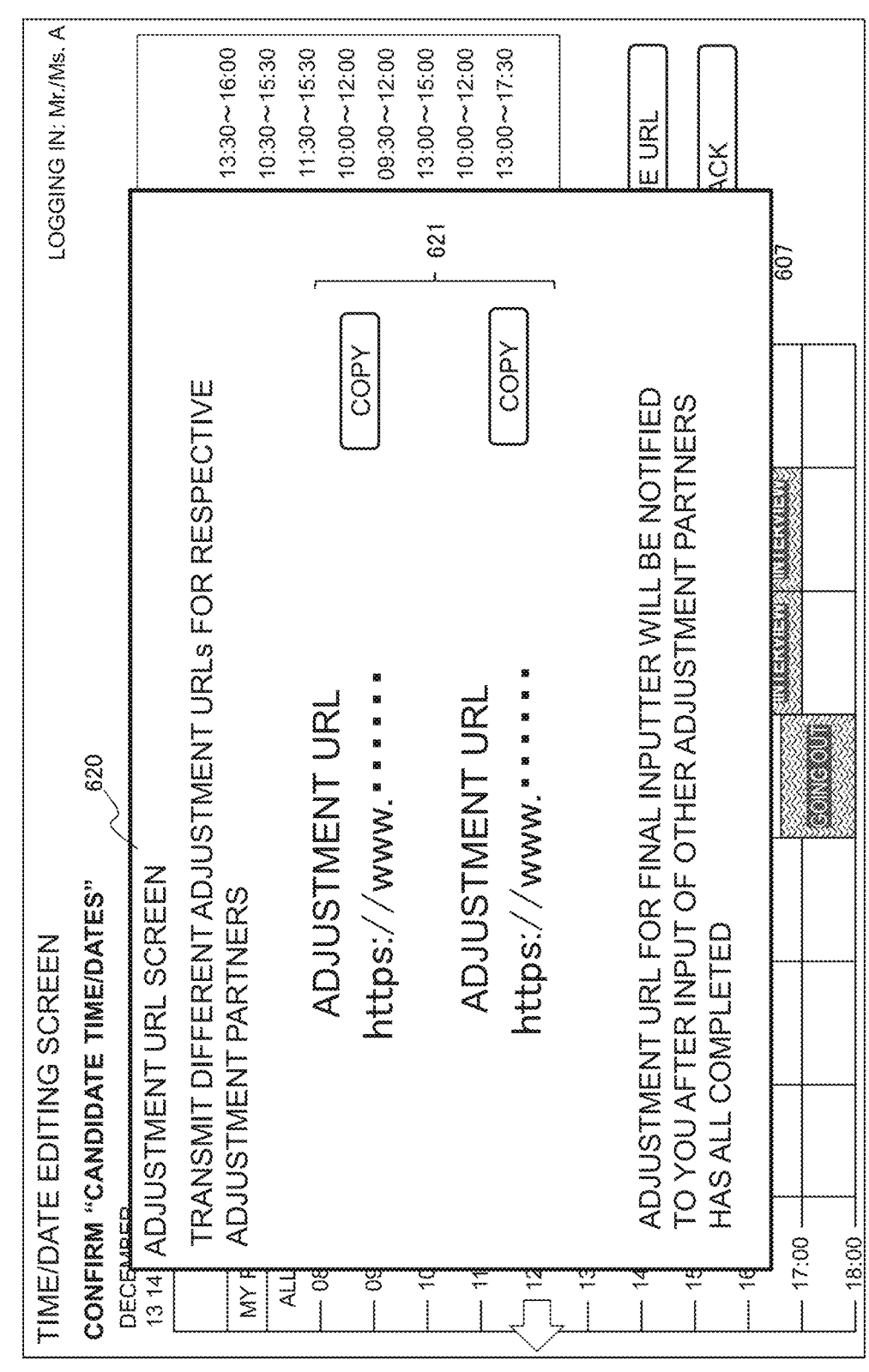
FIG. 16 is a diagram illustrating a display example of the adjustment URL screen.

FIG. 16 illustrates a display example of an adjustment URL screen 620 corresponding to pattern β, which is displayed in Step S17. In the present case, as the adjustment condition, the number of adjustment partners X is set to "three persons", and thus two different adjustment URLs for the intermediate inputters are simultaneously displayed on the adjustment URL screen 620. The adjustment URL screen 620 is provided with copy buttons 621 for copying the respective adjustment URLs.

FIG. 15 is referred to again. Next, the adjustment initiator A performs operation on the copy buttons 621 on the adjustment URL screen 620 displayed on the terminal apparatus 40A to copy the adjustment URLs, pastes the adjustment URLs to electronic mails or the like, respectively, and transmits the electronic mails to the respective terminal apparatuses 40X of the adjustment partners (in the present case, the adjustment partners $X_1$ and $X_2$) to be the intermediate inputters (Step S104).

Note that, as a modification, when the email addresses of all of the adjustment partners X to be the intermediate inputters are input in the input field 518 on the condition setting screen 500, the display of the adjustment URL screen 620 may be omitted, and the time/date adjustment unit 213 may directly transmit the adjustment URLs to the email addresses of the adjustment partners X to be the intermediate inputters.

Next, when the intermediate inputter having received the adjustment URL accesses the adjustment URL by using the terminal apparatus 40X (Step S131), next, the time/date adjustment unit 213 extracts the third candidate time/dates (Step S19), and causes the terminal apparatus 40X of the intermediate inputter performing access to display the time/date adjustment screen 800 (FIG. 10) for the intermediate inputter presenting the extracted third candidate time/dates (Step S20).

Next, when the intermediate inputter excludes time/dates inconvenient for the intermediate inputter from the third candidate time/dates on the time/date adjustment screen 800 and inputs the email address of the intermediate inputter and selects the timing of transmitting the notification email on the time/date confirmation screen 810 displayed subsequently (Step S41), next, the time/date adjustment unit 213 of the time/date adjustment apparatus 20 registers the time/ dates remaining as results after the intermediate inputter excludes the time/dates inconvenient for the intermediate inputter as the fourth candidate time/dates in the adjustment partner information 2232 in which the accessed adjustment URL is registered, the adjustment partner information 2232 being included in the time/date adjustment information 223 corresponding to the adjustment initiator A, and registers the email address and the timing of transmitting the notification email input by the intermediate inputter themselves (Step S21).

Next, the time/date adjustment unit 213 refers to the adjustment partner information 2232 included in the time/date adjustment information 223 in the storage unit 22, and determines whether or not all of the intermediate inputters have finished input, in other words, whether or not all of the intermediate inputters have accessed the time/date adjustment screen 800 and performed the operation of excluding the time/dates inconvenient for the intermediate inputter themselves from the third candidate time/dates (Step S121). In the present case, when the number of pieces of adjustment partner information 2232 in which the fourth candidate time/dates are already registered out of N pieces of adjustment partner information 2232 included in the time/date adjustment information 223 is equal to or less than (N−2), it is determined that input of all of the intermediate inputters has not finished. When the number of pieces of adjustment partner information 2232 in which the fourth candidate time/dates are already registered out of the N pieces of adjustment partner information 2232 is (N−1), it is determined that all of the intermediate inputters have finished input. In the present case, when the number of pieces of adjustment partner information 2232 in which the fourth candidate time/dates are already registered out of three pieces of adjustment partner information 2232 included in the time/date adjustment information 223 is equal to or less than 1, it is determined that input of all of the intermediate inputters has not finished, whereas when the number is 2, it is determined that input of all of the intermediate inputters has finished.

When it is determined that input of all of the intermediate inputters has not finished, the time/date adjustment unit 213 stands by until the next intermediate inputter performs access. Then, the processing similar to Steps S19, S20, S41, S21, and S121 is also repeated for the intermediate inputter performing access next.

Then, in Step S121, when the time/date adjustment unit 213 determines that input of all of the intermediate inputters has finished, next, the time/date adjustment unit 213 notifies the terminal apparatus 40A of the adjustment initiator A of a message indicating that input of all of the intermediate inputters has finished and the adjustment URL for the final inputter issued in Step S16, by using an electronic mail or the like (Step S122). Note that, instead of transmitting the adjustment URL for the final inputter by using an electronic mail or the like, a URL for accessing a screen (not illustrated) to display the adjustment URL for the final inputter may be transmitted to the terminal apparatus 40A, by using an electronic mail or the like.

Next, the adjustment initiator A copies the adjustment URL for the final inputter transmitted from the time/date adjustment apparatus 20, pastes the adjustment URL to an electronic mail or the like, and transmits the electronic mail to the terminal apparatus 40X of the adjustment partner (in the present case, the adjustment partner $X_3$) to be designated as the final inputter (Step S105).

Note that, as a modification, when the email address of the adjustment partner X to be the final inputter is input in the input field 518 of the condition setting screen 500, transmission of the message indicating that input of all of the intermediate inputters has finished to the adjustment initiator A may be omitted, and the time/date adjustment unit 213 may directly transmit the adjustment URL for the final inputter to the email address of the adjustment partner X to be the final inputter.

Next, when the final inputter having received the adjustment URL for the final inputter accesses the adjustment URL for the final inputter by using the terminal apparatus 40X (Step S132), Steps S22, S23, S51, and S24 to S27 are executed. Through the above, the time/date adjustment processing corresponding to pattern β ends.

According to the time/date adjustment processing corresponding to pattern β described above, effects similar to those of the time/date adjustment processing corresponding to pattern α described above can be obtained. According to the time/date adjustment processing corresponding to pattern β, the adjustment initiator A can easily and securely designate any adjustment partner X among the plurality of adjustment partners X as the final inputter, and can grant the authority to determine the assembly time/date.

Operation Example Corresponding to Pattern γ

Next, the operation example corresponding to pattern γ will be described, which is suitable for a case in which participation of all of the N adjustment partners X is not necessarily required and it is sufficient that at least one of the N adjustment partners participates.

Figure 17:
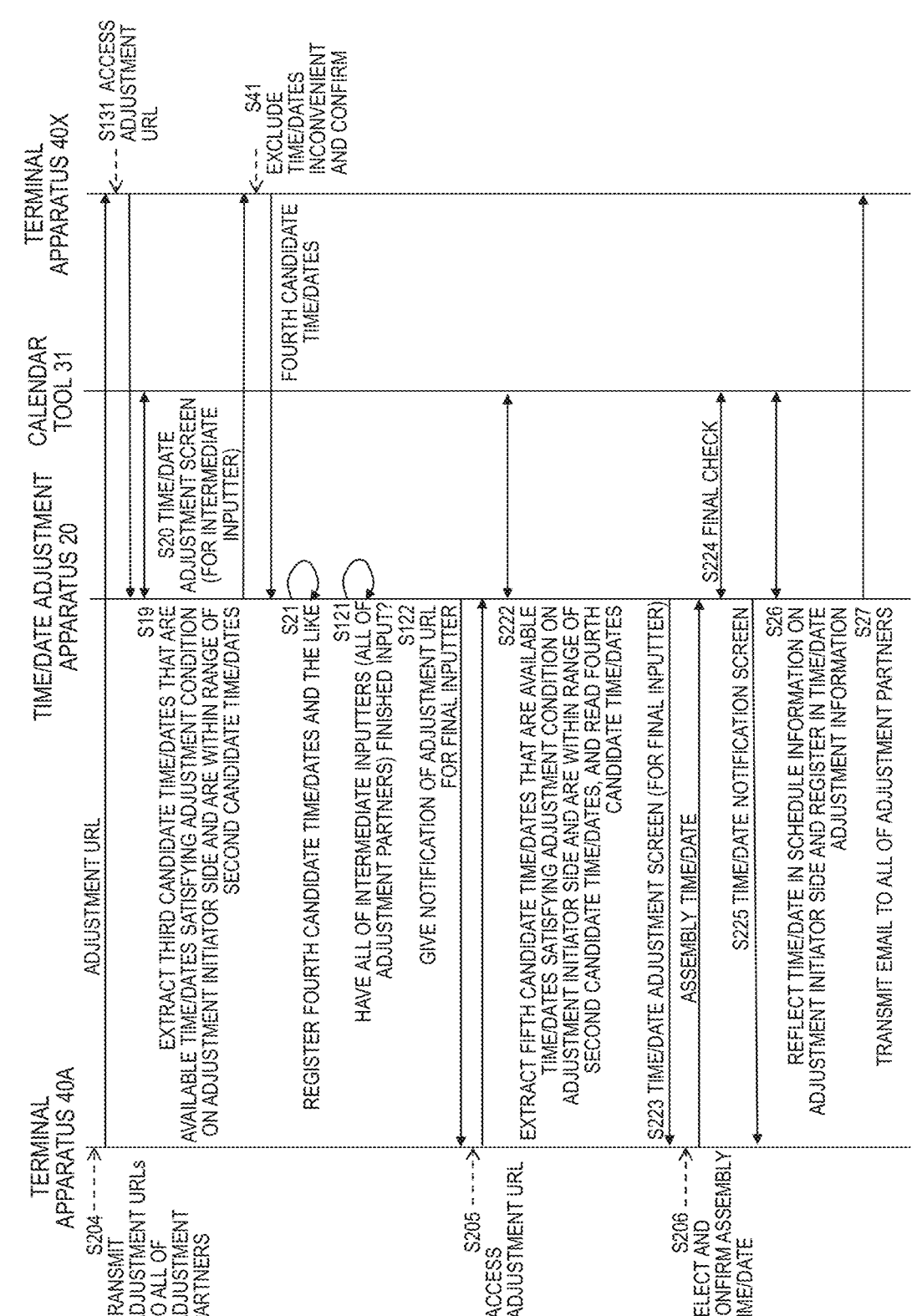
FIG. 17 is a sequence diagram for illustrating an operation example corresponding to pattern γ.

FIG. 17 is a sequence diagram for illustrating the operation example corresponding to pattern γ to be executed subsequently to Step S17 (FIG. 4).

The operation example corresponding to pattern γ differs from the operation example corresponding to pattern β (FIG. 15) described above in that Step S104 performed by the terminal apparatus 40A is replaced with Step S204, Step S105 is deleted and Steps S205 and S206 are added, Step S22 to S25 performed by the time/date adjustment apparatus 20 are replaced with Step S222 to S225, and Steps S132 and S51 performed by the terminal apparatus 40X are deleted. Note that common steps in the operation example corresponding to pattern γ and the operation example corresponding to pattern β are denoted by the same step numbers, and thus description thereof will be omitted as appropriate.

In a case of the operation example corresponding to pattern γ, on the adjustment URL screen (not illustrated) displayed in Step S17, a common adjustment URL for all of the adjustment partners X is displayed.

In response to the adjustment URL screen corresponding to pattern γ being displayed on the terminal apparatus 40A, next, the adjustment initiator A copies the common adjustment URL displayed on the adjustment URL screen displayed on the terminal apparatus 40A, pastes the common adjustment URL to electronic mails or the like, and transmits the electronic mails to the terminal apparatuses 40X of all of the adjustment partners (in the present case, the adjustment partners X$_1$ to X$_3$) to be the intermediate inputters (Step S204).

Note that, as a modification, when the email addresses of all of the intermediate inputters (all of the adjustment partners X) are input in the input field 518 of the condition setting screen 500, the display of the adjustment URL screen may be omitted, and the time/date adjustment unit 213 may directly transmit the adjustment URL to the email addresses of all of the intermediate inputters.

Next, when the intermediate inputter having received the adjustment URL accesses the adjustment URL by using the terminal apparatus 40X (Step S131), next, the time/date adjustment unit 213 extracts the third candidate time/dates (Step S19), and causes the terminal apparatus 40X of the intermediate inputter performing access to display the time/date adjustment screen 800 (FIG. 10) for the intermediate inputter presenting the extracted third candidate time/dates (Step S20).

Next, when the intermediate inputter excludes time/dates inconvenient for the intermediate inputter from the third candidate time/dates on the time/date adjustment screen 800 and inputs the email address of the intermediate inputter and selects the timing of transmitting the notification email on the time/date confirmation screen 810 displayed subsequently (Step S41), next, the time/date adjustment unit 213 of the time/date adjustment apparatus 20 creates the adjustment partner information 2232 corresponding to the intermediate inputter in the time/date adjustment information 223 corresponding to the adjustment initiator A, and registers the common adjustment URL accessed by the intermediate inputter, the fourth candidate time/dates of the intermediate inputter, the email address, and the timing of transmitting the notification email in the created adjustment partner information 2232 (Step S21).

Next, the time/date adjustment unit 213 refers to the adjustment partner information 2232 included in the time/date adjustment information 223 in the storage unit 22, and determines whether or not all of the intermediate inputters have finished input (Step S121).

When it is determined that all of the intermediate inputters have not finished input, the time/date adjustment unit 213 stands by until the next intermediate inputter performs access. Then, the processing similar to Steps S19, S20, S41, S21, and S121 is also repeated for the intermediate inputter performing access next.

Then, in Step S121, when the time/date adjustment unit 213 determines that all of the N adjustment partners X have finished input, where N is designated as the number of adjustment partners, next, the time/date adjustment unit 213 notifies the terminal apparatus 40A of the adjustment initiator A of a message indicating that the input operation of all of the adjustment partners X has finished and the adjustment URL for the final inputter issued in Step S16, by using an electronic mail or the like (Step S122). Note that a determination condition of Step S121 (in other words, a condition of notifying the final inputter of the adjustment URL) is not limited to finishing of input of the N designated intermediate inputters as described above.

Next, when the adjustment initiator A accesses the adjustment URL for the final inputter by using the terminal apparatus 40A (Step S205), next, the time/date adjustment unit 213 reads the adjustment condition and the second candidate time/dates registered in the adjustment initiator information 2231 of the time/date adjustment information 223 corresponding to the adjustment initiator A in the storage unit 22, refers to the schedule information 311 of the participants on the adjustment initiator A side managed by the calendar tool 31, and extracts the fifth candidate time/dates that are available time/dates of the participants on the adjustment initiator A side at the current time point, satisfy the adjustment condition of the adjustment initiator A, and are within a range of the second candidate time/dates. The time/date adjustment unit 213 reads the fourth candidate time/dates of all of the adjustment partners X who have finished input, registered in the adjustment partner information 2232 of the time/date adjustment information 223 corresponding to the adjustment initiator A in the storage unit 22 (Step S222).

Next, the time/date adjustment unit 213 causes the terminal apparatus 40A of the adjustment initiator A as the final inputter to display the time/date adjustment screen (not illustrated) for the final inputter presenting both of the fifth candidate time/dates presenting the available time/dates on the adjustment initiator A side and the fourth candidate time/dates presenting the available time/dates of all of the adjustment partners X who have finished input (Step S223).

Next, on the time/date adjustment screen for the final inputter displayed on the terminal apparatus 40A, the adjustment initiator A as the final inputter selects and confirms the time/date of the assembly (Step S206). Note that, in selection of the time/date of the assembly, the adjustment initiator A as the final inputter need not select the available time/dates common to all of the adjustment partners X being displayed, and it is desirable that the adjustment initiator A select time/dates that are within a range of the fifth candidate time/dates on the adjustment initiator A side, are available time/dates of at least one of all of the adjustment partners X being displayed, and on which as many adjustment partners X as possible can participate.

Next, the time/date adjustment unit 213 of the time/date adjustment apparatus 20 refers to the schedule information 311 of the participants on the adjustment initiator A side managed by the calendar tool 31, reads the fourth time/dates registered in the adjustment partner information 2232 of the adjustment partners X who have finished input of the time/date adjustment information 223 corresponding to the adjustment initiator A from the storage unit 22, and performs final check that the confirmed assembly time/date does not overlap existing plans of the participants on the adjustment initiator A side at the current time point or is out of the range of the fourth candidate time/dates of the adjustment partners X (Step S224).

Here, when the confirmed assembly time/date overlaps existing plans of the participants on the adjustment initiator A side at the current time point or is out of the range of the fourth candidate time/dates of one of the adjustment partners X, for example, a message such as "It is likely that the adjustment partner $X_1$ cannot participate. Is it OK?" or "This is out of the candidates designated by the adjustment partner $X_1$. Is it OK?" is displayed on the terminal apparatus 40A. When the adjustment initiator A agrees, the processing may proceed to Step S225, whereas when the adjustment initiator A does not agree, the processing may be brought back to Step S222 and may resume from the selection operation of the assembly time/date performed by the adjustment initiator A as the final inputter. In contrast, when final check of the confirmed assembly time/date is successfully performed, the time/date notification screen (not illustrated) presenting the assembly time/date and the like confirmed by the final inputter themselves is displayed on the terminal apparatus 40A (Step S225).

After this, Steps S26 and S27 are executed. Through the above, the time/date adjustment processing corresponding to pattern γ ends.

According to the time/date adjustment processing corresponding to pattern γ described above, the adjustment initiator A can easily and efficiently select and confirm the time/date of the assembly with reference to the available time/dates of the participants on the adjustment initiator A side and the time/dates not inconvenient for the plurality of adjustment partners X so that as many adjustment partners X as possible can participate, while suppressing occurrence of a double booking.

According to the time/date adjustment processing corresponding to pattern γ, the confirmed time/date of the assembly and the like can be registered in the calendar tool 31 used by the participants on the adjustment initiator A side. Therefore, time and efforts for conventionally required manual registration of the schedule in the calendar tool 31 can be eliminated.

<When Adjustment Partner X Is User>

Figure 18:
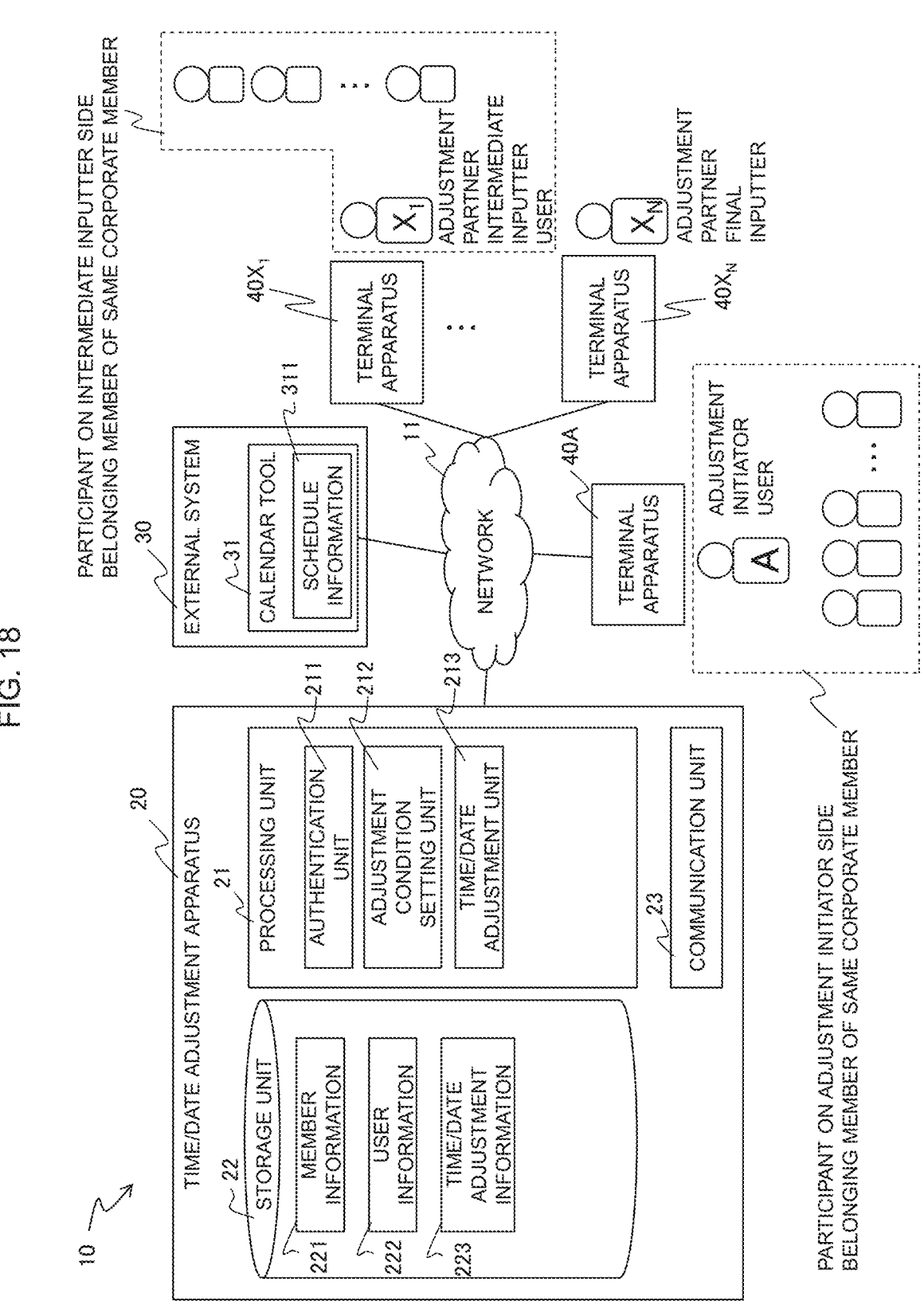
FIG. 18 is a diagram illustrating another configuration example of the time/date adjustment system according to one embodiment of the present invention.

Next, FIG. 18 illustrates another configuration example of the time/date adjustment system 10 according to one embodiment of the present invention.

The configuration example of FIG. 18 corresponds to a case in which the adjustment partner $X_1$ to be the intermediate inputter is a user of the time/date adjustment apparatus 20. In this case, regarding the adjustment partner $X_1$, the adjustment partner $X_1$ can set the adjustment condition on the intermediate inputter side for the assembly of which time/date is adjusted by the adjustment initiator A. Specifically, the participants of the assembly can be designated out of the belonging members of the corporate member to which the adjustment partner $X_1$ as the intermediate inputter belongs, the time secured before and after the assembly can be designated, and the site of the assembly can be designated.

Note that, as a default value of the adjustment condition on the intermediate inputter side at the timing when the adjustment URL is accessed, the number of participants on the intermediate inputter side is one, namely the intermediate inputter themselves, and other items are not designated. Further, when the adjustment condition is changed, the participants on the intermediate inputter side may or may not include the intermediate inputter themselves, and may be a plurality of persons.

Figure 19:
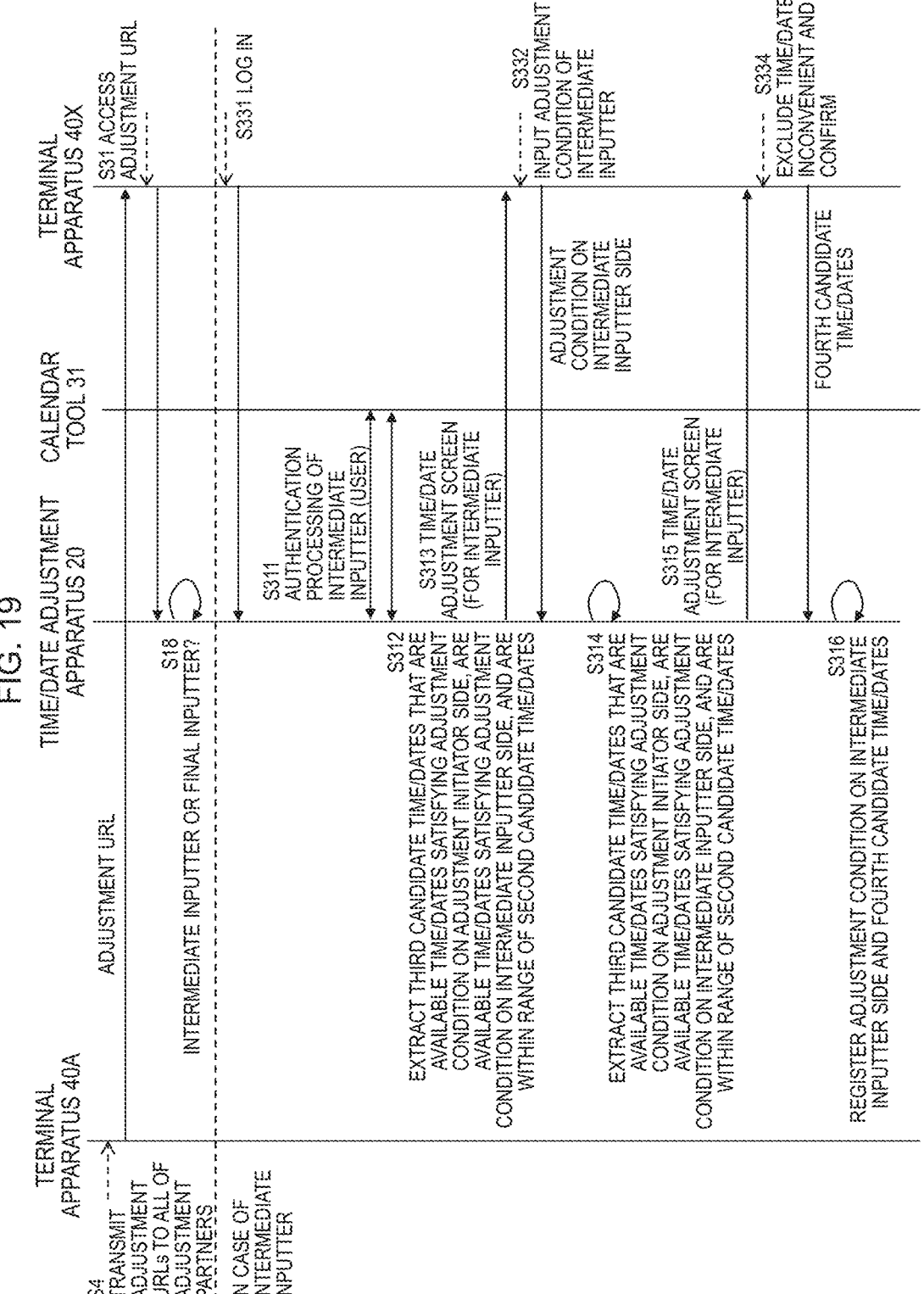
FIG. 19 is a sequence diagram for illustrating an operation example of a case in which an adjustment partner is a user, which corresponds to pattern α.
Figure 20:
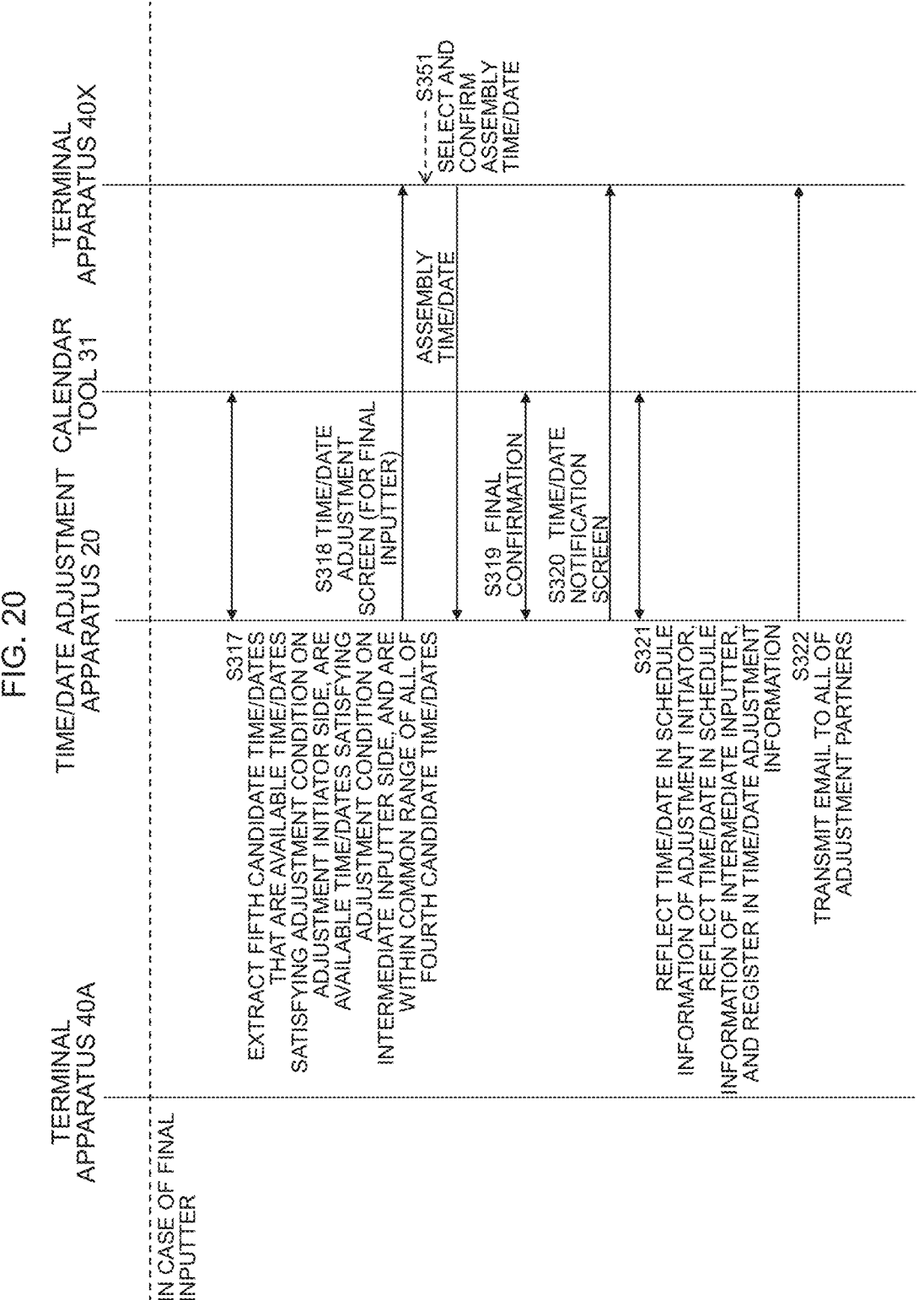
FIG. 20 is a sequence diagram for illustrating an operation example of a case in which an adjustment partner is a user, which corresponds to pattern α.

Operation Example Corresponding to Pattern α
when at Least One of Intermediate Inputters is
User FIG. 19 and FIG. 20 are sequence diagrams illustrating the operation example corresponding to pattern α to be executed subsequently to Step S17 (FIG. 4), when at least one of the intermediate inputters is a user. Note that common steps in the steps of the operation example and the operation example corresponding to pattern α illustrated in FIG. 9 when the intermediate inputter is not a user are denoted by the same step numbers, and thus description thereof will be omitted as appropriate.

First, the adjustment initiator A copies the adjustment URLs on the adjustment URL screen 610 (FIG. 8) displayed on the terminal apparatus 40A, pastes the adjustment URLs to electronic mails or the like, respectively, and transmits the electronic mails to the terminal apparatuses 40X of all of the three adjustment partners X (Step S4).

Note that, as a modification, when the email addresses of all of the adjustment partners X are input in the input field 518 on the condition setting screen 500, the display of the adjustment URL screen 610 may be omitted, and the time/date adjustment unit 213 may directly transmit the adjustment URLs to the email addresses of the adjustment partners X.

Next, when the adjustment partner X having received the adjustment URL accesses the adjustment URL by using the terminal apparatus 40X (Step S31), the time/date adjustment unit 213 of the time/date adjustment apparatus 20 determines whether the adjustment partner X performing access is the intermediate inputter or the final inputter (Step S18).

In a case where it is determined that the adjustment partner X performing access is the intermediate inputter, when the intermediate inputter logs in to the time/date adjustment apparatus 20 via the network 11 by using the terminal apparatus 40X (Step S331), in response to the login of the intermediate inputter, the authentication unit 211 of the time/date adjustment apparatus 20 performs authentication processing with the external system 30, by using the user account or the user authentication information included in the user information 222 corresponding to the intermediate inputter stored by the storage unit 22 (Step S311). When the login of the intermediate inputter described above and the authentication processing corresponding thereto succeed, the time/date adjustment unit 213 recognizes that the intermediate inputter is a user.

Next, the time/date adjustment unit 213 reads the adjustment condition and the second candidate time/dates of the adjustment initiator A registered in the adjustment initiator information 2231 of the time/date adjustment information 223 corresponding to the adjustment initiator A, refers to the schedule information 311 of the participants on the adjustment initiator A side and the participants on the intermediate inputter side managed by the calendar tool 31, and extracts the third candidate time/dates that satisfy the adjustment condition of the adjustment initiator A, are available time/dates of the participants on the adjustment initiator A side, satisfy the default adjustment condition of the intermediate inputter, are available time/dates of the participants on the intermediate inputter side, and are within a range of the second candidate time/dates, at the current time point (Step S312).

Next, the time/date adjustment unit 213 causes the terminal apparatus 40X of the intermediate inputter performing access to display a time/date adjustment screen 850 (FIG. 21) for the intermediate inputter being a user, which presents the extracted third candidate time/dates (Step S313).

FIG. 21 illustrates a display example of the time/date adjustment screen 850 for the intermediate inputter being a user.

On the time/date adjustment screen 850, in addition to the third candidate time/date frames 802 in the calendar 801 on the time/date adjustment screen 800 (FIG. 10) for the intermediate inputter not being a user, an existing plan frame 851 presenting an existing plan (in the case of the figure, 13:00 to 14:00 on December 16th (Wednesday)) of the intermediate inputter is displayed. The time/date adjustment screen 850 is additionally provided with an add adjustment condition button 852 for displaying a screen (not illustrated) on which the intermediate inputter being a user can add the adjustment condition of the intermediate inputter. The third candidate time/dates displayed on the time/date adjustment screen 850 for the intermediate inputter being a user reflect the existing plans of the intermediate inputter, and thus time and efforts for the intermediate inputter to perform excluding time/dates inconvenient for the intermediate inputter can be reduced.

FIG. 19 is referred to again. Next, the intermediate inputter performs operation on the add adjustment condition button 852 on the time/date adjustment screen 850, and inputs the adjustment condition of the intermediate inputter (Step S332). Here, for example, the following description will be given based on an assumption that, as the adjustment condition of the intermediate inputter, the number of participants on the intermediate inputter side is set to two persons, namely the intermediate inputter themselves and Y, and the time secured before and after the assembly is each set to "30 minutes".

Next, the time/date adjustment unit 213 reads the adjustment condition and the second candidate time/dates of the adjustment initiator A registered in the adjustment initiator information 2231 of the time/date adjustment information 223 corresponding to the adjustment initiator A, refers to the schedule information 311 of the participants on the adjustment initiator A side and the participants on the intermediate inputter side managed by the calendar tool 31, and extracts the third candidate time/dates that satisfy the adjustment condition of the adjustment initiator A, are available time/dates of the participants on the adjustment initiator A side, satisfy the adjustment condition of the intermediate inputter, are available time/dates of the participants on the intermediate inputter side, and are within a range of the second candidate time/dates, at the current time point (Step S314).

Next, the time/date adjustment unit 213 causes the terminal apparatus 40X of the intermediate inputter performing access to display a time/date adjustment screen 860 (FIG. 22) for the intermediate inputter being a user, which presents the extracted third candidate time/dates (Step S315).

FIG. 22 illustrates a display example of the time/date adjustment screen 860 for the intermediate inputter being a user. The time/date adjustment screen 860 reflect plans of the participants on the intermediate inputter side and the adjustment condition of the intermediate inputter for the time/date adjustment screen 860, and thus time and efforts for the intermediate inputter to check the plans of the participants on the intermediate inputter side and the like can be reduced.

Specifically, the third candidate time/date displayed at 14:00 to 16:00 on December 16th (Wednesday) on the time/date adjustment screen 850 (FIG. 21) is reduced to 14:30 to 16:00 on the time/date adjustment screen 860, with a plan of a meeting (13:00 to 14:00) of the intermediate inputter and "30 minutes" as the time secured before the assembly being reflected. The third candidate time/date displayed at 11:30 to 15:30 on December 18th (Friday) on the time/date adjustment screen 850 (FIG. 21) is reduced to 13:30 to 15:30, with a plan of going out (09:00 to 13:00) of the participant Y added on the intermediate inputter side and "30 minutes" as the time secured before the assembly being reflected.

Note that input of the adjustment condition by the intermediate inputter of Step S332 may not be performed. In that case, S332, S314, and S315 are omitted, and the processing proceeds to Step S334.

FIG. 19 is referred to again. When the intermediate inputter excludes time/dates inconvenient for the participants on the intermediate inputter side on the time/date adjustment screen 860 (or the time/date adjustment screen 850), and the intermediate inputter inputs the email address of the intermediate inputter and performs a selection operation on the transmission timing of the notification email on the time/date confirmation screen (not illustrated) displayed subsequently (Step S334), next, the time/date adjustment unit 213 of the time/date adjustment apparatus 20 registers the adjustment condition of the intermediate inputter input in Step S332, the fourth candidate time/dates as results after the intermediate inputter excludes time/dates inconvenient for the intermediate inputter, and the email address and the timing of transmitting the notification email input by the intermediate inputter themselves in the adjustment partner information 2232B corresponding to the intermediate inputter which is included in the time/date adjustment information 223 corresponding to the adjustment initiator A (Step S316). After this, the time/date adjustment unit 213 stands by until the next adjustment partner X performs access.

Then, when the adjustment partner X performing access next is the intermediate inputter and a user, the processing similar to Steps S331, S311, S312, S313, S332, S314, S315, S334, and S316 is repeated.

Note that, in Step S312 for the intermediate inputter performing access second or later, the time/date adjustment unit 213 extracts the third candidate time/dates that are available time/dates of the participants on the adjustment initiator A side satisfying the adjustment condition of the adjustment initiator A, are available time/dates of the participants on the intermediate inputter side satisfying the adjustment condition of the intermediate inputter being a user having finished input, are available time/dates satisfying the default adjustment condition of the intermediate inputter performing access, and are within a common range of the fourth candidate time/dates of the intermediate inputter (whether or not the intermediate inputter is a user does not matter) having finished input, at the current time point. In Step S314, the time/date adjustment unit 213 extracts the third candidate time/dates that are available time/dates of the participants on the adjustment initiator A side satisfying the adjustment condition of the adjustment initiator A, are available time/dates of the participant on the intermediate inputter side satisfying the adjustment condition of the intermediate inputter being a user having finished input, are available time/dates satisfying the adjustment condition of the intermediate inputter performing access, and are within a common range of the fourth candidate time/dates of the intermediate inputter having finished input (whether or not the intermediate inputter is a user does not matter), at the current time point.

In this manner, when the intermediate inputter having finished input in advance is a user, the third candidate time/dates presented for the intermediate inputter performing access second or later reflect available time/dates of the participants on the intermediate inputter side satisfying the adjustment condition of the intermediate inputter having finished input in advance and the fourth candidate time/dates of other intermediate inputters having finished input in advance regardless of whether or not the intermediate inputters are users. Thus, the fourth candidate time/dates registered for each intermediate inputter are more narrowed down as the number of intermediate inputters having finished input is increased.

Note that, when the adjustment partner X performing access next is the intermediate inputter and is not a user, the processing similar to Steps S19, S20, S41, and S21 of FIG. 9 is repeated. Note that, in Step S19 for the intermediate inputter performing access second or later, the time/date adjustment unit 213 extracts the third candidate time/dates that are available time/dates of the participants on the adjustment initiator A side at the current time point, satisfy the adjustment condition of the adjustment initiator A, are available time/dates of the participants on the intermediate inputter side satisfying the adjustment condition of the intermediate inputter having finished input, and are within a range of the fourth candidate time/dates of other intermediate inputters having finished input in advance regardless of whether or not the intermediate inputters are users.

Here, it is assumed that, of the three adjustment partners X, the intermediate inputter performing access first is a user, and the intermediate inputter performing access second is not a user. As a result, one piece out of three pieces of adjustment partner information 2232 included in the time/ date adjustment information 223 corresponding to the adjustment initiator A in the storage unit 22 is the adjustment partner information 2232B corresponding to the intermediate inputter being a user, and another piece is the adjustment partner information 2232A corresponding to the intermediate inputter being not a user.

The following description will be given based on an assumption that time/date adjustment by the second intermediate inputter has finished, the third adjustment partner X performs access, and it is determined that the third adjustment partner X is the final inputter in Step S18.

FIG. 20 is referred to. When the adjustment partner X performing access is the final inputter, next, the time/date adjustment unit 213 reads the adjustment condition registered in the adjustment initiator information 2231 of the time/date adjustment information 223 corresponding to the adjustment initiator A, the adjustment condition and the fourth candidate time/dates registered in the adjustment partner information 2232B, and the fourth candidate time/dates registered in the adjustment partner information 2232A, refers to the schedule information 311 of the participants on the adjustment initiator A side and the participants on the intermediate inputter side each being a user managed by the calendar tool 31, and extracts the fifth candidate time/dates that are available time/dates of the participants on the adjustment initiator A side satisfying the adjustment condition of the adjustment initiator A, are available time/dates of the participants on the intermediate inputter side satisfying the adjustment condition of the intermediate inputter being a user, and are within a common range of all of the fourth candidate time/dates, at the current time point (Step S317).

Next, the time/date adjustment unit 213 causes the terminal apparatus 40X of the final inputter to display the time/date adjustment screen (not illustrated) for the final inputter presenting the fifth candidate time/dates (Step S318).

Next, when the final inputter determines the assembly time/date on the time/date adjustment screen for the final inputter, and inputs the email address of the final inputter, selects the timing of transmitting the notification email, and performs confirmation operation on the assembly time/date on the time/date confirmation screen (not illustrated) displayed subsequently (Step S351), the time/date adjustment unit 213 of the time/date adjustment apparatus 20 refers to the schedule information 311 of the participants on the adjustment initiator A side and the participants on the intermediate inputter side each being a user managed by the calendar tool 31, and performs final check that the assembly time/date confirmed by the final inputter is an available time/date of the participants on the adjustment initiator A side satisfying the adjustment condition of the adjustment initiator A at the current time point and is an available time/date of the participants on the intermediate inputter side satisfying the adjustment condition of the intermediate inputter being a user (Step S319).

Here, when the confirmed assembly time/date is no longer an available time/date of the participants on the adjustment initiator A side satisfying the adjustment condition of the adjustment initiator A or is no longer an available time/date of the participants on the intermediate inputter side satisfying the adjustment condition of the intermediate inputter being a user, for example, a message such as "The designated time has been occupied. Select again" may be displayed on the terminal apparatus 40X of the final inputter, and the processing may be brought back to Step S318 and may resume from the selection operation of the assembly time/date performed by the final inputter. In contrast, when final check is successfully performed that the confirmed assembly time/date is an available time/date of the participants on the adjustment initiator A side satisfying the adjustment condition of the adjustment initiator A and is an available time/date of the participants on the intermediate inputter side satisfying the adjustment condition of the intermediate inputter being a user, the time/date notification screen (not illustrated) presenting the assembly time/date and the like confirmed by the final inputter themselves is displayed on the terminal apparatus 40X of the final inputter (Step S320).

When final check is successfully performed in Step S319, the time/date adjustment unit 213 registers the plan of the assembly under adjustment in the schedule information 311 of the participants on the adjustment initiator A side and the participants on the intermediate inputter side each being a user managed by the calendar tool 31. The time/date adjustment unit 213 registers the confirmed date and time and place of the assembly in the adjustment basic information 2233 included in the time/date adjustment information 223 corresponding to the adjustment initiator A stored by the storage unit 22. Moreover, the time/date adjustment unit 213 registers the email address and the timing of transmitting the notification email input by the final inputter themselves in the adjustment partner information 2232 in which the adjustment URL accessed last is registered, the adjustment partner information 2232 being included in the time/date adjustment information 223 corresponding to the adjustment initiator A stored by the storage unit 22 (Step S321).

Next, the time/date adjustment unit 213 refers to the adjustment partner information 2232 of the time/date adjustment information 223 corresponding to the adjustment initiator A, and transmits a notification email for giving notification of holding of the assembly to the email address designated by each of the adjustment partners X in accordance with the timing designated by each of the adjustment partners X (Step S322).

Note that, in the present embodiment, an arrow from the time/date adjustment apparatus 20 to the terminal apparatus 40X is illustrated as Step S322, on the assumption that the adjustment partner X receives the electronic mail using the terminal apparatus 40X; however, the adjustment partner X may receive the notification email from the time/date adjustment apparatus 20, using an electronic device other than the terminal apparatus 40X.

Through the above, the time/date adjustment processing corresponding to pattern α when at least one of the intermediate inputters is a user ends.

In the time/date adjustment processing corresponding to pattern α when the intermediate inputter is not a user described above, the latest plans of the intermediate inputter cannot be acquired, and thus a double booking may be caused on the intermediate inputter side. In contrast, according to the time/date adjustment processing corresponding to pattern α when at least one of the intermediate inputters is a user, the latest plans of the participants on the intermediate inputter side each being a user can be acquired, and thus it can be made less likely that a double booking is caused on the intermediate inputter side. Moreover, when all of the intermediate inputters are users, occurrence of a double booking can be brought closer to zero to the extent possible.

Moreover, according to the time/date adjustment processing corresponding to pattern α when at least one of the intermediate inputters is a user, the confirmed time/date of the assembly and the like can be registered in the calendar tool 31 used by the participants on the intermediate inputter side each being a user. Thus, time and efforts for manual registration of the schedule in the calendar tool 31 conventionally required on the intermediate inputter side can be eliminated.

Note that the time/date adjustment screen (not illustrated) for the final inputter when the adjustment partner X as the final inputter is a user of the time/date adjustment apparatus 20 is additionally provided with an add adjustment condition button, similarly to the time/date adjustment screen 850, and in the calendar thereof, existing plan frames indicating existing plans of the final inputter being a user are displayed. This can prevent the final inputter being a user from making an error of selecting a time/date inconvenient for the final inputter as the assembly time/date by mistake.

Regarding the operation examples corresponding to pattern β and pattern γ when at least one of the intermediate inputters is a user, similarly, each candidate time/date may be extracted, with the adjustment condition of the intermediate inputter being a user and the available time/dates of the participants on the intermediate inputter side being reflected. With this configuration, it can be made less likely that a double booking is caused on the intermediate inputter side being a user.

<When Number of Participants on Adjustment Initiator a Side is Zero>

The time/date adjustment apparatus 20 can be operated on the condition that the number of adjustment partners X is two or more, even if the number of participants on the adjustment initiator A side is zero. Thus, the condition setting screen 500 (FIG. 5) is provided with the radio button 503 for selecting whether or not participant (s) from the own company are present. Note that whether or not participant (s) from the own company are present is defined as an independent setting value not included in the adjustment condition, similarly to the number of adjustment partners and the adjustment pattern. Whether or not participant (s) from the own company are present may be registered in the adjustment basic information 2233 of the time/date adjustment information 223, similarly to the number of adjustment partners and the adjustment pattern.

Next, the following will describe an operation of a case in which "no participant (s)" is selected as the participant (s) from the own company in the radio button 503 on the condition setting screen 500 (FIG. 5). The operation can be applied to any of the cases in which the adjustment pattern is pattern α, pattern β, or pattern γ.

In a case of "no participant (s)" as the participant (s) from the own company, in Step S14 (FIG. 4) of the time/date adjustment processing described above, the first candidate time/dates that satisfy the adjustment condition of the adjustment initiator A are extracted, regardless of the available time/dates of the participants on the adjustment initiator A side not being present. Specifically, the processing of extracting the candidate time/dates is performed on an assumption that all of the time/dates included in the extraction span of the candidate time/dates and the time frame available for the assembly are the available time/dates on the adjustment initiator A side. This holds true for Steps S19 and S22 and the like in which the condition of extracting the candidate time/dates includes being the available time/dates of the participants on the adjustment initiator A side.

Further, in a case of "no participant (s)" as the participant (s) from the own company, in Step S26 and the like, the confirmed date and time and place of the assembly and the like may be registered in the schedule information 311 of the participants on the adjustment initiator A side as a memorandum instead of a plan, or may be registered in shared schedule information 311 as a plan in which participants are not present.

Operation in which the number of participants on the adjustment initiator A side is zero can be applied when, for example, an employee (adjustment initiator A) of an employment agency (corporate member) performs adjustment of a time/date of a recruitment interview between two parties, namely a staff (adjustment partner $X_1$) of a company seeking a worker and a job applicant (adjustment partner $X_2$).

Typically, for example, the time/date adjustment apparatus of the present embodiment can prepare various operation screens as web pages, and can display such operation screens in a web browser of the terminal apparatus. However, this aspect is not restrictive. For example, a dedicated application including various operation screens may be installed in the terminal apparatus. In this case, by transmitting a part of contents (data such as candidate time/dates) to be displayed on various operation screens to the terminal apparatus, the time/date adjustment apparatus can cause the dedicated application of the terminal apparatus to display various operation screens. In other words, the time/date adjustment apparatus of the present invention may also encompass various aspects in which screens can be displayed in the terminal apparatus.

The present invention is not limited to the embodiments and modifications described above, and further various modifications can be made. For example, the embodiments and the modifications described above are described in detail in order to give simple description of the present invention, and are not necessarily limited to those including all of the configurations described above. A part of one modification may be replaced with another modification, or modifications may be combined together.

A part or all of each configuration, function, processing unit, processing means, and the like described above may be, for example, implemented with hardware by designing those with an integrated circuit, for example. Each configuration, function, and the like described above may be implemented with software by a processor interpreting and executing a program for implementing their respective functions. Information such as a program, a table, and a file for implementing respective functions may be stored in a recording apparatus such as a memory, a hard disk, and an SSD, or a recording medium such as an IC card, an SD card, and a DVD. Illustrated control lines and information lines are those considered to be necessary for the sake of description, and not necessarily all of control lines and information lines for a product are illustrated. It may be considered that most of the configurations are connected to each other in actuality.

REFERENCE SIGNS LIST

10 . . . Time/date adjustment system
11 . . . Network
20 . . . Time/date adjustment apparatus
21 . . . Processing unit
211 . . . Authentication unit
212 . . . Adjustment condition setting unit
213 . . . Time/date adjustment unit
22 . . . Storage unit
221 . . . Member information
222 . . . User information
223 . . . Time/date adjustment information
2231 . . . Adjustment initiator information
2232 . . . Adjustment partner information

2233 . . . Adjustment basic information
23 . . . Communication unit
30 . . . External system
31 . . . Calendar tool
311 . . . Schedule information
40A, 40X . . . Terminal apparatus
500 . . . Condition setting screen
600 . . . Time/date editing screen
610, 620 . . . Adjustment URL screen
800 . . . Time/date adjustment screen
810 . . . Time/date confirmation screen
850,860 . . . Time/date adjustment screen
910 . . . Time/date adjustment screen
920 . . . Time/date confirmation screen
1000 . . . Time/date notification screen

The invention claimed is:

1. A time/date adjustment apparatus with a memory comprising:

an adjustment condition setting unit configured to set an adjustment condition related to an assembly; and a time/date adjustment unit configured to adjust an assembly time/date based on the adjustment condition, wherein the adjustment condition setting unit causes a first terminal apparatus used by an adjustment initiator to display a condition setting screen for setting the adjustment condition, and sets number of a plurality of adjustment partners, who are intended to perform an input operation on a time/date adjustment screen, and the adjustment condition including designation of one or more participants, who are intended to participate in the assembly and on a side of the adjustment initiator, based on an input of the adjustment initiator on the condition setting screen, wherein the memory stores the number of the adjustment partners and the designation of the participants, the time/date adjustment unit determines second candidate time/dates based on the input of the adjustment initiator, wherein the memory stores the second candidate time/dates, the time/date adjustment unit issues access information for the time/date adjustment screen, and the memory stores the access information, when one of the adjustment partners being an intermediate inputter accesses the time/date adjustment apparatus using the access information, the time/date adjustment unit retrieves schedule information of all the participants on the side of the adjustment initiator from an external system wherein the schedule information of the participants is managed by the external system, and extracts third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the intermediate inputter, the time/date adjustment unit causes a second terminal apparatus used by the intermediate inputter to display the time/date adjustment screen for the intermediate inputter presenting the extracted third candidate time/dates, and determines fourth candidate time/dates based on an input operation of the intermediate inputter on the time/date adjustment screen for the intermediate inputter, wherein the memory stores the fourth candidate time/dates, when another of the adjustment partners being a final inputter accesses the time/date adjustment apparatus using the access information, the time/date adjustment unit retrieves the schedule information of all the participants on the side of the adjustment initiator from the external system, and extracts fifth candidate time/dates that are available time/dates of the participants on the side of the adjustment initiator satisfying the adjustment condition of the adjustment initiator and are within a common range of all of the fourth candidate time/dates by referring to the schedule information that is retrieved in correspondence with the access by the final inputter, the time/date adjustment unit causes a third terminal apparatus used by the final inputter to display the time/date adjustment screen for the final inputter presenting the extracted fifth candidate time/dates, and determines the assembly time/date out of the extracted fifth candidate time/dates based on a selection operation of the final inputter on the time/date adjustment screen for the final inputter, and the time/date adjustment unit registers the determined assembly time/date in the schedule information of the participants on the side of the adjustment initiator managed by the external system.

2. The time/date adjustment apparatus according to claim 1, wherein when the one of the adjustment partners accesses the time/date adjustment apparatus using the access information, the time/date adjustment unit reads, from the memory, number of times that the fourth candidate time/dates stored in the memory have been input wherein the number of times for the fourth candidate time/dates input is defined as an input completion number, and determines if the one of the adjustment partners is the final inputter or not by comparing the input completion number with the number of the adjustment partners that is stored in the memory.

3. The time/date adjustment apparatus according to claim 1, wherein the time/date adjustment unit transmits the access information to the adjustment initiator or the final inputter, based on finishing inputting of all of the intermediate inputters on the time/date adjustment screen for the intermediate inputters.

4. The time/date adjustment apparatus according to claim 1, wherein the time/date adjustment unit issues a different or common piece of the access information for the plurality of adjustment partners.

5. The time/date adjustment apparatus according to claim 1, wherein when the adjustment initiator sets the adjustment condition, the time/date adjustment unit retrieves the schedule information of all the participants on the side of the adjustment initiator managed by the external system, and extracts available time/dates of the participants on the side of the adjustment initiator satisfying the adjustment condition of the adjustment initiator as first candidate time/dates by referring to the schedule information that is retrieved in correspondence with the setting of the adjustment condition by the adjustment initiator, and the time/date adjustment unit causes the first terminal apparatus to display a time/date editing screen for editing the extracted first candidate time/dates, and determines the second candidate time/dates edited based on the input of the adjustment initiator on the time/date editing screen.

6. The time/date adjustment apparatus according to claim 1, wherein one of the adjustment partners who performs a first access to the time/date adjustment apparatus is defined as a first intermediate inputter and when the first intermediate inputter accesses the time/date adjustment apparatus using the access information, the time/date adjustment unit retrieves the schedule information, which is managed by the external system, of all the participants on the side of the adjustment initiator, and extracts the third candidate time/dates that are the available time/dates of the participants on the side of the adjustment initiator satisfying the adjustment condition of the adjustment initiator and are within the range of the second candidate time/dates by referring to the schedule information that is retrieved in correspondence with the access by the first intermediate inputter, and another of the adjustment partners who perform a second access or a subsequent accesses to the time/date adjustment apparatus is defined as a second intermediate inputter or a subsequent intermediate inputter, and when the second intermediate inputter or the subsequent intermediate inputter accesses the time/date adjustment apparatus using the access information, the time/date adjustment unit retrieves the schedule information, which is managed by the external system, of all the participants on the side of the adjustment initiator, and extracts the third candidate time/dates that are the available time/dates of the participants on the side of the adjustment initiator satisfying the adjustment condition of the adjustment initiator and are within the common range of all of the fourth candidate time/dates determined in advance based on the input operation of the second intermediate inputter or the subsequent intermediate inputter who previously accesses the time/date adjustment apparatus by referring to the schedule information that is retrieved in correspondence with the access by the second intermediate inputter or the subsequent intermediate inputter.

7. The time/date adjustment apparatus according to claim 1, wherein the time/date adjustment unit transmits a notification indicating the determined assembly time/date to at least one of the adjustment partners.

8. The time/date adjustment apparatus according to claim 1, wherein the time/date adjustment unit excludes undesired time/dates in correspondence with the input operation performed by the intermediate inputter on the time/date adjustment screen for the intermediate inputter from the third candidate time/dates, and thereby determines the fourth candidate time/dates.

9. The time/date adjustment apparatus according to claim 1, wherein when the intermediate inputter is a user of the time/date adjustment apparatus, the adjustment condition setting unit sets the adjustment condition including designation of one or more participants on a side of the intermediate inputter based on an input of the intermediate inputter being the user, storing the designation of the participants on the side of the intermediate inputter in the memory, wherein the participants on the side of the intermediate inputter are intended to participate in the assembly, the schedule information of the participants on the side of the intermediate inputter is managed by the external system, and the participants on the side of the intermediate inputter do not perform the input operation on the time/date adjustment screen, and when the adjustment condition of the intermediate inputter including the designation of the participants on the side of the intermediate inputter is set, the time/date adjustment unit retrieves the schedule information, which is managed by the external system, of all the participants on the side of the intermediate inputter, and extracts the third candidate time/dates and the fifth candidate time/dates that are available time/dates of the participants on the side of the intermediate inputter satisfying the adjustment condition of the intermediate inputter by referring to the schedule information of the participants on the side of intermediate inputter that is retrieved.

10. The time/date adjustment apparatus according to claim 1, wherein the participant on the side of the adjustment initiator is the adjustment initiator, or a belonging member belonging to an organization same as the adjustment initiator, the belonging member being other than the adjustment initiator.

11. The time/date adjustment apparatus according to claim 1, wherein when a plurality of the participants on the side of the adjustment initiator are designated as the adjustment condition of the adjustment initiator, the time/date adjustment unit extracts the third candidate time/dates and the fifth candidate time/dates that satisfy being the available time/dates of all of the plurality of the participants on the side of the adjustment initiator.

12. The time/date adjustment apparatus according to claim 1, wherein when a plurality of the participants on the side of the adjustment initiator are designated as the adjustment condition of the adjustment initiator, the time/date adjustment unit extracts the third candidate time/dates and the fifth candidate time/dates that satisfy being the available time/dates of at least one of the plurality of the participants on the side of the adjustment initiator.

13. The time/date adjustment apparatus according to claim 1, wherein when adjustment condition including designation indicating that no participant on the side of the adjustment initiator exists is set as the adjustment condition of the adjustment initiator, the adjustment condition setting unit stores, in the memory, the designation indicating that no participant on the side of the adjustment initiator exists, and when the designation indicating that no participant on the side of the adjustment initiator exists is set, the time/date adjustment unit extracts the third candidate time/dates and the fifth candidate time/dates without confirming if the third candidate time/dates and the fifth candidate time/dates meet the available time/dates of the participants on the side of the adjustment initiator.

14. The time/date adjustment apparatus according to claim 1, wherein when one or more sites to be used for the assembly on the side of the adjustment initiator is designated as the adjustment condition of the adjustment initiator, the time/date adjustment unit retrieves the schedule information of all the sites on the side of the adjustment initiator managed by the external system, and extracts the third candidate time/dates and the fifth candidate time/dates that satisfy being available time/dates of any one of the sites on the side of the adjustment initiator by referring to the schedule information of the sites on the side of the adjustment initiator that is retrieved.

15. A time/date adjustment apparatus with a memory comprising:

an adjustment condition setting unit configured to set an adjustment condition related to an assembly; and a time/date adjustment unit configured to adjust an assembly time/date based on the adjustment condition, wherein the adjustment condition setting unit causes a first terminal apparatus used by an adjustment initiator to display a condition setting screen for setting the adjustment condition, and sets the adjustment condition including designation of one or more participants, who are intended to participate in the assembly, and on a side of the adjustment initiator, based on an input of the adjustment initiator on the condition setting screen, wherein the memory stores the designation of the participants, the time/date adjustment unit determines second candidate time/dates based on the input of the adjustment initiator, wherein the memory stores the second candidate time/dates, the time/date adjustment unit issues access information for a time/date adjustment screen, and the memory stores the access information, when either one adjustment partner or one of a plurality of adjustment partners, who are intended to perform an input operation on the time/date adjustment screen, being an intermediate inputter accesses the time/date adjustment apparatus using the access information wherein the one adjustment partner and the plurality of the adjustment partners are collectively defined as the adjustment partners, and the one of the adjustment partners who accesses the time/date adjustment apparatus is defined as an access adjustment partner, the time/date adjustment unit retrieves schedule information of all the participants on the side of the adjustment initiator from external system wherein the schedule information of the participants is managed by the external system, and extracts third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the access adjustment partner, the time/date adjustment unit causes a second terminal apparatus used by the access adjustment partner to display the time/date adjustment screen for the intermediate inputter presenting the extracted third candidate time/dates, and determines fourth candidate time/dates based on an input operation of the access adjustment partner on the time/date adjustment screen for the intermediate inputter, wherein the memory stores the fourth candidate time/dates, based on finishing the input operation of either one of the adjustment partners or all of the adjustment partners on the time/date adjustment screen for the intermediate inputter, the time/date adjustment unit notifies the adjustment initiator that the input operation of the one or all of the adjustment partners on the time/date adjustment screen for the intermediate inputter has finished, when the adjustment initiator accesses the time/date adjustment apparatus using the access information after being notified that the input operation of the one or all of the adjustment partners has finished, the time/date adjustment unit retrieves the schedule information of all the participants on the side of the adjustment initiator from the external system, and extracts fifth candidate time/dates that are available time/dates of the participants on the side of the adjustment initiator satisfying the adjustment condition of the adjustment initiator and are within the range of the second candidate time/dates by referring to the schedule information that is retrieved in correspondence with the access by the adjustment initiator, the time/date adjustment unit causes the first terminal apparatus to display the time/date adjustment screen for a final inputter presenting both of all of the fourth candidate time/dates and the fifth candidate time/dates, and determines the assembly time/date out of the fifth candidate time/dates based on a selection operation of the adjustment initiator on the time/date adjustment screen for the final inputter, and the time/date adjustment unit registers the determined assembly time/date in the schedule information of the participants on the side of the adjustment initiator managed by the external system.

16. The time/date adjustment apparatus according to claim 15, wherein the time/date adjustment unit issues a common or different piece of the access information for the adjustment partners.

17. The time/date adjustment apparatus according to claim 15, wherein the adjustment condition setting unit sets number of the adjustment partners such that the number is one or more based on the input of the adjustment initiator on the condition setting screen.

18. The time/date adjustment apparatus according to claim 15, wherein when the adjustment initiator sets the adjustment condition, the time/date adjustment unit retrieves the schedule information of all the participants on the side of the adjustment initiator managed by the external system, and extracts available time/dates of the participants on the side of the adjustment initiator satisfying the adjustment condition of the adjustment initiator as first candidate time/dates by referring to the schedule information that is retrieved in correspondence with the setting of the adjustment condition by the adjustment initiator, and

the time/date adjustment unit causes the first terminal apparatus to display a time/date editing screen for editing the extracted first candidate time/dates, and determines the second candidate time/dates edited based on the input of the adjustment initiator on the time/date editing screen.

19. The time/date adjustment apparatus according to claim 15, wherein one of the adjustment partners who performs a first access to the time/date adjustment apparatus is defined as a first intermediate inputter and when the first intermediate inputter accesses the time/date adjustment apparatus using the access information, the time/date adjustment unit retrieves the schedule information, which is managed by the external system, of all the participants on the side of the adjustment initiator, and extracts the third candidate time/dates that are the available time/dates of the participants on the side of the adjustment initiator satisfying the adjustment condition of the adjustment initiator and are within the range of the second candidate time/dates by referring to the schedule information that is retrieved in correspondence with the access by the first intermediate inputter, and another of the adjustment partners who perform a second access or a subsequent accesses to the time/date adjustment apparatus is defined as a second intermediate inputter or a subsequent intermediate inputter, and when the second intermediate inputter or the subsequent intermediate inputter accesses the time/date adjustment apparatus using the access information, the time/date adjustment unit retrieves the schedule information, which is managed by the external system, of all the participants on the side of the adjustment initiator, and extracts the third candidate time/dates that are the available time/dates of the participants on the side of the adjustment initiator satisfying the adjustment condition of the adjustment initiator and are within the common range of all of the fourth candidate time/dates determined in advance based on the input operation of the second intermediate inputter or the subsequent intermediate inputter who previously accesses the time/date adjustment apparatus by referring to the schedule information that is retrieved in correspondence with the access by the second intermediate inputter or the subsequent intermediate inputter.

20. The time/date adjustment apparatus according to claim 15, wherein the time/date adjustment unit transmits a notification indicating the determined assembly time/date to at least one of the adjustment partners.

21. The time/date adjustment apparatus according to claim 15, wherein the time/date adjustment unit excludes undesired time/dates in correspondence with the input operation performed by the intermediate inputter on the time/date adjustment screen for the intermediate inputter from the third candidate time/dates, and thereby determines the fourth candidate time/dates.

22. The time/date adjustment apparatus according to claim 15, wherein when the intermediate inputter is a user of the time/date adjustment apparatus, the adjustment condition setting unit sets the adjustment condition including designation of one or more participants on a side of the intermediate inputter based on an input of the intermediate inputter being the user, storing the designation of the participants on the side of the intermediate inputter in the memory, wherein the participants on the side of the intermediate inputter are intended to participate in the assembly, the schedule information of the participants on the side of the intermediate inputter is managed by the external system, and the participants on the side of the intermediate inputter do not perform the input operation on the time/date adjustment screen, and when the adjustment condition of the intermediate inputter including the designation of the participants on the side of the intermediate inputter is set, the time/date adjustment unit retrieves the schedule information, which is managed by the external system, of all the participants on the side of the intermediate inputter, and extracts the third candidate time/dates and the fifth candidate time/dates that are available time/dates of the participants on the side of the intermediate inputter satisfying the adjustment condition of the intermediate inputter by referring to the schedule information of the participants on the side of intermediate inputter that is retrieved.

23. The time/date adjustment apparatus according to claim 15, wherein the participant on the side of the adjustment initiator is the adjustment initiator, or a belonging member belonging to an organization same as the adjustment initiator, the belonging member being other than the adjustment initiator.

24. The time/date adjustment apparatus according to claim 15, wherein when a plurality of the participants on the side of the adjustment initiator are designated as the adjustment condition of the adjustment initiator, the time/date adjustment unit extracts the third candidate time/dates and the fifth candidate time/dates that satisfy being the available time/dates of all of the plurality of the participants on the side of the adjustment initiator.

25. The time/date adjustment apparatus according to claim 15, wherein when a plurality of the participants on the side of the adjustment initiator are designated as the adjustment condition of the adjustment initiator, the time/date adjustment unit extracts the third candidate time/dates and the fifth candidate time/dates that satisfy being the available time/dates of at least one of the plurality of the participants on the side of the adjustment initiator.

26. The time/date adjustment apparatus according to claim 15, wherein when the adjustment condition including designation indicating that no participant on the side of the adjustment initiator exists is set as the adjustment condition of the adjustment initiator, the adjustment condition setting unit stores, in the memory, the designation indicating that no participant on the side of the adjustment initiator exists, and when the designation indicating that no participant on the side of the adjustment initiator exists is set, the time/date adjustment unit extracts the third candidate time/dates and the fifth candidate time/dates without confirming if the third candidate time/dates and the fifth candidate time/dates meet the available time/dates of the participants on the side of the adjustment initiator.

27. The time/date adjustment apparatus according to claim 15, wherein when one or more sites to be used for the assembly on the side of the adjustment initiator is designated as the adjustment condition of the adjustment initiator, the time/date adjustment unit retrieves the schedule information of all the sites on the side of the adjustment initiator managed by the external system, and extracts the third candidate time/dates and the fifth candidate time/dates that satisfy being available time/dates of any one of the sites on the side of the adjustment initiator by referring to the schedule information of the sites on the side of the adjustment initiator that is retrieved.

28. A time/date adjustment method performed by a time/date adjustment apparatus with a memory, the time/date adjustment method comprising:

an adjustment condition setting step of setting an adjustment condition related to an assembly; and a time/date adjustment step of adjusting an assembly time/date based on the adjustment condition, wherein the adjustment condition setting step includes causing a first terminal apparatus used by an adjustment initiator to display a condition setting screen for setting the adjustment condition, and setting number of a plurality of adjustment partners, who are intended to perform an input operation on a time/date adjustment screen, and the adjustment condition including designation of one or more participants, who are intended to participate in the assembly and on a side of the adjustment initiator, based on an input of the adjustment initiator on the condition setting screen, wherein the memory stores the number of the adjustment partners and the designation of the participants, the time/date adjustment step includes determining second candidate time/dates based on the input of the adjustment initiator, wherein the memory stores the second candidate time/dates, the time/date adjustment step includes issuing access information for the time/date adjustment screen, and the memory stores the access information, when one of the adjustment partners being an intermediate inputter accesses the time/date adjustment apparatus using the access information, the time/date adjustment step includes retrieving schedule information of all the participants on the side of the adjustment initiator from an external system wherein the schedule information of the participants is managed by the external system, and extracting third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the intermediate inputter, the time/date adjustment step includes causing a second terminal apparatus used by the intermediate inputter to display the time/date adjustment screen for the intermediate inputter presenting the extracted third candidate time/dates, and determining fourth candidate time/dates based on an input operation of the intermediate inputter on the time/date adjustment screen for the intermediate inputter wherein the memory stores fourth candidate time/dates, when another of the adjustment partners being a final inputter accesses the time/date adjustment apparatus using the access information, the time/date adjustment step includes retrieving the schedule information of all the participants on the side of the adjustment initiator from the external system, and extracting fifth candidate time/dates that are available time/dates of the participants on the side of the adjustment initiator satisfying the adjustment condition of the adjustment initiator and are within a common range of all of the fourth candidate time/dates by referring to the schedule information that is retrieved in correspondence with the access by the final inputter, the time/date adjustment step includes causing a third terminal apparatus used by the final inputter to display the time/date adjustment screen for the final inputter presenting the extracted fifth candidate time/dates, and determining the assembly time/date out of the extracted fifth candidate time/dates based on a selection operation of the final inputter on the time/date adjustment screen for the final inputter, and the time/date adjustment step includes registering the determined assembly time/date in the schedule information of the participants on the side of the adjustment initiator managed by the external system.

29. A non-transitory computer-readable storage medium storing a program causing a computer to function as:

an adjustment condition setting unit configured to set an adjustment condition related to an assembly; and a time/date adjustment unit configured to adjust an assembly time/date based on the adjustment condition, wherein the adjustment condition setting unit causes a first terminal apparatus used by an adjustment initiator to display a condition setting screen for setting the adjustment condition, and sets number of a plurality of adjustment partners, who are intended to perform an input operation on a time/date adjustment screen, and the adjustment condition including designation of one or more participants, who are intended to participate in the assembly and on a side of the adjustment initiator, based on an input of the adjustment initiator on the condition setting screen, wherein the number of the adjustment partners and the designation of the participants are stored therein, the time/date adjustment unit determines second candidate time/dates based on the input of the adjustment initiator, wherein the second candidate time/dates are stored therein, the time/date adjustment unit issues access information for the time/date adjustment screen, and the access information is stored therein, when one of the adjustment partners being an intermediate inputter accesses the time/date adjustment apparatus using the access information, the time/date adjustment unit retrieves schedule information of all the participants on the side of the adjustment initiator from an external system wherein the schedule information of the participants is managed by the external system, and extracts third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the intermediate inputter, the time/date adjustment unit causes a second terminal apparatus used by the intermediate inputter to display the time/date adjustment screen for the intermediate inputter presenting the extracted third candidate time/dates, and determines fourth candidate time/dates based on an input operation of the intermediate inputter on the time/date adjustment screen for the intermediate inputter, wherein the fourth candidate time/dates is stored therein, when another of the adjustment partners being a final inputter accesses the time/date adjustment apparatus using the access information, the time/date adjustment unit retrieves the schedule information of all the participants on the side of the adjustment initiator from the external system, and extracts fifth candidate time/dates that are available time/dates of the participants on the side of the adjustment initiator satisfying the adjustment condition of the adjustment initiator and are within a common range of all of the fourth candidate time/dates by referring to the schedule information that is retrieved in correspondence with the access by the final inputter, the time/date adjustment unit causes a third terminal apparatus used by the final inputter to display the time/date adjustment screen for the final inputter presenting the extracted fifth candidate time/dates, and determines the assembly time/date out of the extracted fifth candidate time/dates based on a selection operation of the final inputter on the time/date adjustment screen for the final inputter, and the time/date adjustment unit registers the determined assembly time/date in the schedule information of the participants on the side of the adjustment initiator managed by the external system.

30. A time/date adjustment method performed by a time/date adjustment apparatus with a memory, the time/date adjustment method comprising:

an adjustment condition setting step of setting an adjustment condition related to an assembly; and a time/date adjustment step of adjusting an assembly time/date based on the adjustment condition, wherein the adjustment condition setting step includes causing a first terminal apparatus used by an adjustment initiator to display a condition setting screen for setting the adjustment condition, and setting the adjustment condition including designation of one or more participants, who are intended to participate in the assembly and on a side of the adjustment initiator, based on an input of the adjustment initiator on the condition setting screen, wherein the memory stores the designation of the participants, the time/date adjustment step includes determining second candidate time/dates based on the input of the adjustment initiator, wherein the memory stores the second candidate time/dates, the time/date adjustment step includes issuing access information for a time/date adjustment screen, and the memory store the access information, when either one adjustment partner or one of a plurality of adjustment partners, who are intended to perform an input operation on the time/date adjustment screen, being an intermediate inputter accesses the time/date adjustment apparatus using the access information, wherein the one adjustment partner and the plurality of the adjustment partners are collectively defined as the adjustment partners, and the one of the adjustment partners who accesses the time/date adjustment apparatus is defined as an access adjustment partner, the time/date adjustment step includes retrieving schedule information of all the participants on the side of the adjustment initiator from an external system wherein the schedule information of the participants is managed by the external system, and extracting third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the access adjustment partner, the time/date adjustment step includes causing a second terminal apparatus used by the access adjustment partner to display the time/date adjustment screen for the intermediate inputter presenting the extracted third candidate time/dates, and determining fourth candidate time/dates based on an input operation of the access adjustment partner on the time/date adjustment screen for the intermediate inputter, wherein the memory stores the fourth candidate time/dates, based on finishing the input operation of either one of the adjustment partners or all of the adjustment partners on the time/date adjustment screen for the intermediate inputter, the time/date adjustment step includes notifying the adjustment initiator that the input operation of the one or all of the adjustment partners on the time/date adjustment screen for the intermediate inputter has finished, when the adjustment initiator accesses the time/date adjustment apparatus using the access information after being notified that the input operation of the one or all of the adjustment partners has finished, the time/date adjustment step includes retrieving the schedule information of all the participants on the side of the adjustment initiator from the external system, and extracting fifth candidate time/dates that are available time/dates of the participants on the side of the adjustment initiator satisfying the adjustment condition of the adjustment initiator and are within the range of the second candidate time/dates by referring to the schedule information that is retrieved in correspondence with the access by the adjustment initiator, the time/date adjustment step includes causing the first terminal apparatus to display the time/date adjustment screen for a final inputter presenting both of all of the fourth candidate time/dates and the fifth candidate time/dates, and determining the assembly time/date out of the fifth candidate time/dates based on a selection operation of the adjustment initiator on the time/date adjustment screen for the final inputter, and the time/date adjustment step includes registering the determined assembly time/date in the schedule information of the participants on the side of the adjustment initiator managed by the external system.

31. A non-transitory computer-readable storage medium storing a program causing a computer to function as:

an adjustment condition setting unit configured to set an adjustment condition related to an assembly; and a time/date adjustment unit configured to adjust an assembly time/date based on the adjustment condition, wherein the adjustment condition setting unit causes a first terminal apparatus used by an adjustment initiator to display a condition setting screen for setting the adjustment condition, and sets the adjustment condition including designation of one or more participants, who are intended to participate in the assembly and on a side of the adjustment initiator, based on an input of the adjustment initiator on the condition setting screen, wherein the designation of the participants is stored therein, the time/date adjustment unit determines second candidate time/dates based on the input of the adjustment initiator, wherein the second candidate time/dates are stored therein the time/date adjustment unit issues access information for a time/date adjustment screen, and the access information is stored therein, when either one adjustment partner or one of a plurality of adjustment partners, who are intended to perform an input operation on the time/date adjustment screen, being an intermediate inputter accesses the time/date adjustment apparatus using the access information wherein the one adjustment partner and the plurality of the adjustment partners are collectively defined as the adjustment partners, and the one of the adjustment partners who accesses the time/date adjustment apparatus is defined as an access adjustment partner, the time/date adjustment unit retrieves schedule information of all the participants on the side of the adjustment initiator from an external system wherein the schedule information of the participants is managed by the external system, and extracts third candidate time/dates that are available time/dates of the participants on the side of the adjustment initiator satisfying the adjustment condition of the adjustment initiator and are within a range of the second candidate time/dates by referring to the schedule information that is retrieved in correspondence with the access by the adjustment partner, the time/date adjustment unit causes a second terminal apparatus used by the access adjustment partner to display the time/date adjustment screen for the intermediate inputter presenting the extracted third candidate time/dates, and determines fourth candidate time/dates based on an input operation of the access adjustment partner on the time/date adjustment screen for the intermediate inputter, wherein the fourth candidate time/dates are stored therein, based on finishing the input operation of either one of the adjustment partners or all of the adjustment partners on the time/date adjustment screen for the intermediate inputter, the time/date adjustment unit notifies the adjustment initiator that the input operation of either one or all of the adjustment partners on the time/date adjustment screen for the intermediate inputter has finished, when the adjustment initiator accesses the time/date adjustment apparatus using the access information after being notified that the input operation of the one or all
of the adjustment partners has finished, the time/date
adjustment unit retrieves the schedule information of all the participants
on the side of the adjustment initiator from the
external system, and extracts fifth candidate time/dates that are available
time/dates of the participants on the side of the
adjustment initiator satisfying the adjustment condi-
tion of the adjustment initiator and are within the
range of the second candidate time/dates by referring
to the schedule information that is retrieved in cor-
respondence with the access by the adjustment ini-
tiator, the time/date adjustment unit causes the first terminal
apparatus to display the time/date adjustment screen for
a final inputter presenting both of all of the fourth
candidate time/dates and the fifth candidate time/dates,
and determines the assembly time/date out of the fifth
candidate time/dates based on a selection operation of
the adjustment initiator on the time/date adjustment
screen for the final inputter, and the time/date adjustment unit registers the determined
assembly time/date in the schedule information of the
participants on the side of the adjustment initiator
managed by the external system.

*    *    *    *    *